United States Patent
Moon et al.

(10) Patent No.: US 12,548,467 B2
(45) Date of Patent: Feb. 10, 2026

(54) ELECTRO MAGNETIC REFRESHABLE BRAILLE READER

(71) Applicant: Tactile Engineering, LLC, Lafayette, IN (US)

(72) Inventors: Alexander Moon, West Lafayette, IN (US); Thomas Baker, West Lafayette, IN (US); David A. Schleppenbach, Lafayette, IN (US)

(73) Assignee: ENHANCED VISIONS SYSTEMS, INC., Clearwater, FL (US)

( * ) Notice: Subject to any disclaimer, the term of this patent is extended or adjusted under 35 U.S.C. 154(b) by 865 days.

(21) Appl. No.: 17/302,988

(22) Filed: May 18, 2021

(65) Prior Publication Data

US 2021/0295739 A1    Sep. 23, 2021

Related U.S. Application Data

(63) Continuation of application No. PCT/US2019/062433, filed on Nov. 20, 2019.

(Continued)

(51) Int. Cl.
    *G09B 21/02* (2006.01)
    *G06F 3/02* (2006.01)
    *G06F 3/044* (2006.01)

(52) U.S. Cl.
    CPC ............... *G09B 21/02* (2013.01); *G06F 3/02* (2013.01); *G06F 3/044* (2013.01)

(58) Field of Classification Search
    None
    See application file for complete search history.

(56) References Cited

U.S. PATENT DOCUMENTS

| 3,987,438 A | 10/1976 | Lindenmueller et al. |
| 4,178,586 A | 12/1979 | Schonherr |

(Continued)

FOREIGN PATENT DOCUMENTS

| CN | 110033674 A | * 7/2019 | .......... G09B 21/004 |
| JP | 2001265213 A | 9/2001 | |

(Continued)

OTHER PUBLICATIONS

Runyan et al., "Seeking the 'holy Braille' display: might electro-mechanically active polymers be the solution?", ISSN: 1743-4440 (Print) 1745-2422 (Online) Journal homepage: https://www.tandfonline.com/loi/ierd20, 2011 (Year: 2011).*

(Continued)

*Primary Examiner* — Xuan M Thai
*Assistant Examiner* — Andrew Bodendorf
(74) *Attorney, Agent, or Firm* — Dennemeyer & Associates LLC

(57) ABSTRACT

In certain embodiments devices suitable for use as electro magnetic refreshable braille readers are disclosed. In some embodiments, the electromagnetic refreshable braille readers of the present disclosure include an actuation mechanism comprising a permanent magnet for latching and a coil adjacent to the magnet. In some embodiments the electromagnetic refreshable braille readers may comprise a separate enclosure comprising tactile elements that can be removably attached to the display so that the separate enclosure can be removed and cleaned by the user.

8 Claims, 47 Drawing Sheets

Related U.S. Application Data

(60) Provisional application No. 62/769,680, filed on Nov. 20, 2018.

(56) References Cited

U.S. PATENT DOCUMENTS

| | | | |
|---|---|---|---|
| 4,551,102 A | 11/1985 | Meinzer | |
| 4,586,904 A | 5/1986 | Chlumsky | |
| 5,466,154 A | 11/1995 | Thompson | |
| 5,583,478 A | 12/1996 | Renzi | |
| 5,685,721 A * | 11/1997 | Decker | G09B 21/003 434/114 |
| 5,917,692 A * | 6/1999 | Schmitz | H01F 7/18 361/187 |
| 6,208,497 B1 * | 3/2001 | Seale | H02K 41/03 361/160 |
| 6,249,418 B1 * | 6/2001 | Bergstrom | F16C 32/0451 361/152 |
| 6,692,255 B2 | 2/2004 | Roberts et al. | |
| 6,734,785 B2 | 5/2004 | Petersen | |
| 6,902,403 B1 | 6/2005 | Goldenberg | |
| 7,097,457 B2 | 8/2006 | Kajino et al. | |
| 7,410,359 B1 * | 8/2008 | Murphy | G09B 21/003 434/114 |
| 7,462,034 B1 * | 12/2008 | Murphy | G09B 21/003 434/112 |
| 7,723,896 B2 | 5/2010 | Esashi et al. | |
| 7,775,797 B2 | 8/2010 | Murphy et al. | |
| 8,013,847 B2 * | 9/2011 | Anastas | G06F 3/016 345/184 |
| 8,177,558 B2 | 5/2012 | Murphy et al. | |
| 8,360,778 B2 | 1/2013 | Murphy et al. | |
| 8,690,576 B2 | 4/2014 | Murphy et al. | |
| 8,740,618 B2 | 6/2014 | Shaw | |
| 9,086,728 B2 | 7/2015 | Roselier et al. | |
| 9,491,361 B2 * | 11/2016 | Beard | H04N 23/687 |
| 10,096,264 B2 * | 10/2018 | Robinson | G06F 3/013 |
| 10,127,832 B2 | 11/2018 | Moon et al. | |
| 10,431,118 B2 | 10/2019 | Shah | |
| 10,431,119 B2 | 10/2019 | Shah | |
| 10,488,886 B2 | 11/2019 | Browne et al. | |
| 10,601,293 B2 * | 3/2020 | Hutchins | H02K 41/031 |
| 10,692,637 B2 * | 6/2020 | Zarate | G09B 21/004 |
| 10,733,906 B2 | 8/2020 | Pascall | |
| 2003/0117371 A1 * | 6/2003 | Roberts | G06F 3/03543 345/156 |
| 2004/0110562 A1 | 6/2004 | Kajino et al. | |
| 2005/0098044 A1 * | 5/2005 | Spedden | G09B 21/004 99/325 |
| 2006/0165465 A1 * | 7/2006 | Wu | H01H 13/70 400/491 |
| 2009/0189464 A1 * | 7/2009 | Schilffarth | B01L 3/502761 310/12.04 |
| 2011/0181402 A1 | 7/2011 | Goodrich et al. | |
| 2012/0295232 A1 * | 11/2012 | Lim | G09B 21/004 434/115 |
| 2013/0147758 A1 | 6/2013 | Chang et al. | |
| 2014/0346901 A1 * | 11/2014 | Hayward | H02K 15/14 310/25 |
| 2014/0375402 A1 * | 12/2014 | Uchida | H01F 7/088 335/282 |
| 2015/0227204 A1 * | 8/2015 | Gipson | G06F 3/016 345/156 |
| 2015/0317915 A1 | 11/2015 | Nelson et al. | |
| 2015/0331528 A1 * | 11/2015 | Robinson | G06F 3/0482 345/173 |
| 2015/0379895 A1 * | 12/2015 | Chari | G09B 21/004 434/114 |
| 2016/0148538 A1 * | 5/2016 | Al-Busaidi | G09B 21/02 434/114 |
| 2016/0224116 A1 * | 8/2016 | Hagedorn | G06F 3/14 |
| 2017/0076633 A1 * | 3/2017 | Moon | G09B 21/004 |
| 2018/0003319 A1 * | 1/2018 | Besse | F16K 99/0038 |
| 2018/0033336 A1 * | 2/2018 | Shah | G09B 21/004 |
| 2018/0068808 A1 * | 3/2018 | Wang | H01H 13/70 |
| 2018/0214779 A1 | 8/2018 | Tran et al. | |
| 2019/0050057 A1 * | 2/2019 | Cho | G06F 3/017 |
| 2019/0073923 A1 * | 3/2019 | Kim | G09B 21/004 |
| 2019/0139451 A1 * | 5/2019 | Drake | G09B 21/004 |
| 2019/0214174 A1 * | 7/2019 | Bertora | H01F 7/1646 |
| 2019/0361528 A1 * | 11/2019 | Jung | G06F 40/197 |
| 2019/0385483 A1 * | 12/2019 | Cohen | G09B 21/02 |

FOREIGN PATENT DOCUMENTS

| | | | |
|---|---|---|---|
| KR | 101661177 B1 | 9/2016 | |
| KR | 20180136915 A | 12/2018 | |
| WO | 2017203536 A1 | 11/2017 | |
| WO | WO-2017188766 A1 * | 11/2017 | G09B 21/004 |
| WO | 2018156475 A1 | 9/2018 | |

OTHER PUBLICATIONS

Karpelson et al. "Low-Cost Electromechanical Actuator Arrays for Tactile Display Applications" 2018 IEEE International Conference on Robotics and Automation (ICRA); May 21-25, 2018 (Year: 2018).*

International Application No. PCT/US2019/062433 International Preliminary Report on Patentability Jun. 3, 2021. 7 pages.

International Application No. PCT/US2019/062433 International Search Report mailed Jan. 22, 2020. 3 pages.

International Application No. PCT/US2019/062433 Written Opinion mailed Jan. 22, 2020. 5 pages.

Karpelson, M., et al., "Low-cost electromechanical actuator arrays for tactile display applications", IEEE World Haptics Conference WHC, (May 2018). Retrieved from the internet, Doi <10.1109/ICRA.2018.8460909. 6 pages.

European Patent Application 19887358.0 Extended European Search Report mailed Jul. 5, 2022. 7 pages.

* cited by examiner

Noise measurement report

Date: 8/1/18, 3:46 PM

Operator:

Place:

Measurement results

| Measurement time (hh:mm:ss) | 00:00:07 |
|---|---|
| LAeq | 56.7 dB |
| LCpeak | 92.8 dB |
| Max. level | 66.2 dB |
| TWA | 22.0 dB |
| Dose | 0.0 % |
| Projected dose | 0.2 % |

Noise measurement report

Date: 8/1/18, 4:24 PM

Operator:

Place:

Measurement results

| Measurement time (hh:mm:ss) | 00:00:07 |
|---|---|
| LAeq | 34.2 dB |
| LCpeak | 62.6 dB |
| Max. level | 39.2 dB |
| TWA | dB |
| Dose | % |
| Projected dose | % |

ELECTRO MAGNETIC REFRESHABLE BRAILLE READER

CROSS-REFERENCE TO RELATED APPLICATIONS

This application is a continuation of International Application No. PCT/US2019/062433 filed Nov. 20, 2019, which claims the benefit of U.S. Provisional Application No. 62/769,680 filed on Nov. 20, 2018, each of which are hereby incorporated by reference herein in their entirety.

BACKGROUND

Although several different technologies have been explored for the creation of tactile displays, none have been suitable to produce a full page tactile display. Such a display requires high-density and power efficient actuation devices. Therefore, there remains a need for improvement in this field.

SUMMARY

Various embodiments of tactile displays are disclosed. In certain embodiments an electromagnetic actuator may be used to control raising and lowering of tactile elements, such as dots, and/or braille characters.

In one embodiment the present disclosure, a tactile display can be manufactured with two enclosures removably joined together-one housing the tactile elements will be second houses the actuation mechanisms, so that the top enclosure can be removed and cleaned by the user.

In one embodiment, the circuitry of a tactile display of the present disclosure can be made to minimize the number of signals required to actuate the high density array, minimizing leakage current and the thermal output of the components. The circuitry can be made physically compact and relatively inexpensive.

In some embodiments, input may be obtained by a user using tactile displays of the present disclosure. In certain embodiments, buttons, switches, keys, or other input devices may be used to interact with tactile displays.

Additional embodiments of the invention, as well as features and advantages thereof, will be apparent from the descriptions herein.

DETAILED DESCRIPTION

Figure 1:
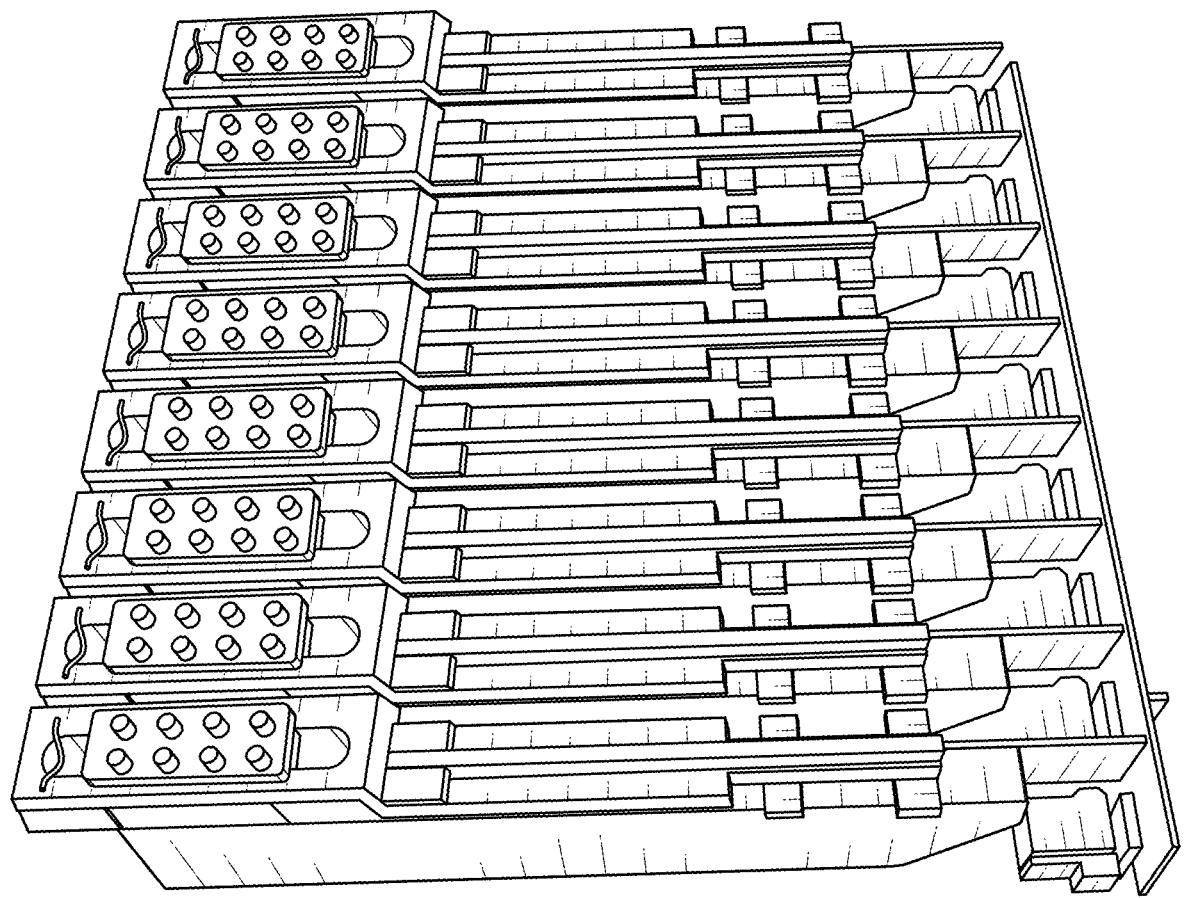
FIG. 1 shows a digital image of one example of a conventional piezoelectric braille cell.

For the purposes of promoting an understanding of the principles of the invention, reference will now be made to certain embodiments and specific language will be used to describe the same. It will nevertheless be understood that no limitation of the scope of the invention is thereby intended, such alterations and further modifications, and such further applications of the principles of the invention as described herein being contemplated as would normally occur to one skilled in the art to which the invention relates. Additionally, in the detailed description below, numerous alternatives are given for various features. It will be understood that each such disclosed alternative, or combinations of such alternatives, can be combined with the more generalized features discussed in the Summary above, or set forth in the embodiments described below to provide additional disclosed embodiments herein.

The electromagnetic braille readers (EMBR) of the present disclosure represents an improvement and a new innovation in the field of tactile and braille displays. Several variations of the disclosed embodiments has been developed. Braille readers of the past often used piezoelectric actuators to move the tactile elements. These piezoelectric actuators are relatively expensive, fragile, slow to change states, require unsafe voltages to actuate, and are relatively large. These disadvantages severely limit the number of movable tactile elements that can be displayed on a device using piezoelectric technology. Additionally these devices which use piezoelectric technology require maintenance in the form of regular cleaning of the display elements to maintain the functionality of the units. Such cleaning is often performed by technicians in the field and is therefore time-consuming and expensive.

Although several different technologies have been explored for the creation of tactile displays there remains a need for improvement in the art these such displays require high density and power efficient actuating devices. Furthermore, to be commercially successful, the mechanism may preferentially be relatively inexpensive.

The actuation mechanisms used in embodiments of the present disclosure include a permanent magnet for latching. The mechanisms also include a coil adjacent to the permanent magnet. When a current flows through the coil, the position of the permanent magnet can be altered between two positions. In this way, the permanent magnet can be associated with a tactile element or a braille dot. This position can be altered depending on the position of the permanent magnet. When a permanent magnet is stationary in either of the two positions, no current need be applied to the coil to maintain the position of the magnet, substantially illuminating idle power draw. Utilizing this unique actuation mechanism, a high-density tactile display can be made inexpensively and of virtually unlimited size, with minimum power use.

In some embodiments of the present disclosure a tactile display can be manufactured with two enclosures that can be removably joined together to form the tactical display. One of these enclosures can house the tactile elements while the second enclosure can hold the actuation mechanism. The first enclosure can be made suitably to be cleaned by the user themselves when removed from the second enclosure and rejoined to the second enclosure when the cleaning is complete.

The circuitry for the operation of the actuation mechanism can support a high-density array of actuating devices. For example, the circuitry can be made to minimize the number of signals required to actuate the array, to minimize the leakage current of the circuitry components, and/or to minimize the thermal output of the circuitry components. Additionally, the circuitry can be made physically compacts to support the high-density array and can be made relatively inexpensively.

Devices of the present disclosure may be interactive. Devices of the present disclosure may allow a users to input content and to manipulate displayed information. Therefore, the user can interact with the displayed information. These devices and can include both tactile output and input in the form of buttons, controls, and user interface.

Devices of the present disclosure are interoperable. The devices can interoperate with other information and communications technology (ICT) devices, including other assistive technologies available on the market. For example, devices of the present disclosure VFO-compatible, and can work seamlessly with JAWS (Job Access With Speech).

Devices of the present disclosure support back translation. This allows for the back translation of braille or tactile graphics into text or images.

Devices of the present disclosure are ready. Devices have met technology readiness level (TRL) seven (TRL-7), meaning that system prototypes have been demonstrated in an operational environment.

There is a need among braille literature users for display that is affordable, and capable of displaying both text and graphics in real time. Such displays may preferably be of significant size, such as the size of a consumer tablet or greater. Further, displays may preferably be able to interconnect with consumer computers and electronics to show graphical and braille text representations of content. Braille literacy requires full access to content, much of which is graphical or two-dimensional in nature, such as tables or formatted braille. Existing one line displays currently on the market cannot act purely capture such content.

FIG. 1 shows a digital image of the conventional piezoelectric braille cell technology. The basic mechanism of the piezoelectric actuator is a bimorph which requires a long, lever like horizontal component in order to accomplish the correct vertical motion of an individual dot. Hence, the full actuator is much longer than the dot itself. Although some improvements in size and packaging have been made over the past 20+ years, the basic technology and size limitation remains the same. This prevents dots from being closely packed together. The best that could previously be accomplished is two lines of braille, with a significant bezel around them to allow for the horizontal levers. To overcome this size limitation and actuator which is the physical size of the dot itself is most desirable.

The cost factor is also a major limitation of piezoelectric technology. Again, improvements have been made, but the basic cost is on the order of approximately $15 US per braille cell. This is a fundamental limitation for making larger displays. A "full-page" display may be composed of 32 cells arranged in 16 closely packed lines similar to a braille page. Such a page represents 512 cells, or a cost of $7680 just for the cells alone when made with piezoelectric technology cells. To be feasible, a new technology should cost roughly an order of magnitude less; for example, a cost of approximately $1.50 US per braille cell may be desirable and may allow for full-page displays to be sold at roughly the same price as current conventional one line displays.

Devices of the present disclosure overcome many of these limitations as well as affording multiple other improvements over conventional technologies.

The actuation mechanism used in embodiments of the present disclosure includes a permanent magnet for latching. The mechanism also includes a coil adjacent to the permanent magnet. When current flows through the coil, the position of the permanent magnet can be altered between two positions. In this way, the permanent magnet can be associated with a tactile element or a braille dot whose position can be altered depending on the position of the permanent magnet. When the permanent magnet is stationary in either of the two positions, no current need he applied to the coil to maintain the position of the magnet, substantially eliminating idle power draw. Utilizing this unique actuation mechanism, a high-density tactile display can be made inexpensively of virtually unlimited size, with minimum power use.

One feature of tactile displays of the present disclosure includes the feature that such tactile displays can be manufactured with two enclosures that can be removably joined together to form the tactile display. One of these enclosures can house the tactile elements, while the second enclosure can house the actuation mechanism. The first enclosure can be made suitably to be cleaned by the user themselves when removed from the second enclosure and can be rejoined to the second enclosure when the cleaning is complete.

Figure 2:
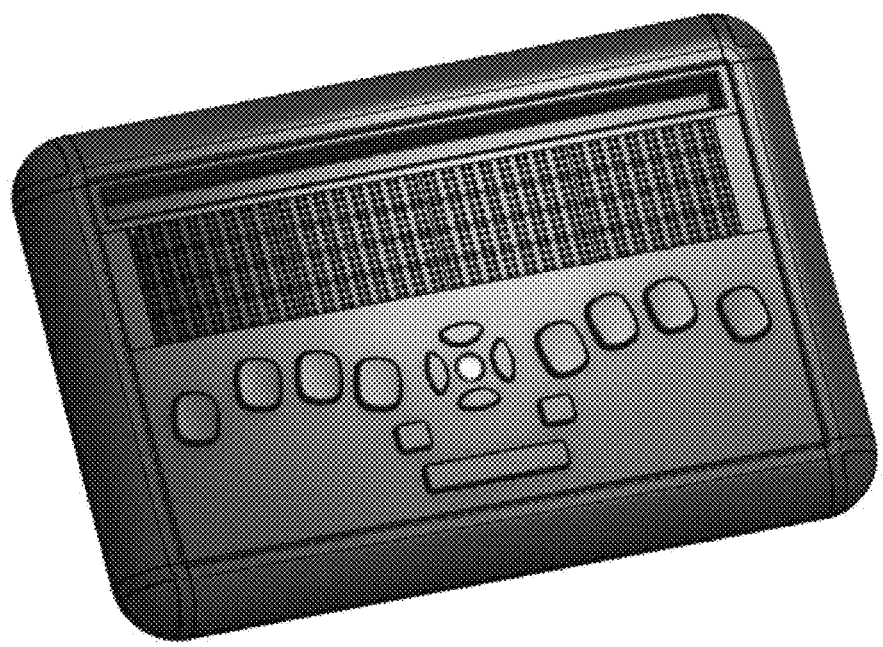
FIG. 2 shows a digital image of a rendering of an engineering diagram mid-sized EMBR prototype.
Figure 3:
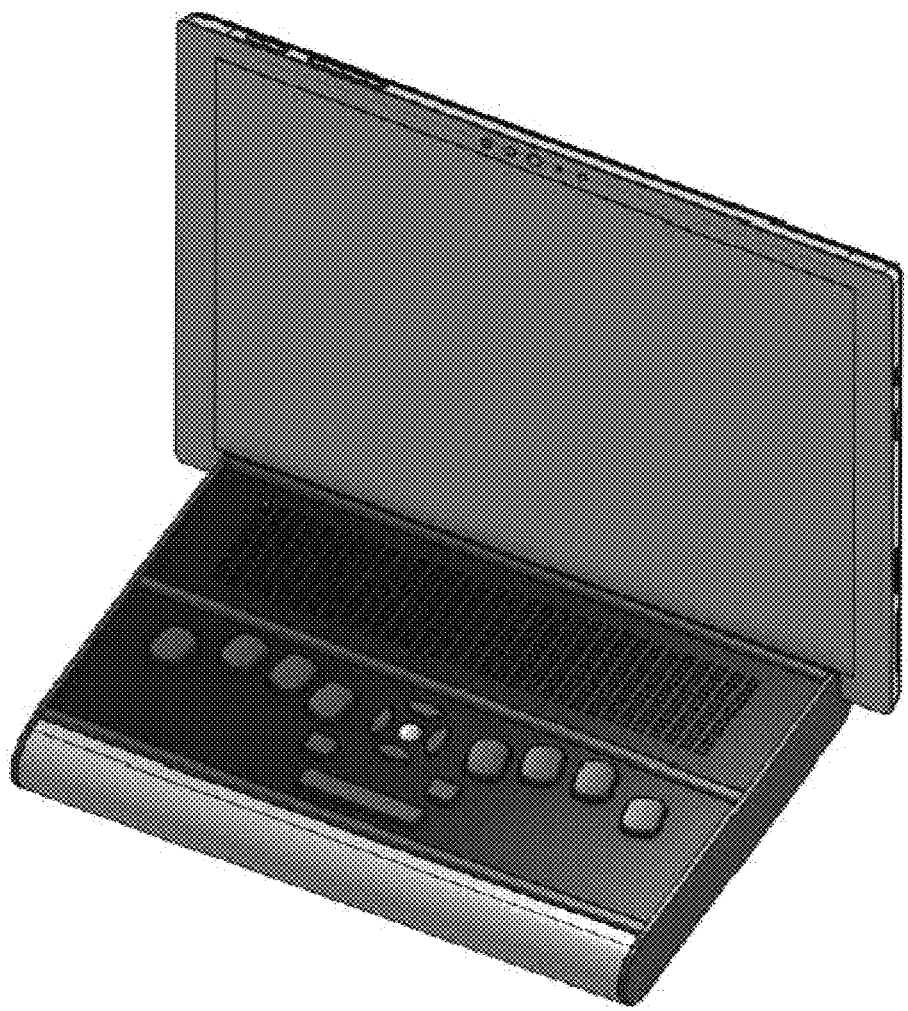
FIG. 3 shows the midsize EMBR prototype of FIG. 2 with a touchscreen.
Figure 4:
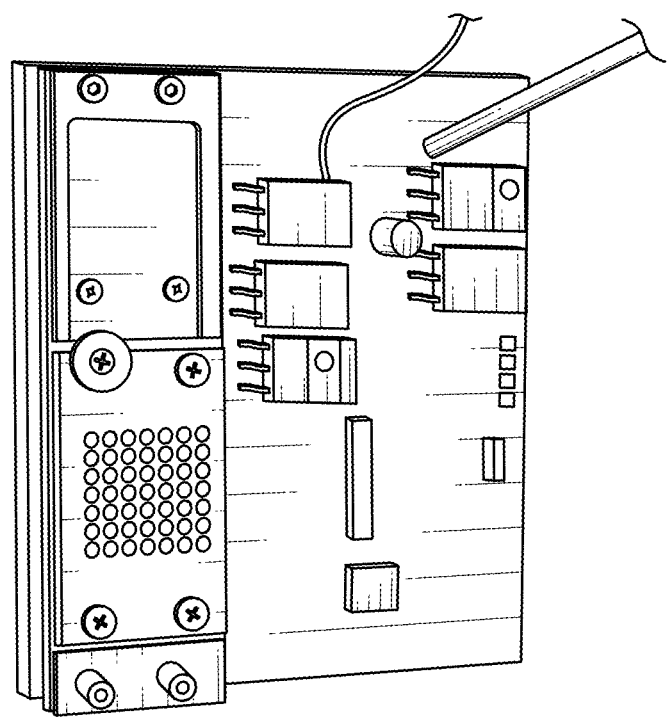
FIG. 4 shows a digital image of a small EMBR prototype.
Figure 5:
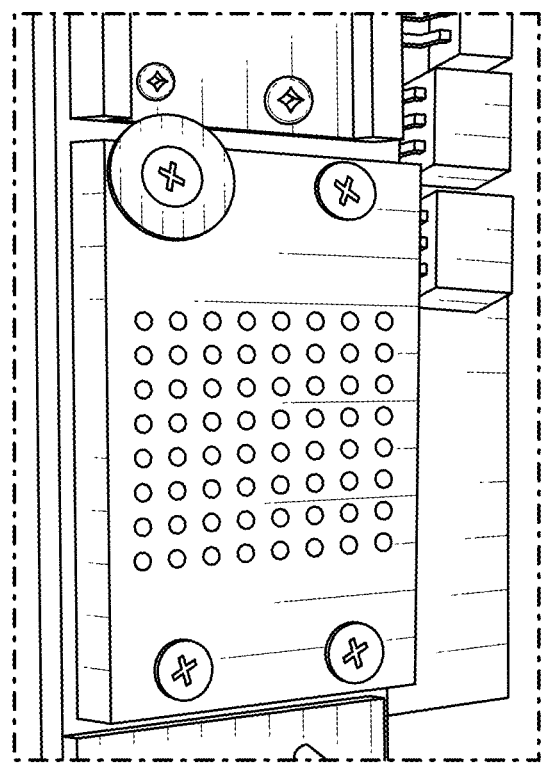
FIG. 5 shows a close-up digital image of the small EMBR prototype of FIG. 4.
Figure 6:
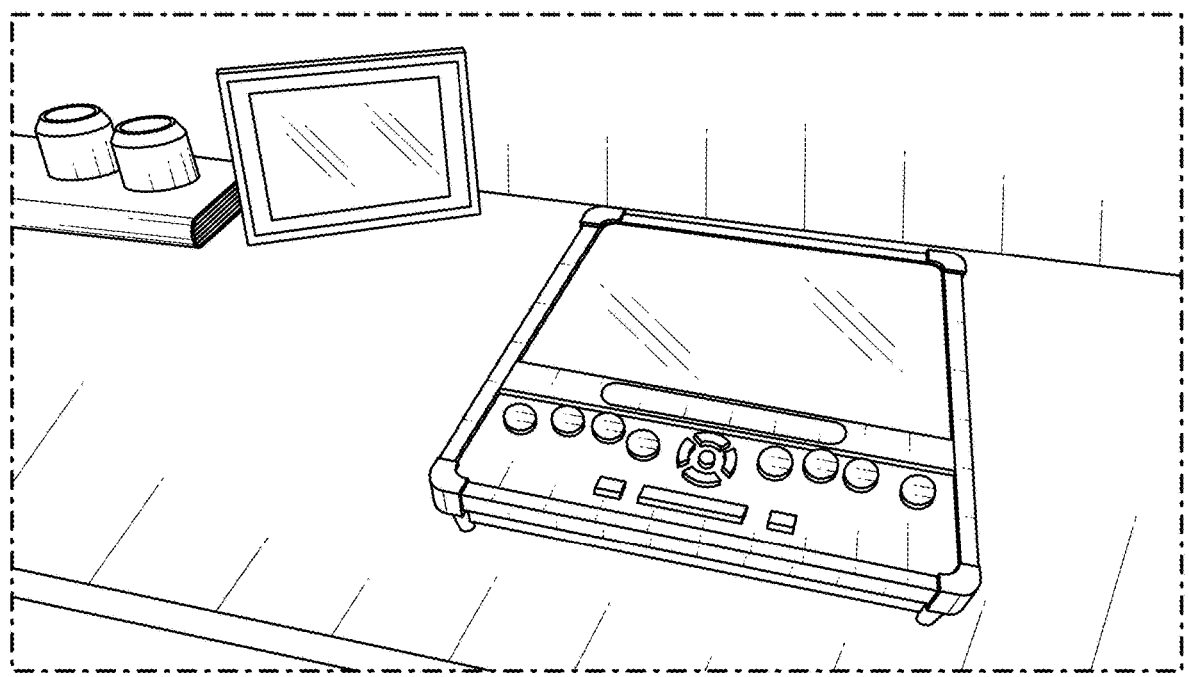
FIG. 6 shows a digital image of a rendering of an engineering diagram of a large EMBR device.
Figure 7:
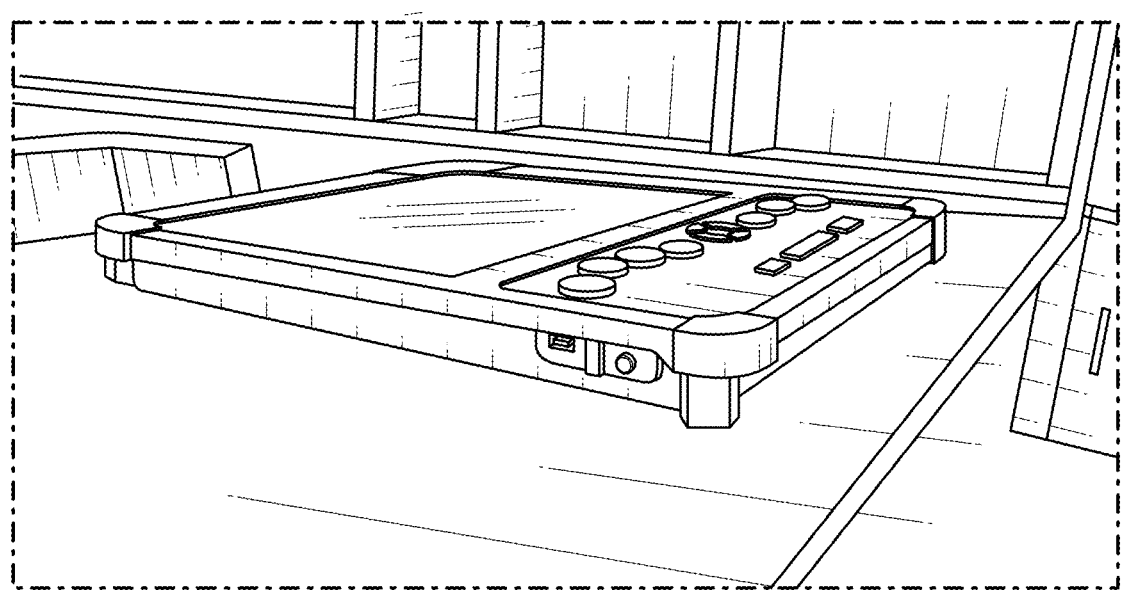
FIG. 7 shows a side view digital image of a rendering of an engineering diagram of a large EMBR device.

FIG. 2 shows a digital image of an engineering diagram of one mid sized prototype of the present disclosure. FIG. 3 shows a digital image of an engineering drawing of one mid sized prototype of the present disclosure with a touchscreen. FIG. 4 shows a digital image of one embodiment of a prototype of the present disclosure. FIG. 5 shows a digital image of one embodiment of a prototype of the present disclosure. FIG. 6 shows a digital image of one embodiment of a larger device of the present disclosure. FIG. 7 shows a digital image of a side view of a larger device of the present disclosure.

Devices of the present disclosure exist in an arena that is not common for conventional manufacturing. Many technologies exist for the manufacture of large parts, or parts that exist on the centimeter scale or larger. Further, modern manufacturing technique for microelectromechanical systems (MEMS) are becoming more common as well. However the problem of displaying braille dots exists in the realm of millielectromechanical systems (MiMEMS), which is an area that very few conventional manufacturers have been able to work in. In recent years, the ability of manufacturers such as injection molding companies, sheet metal companies, soldering and/or printed circuit boards (PCB) has improved.

The sheer number of parts involved in a full-page braille display is significant. A full-page braille display can consist of tens of thousands of individual parts on the bill of materials, similar in magnitude to a luxury automobile. In order for manufacturing to be practical at a cost less than that of a luxury automobile, significant attention must be given to the use of the conventional, well understood, and inexpensive manufacturing techniques along with the use of inexpensive materials.

Table 1 shows a comparison between the use of a conventional piezo cell and the electromagnetic actuators of the present disclosure.

| Comparison Point | Convention Piezo Cell | EMBR Actuator |
| --- | --- | --- |
| Footprint | Single line only due to geometry of actuator | Supports full-page and graphic array |
| Cost | Upwards of $15 US per cell | Target cost $2-$4 US per cell |
| Response time | 30 ms entire display (1 line) | 200 to 800 ms for entire display (page) |
| Dot Height | 0.787 mm | 0.787 mm with tighter tolerance. Can be set higher. |
| Dot Force | 14-23 g | 20-25 g, but with resistance to feel firmer. Can be set much higher or somewhat lower. |
| Manufacturability | Dedicated supplier dependencies; high production maintenance | Manufacturable anywhere; uses tried and true methods |
| Reliability | Requires regular maintenance | Extremely robust |
| Noise level | Low to acceptable | Similar in tests; acceptable at the very least |
| Power requirements | 98 mj to change state for 40 cells, plus leakage when holding state. Does not hold state when powered off. | 10-20 mj per dot state change but no holding power required. Entire display is very power efficient. |

Tactile displays of the present disclosure are preferably easy to read, understand, perceive, and/or operate. The displays of the present disclosure are also usable, allowing users to access digital information in an effective and timely way. The time it takes for the displays of the present disclosure to update and present new content do not represent a significant disruption to the user. The adequacy of the refresh speed may depend on the chosen application for the tactile device, with some applications requiring a higher refresh speed than others. The displays of the present disclosure allow for a quiet operation of the display and may help to avoid discrimination when using the device in public spaces. It enables people with visual impairments to meet their goals with effectiveness, efficiency, and satisfaction. The devices of the present disclosure are also affordable and portable. Displays of the present disclosure have a considerate design, are reliable, robust, and/or safe. They take into account the needs and preferences of visually impaired people. The designs of tactile displays of the present disclosure are aesthetically pleasing, and include practical details such as the format and location of navigation buttons, but also the look and feel of the materials used and the overall appeal of the final device. Devices of the present disclosure are preferably easy to maintain, clean, and/or repair. The devices of the present disclosure allow users to input content and to manipulate the displayed information, hence the user can interact with the displayed information. Displays of the present disclosure are also operable with other ICT devices, including other assistive technologies available to the market. Displays of the present disclosure also allow for the back translation of braille and/or tactile graphics into text or images. They are able to display and switch between text, graphics, and/or braille characters to enable cooperation between visually impaired and unimpaired people. This feature is particularly relevant for solutions that aim to support collaborative work between people with and without fissionable impairments. Devices of the present disclosure allow for communication in both directions, perceiving information and uploading information.

Figure 8:
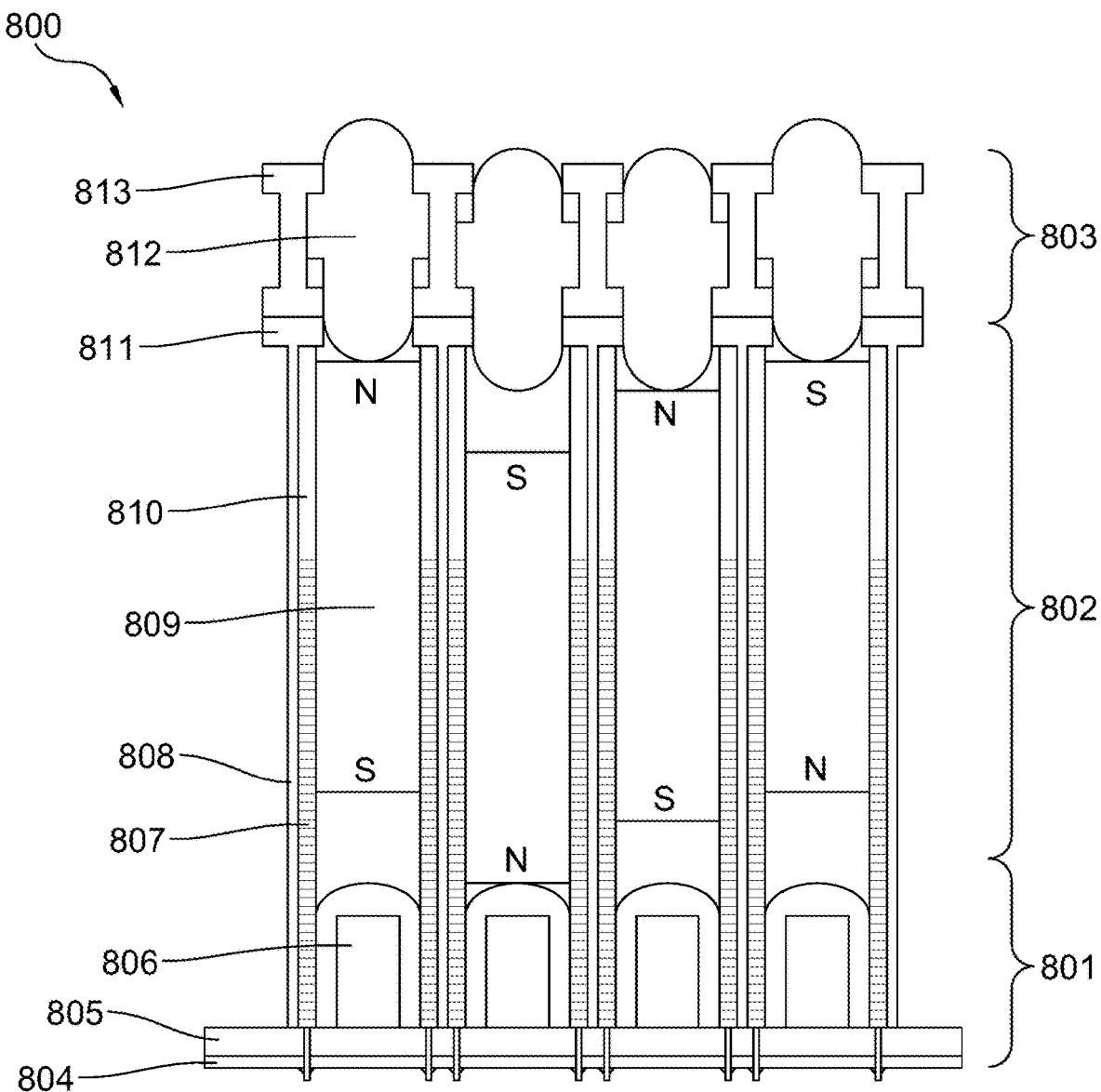
FIG. 8 shows an overview drawing of the side view of an EMBR cell.

The basic mechanics of the actuation mechanism used in some embodiments of the present disclosure are based on the well understood physics of electromagnetism. For example, FIG. 8 shows a drawing of one embodiment of the present disclosure, 800, comprising a bottom assembly 801, middle assembly 802, and top assembly 803. This embodiment includes a circuit board 804, bottom insulator plate 805, steel core or stator 806, wire coil 807, steel honeycomb 808, magnet or actuator 809, insulating spacer 810, steel top plate or stator 811, braille dot or actuator 812, insulator top plate 813.

Figure 9:
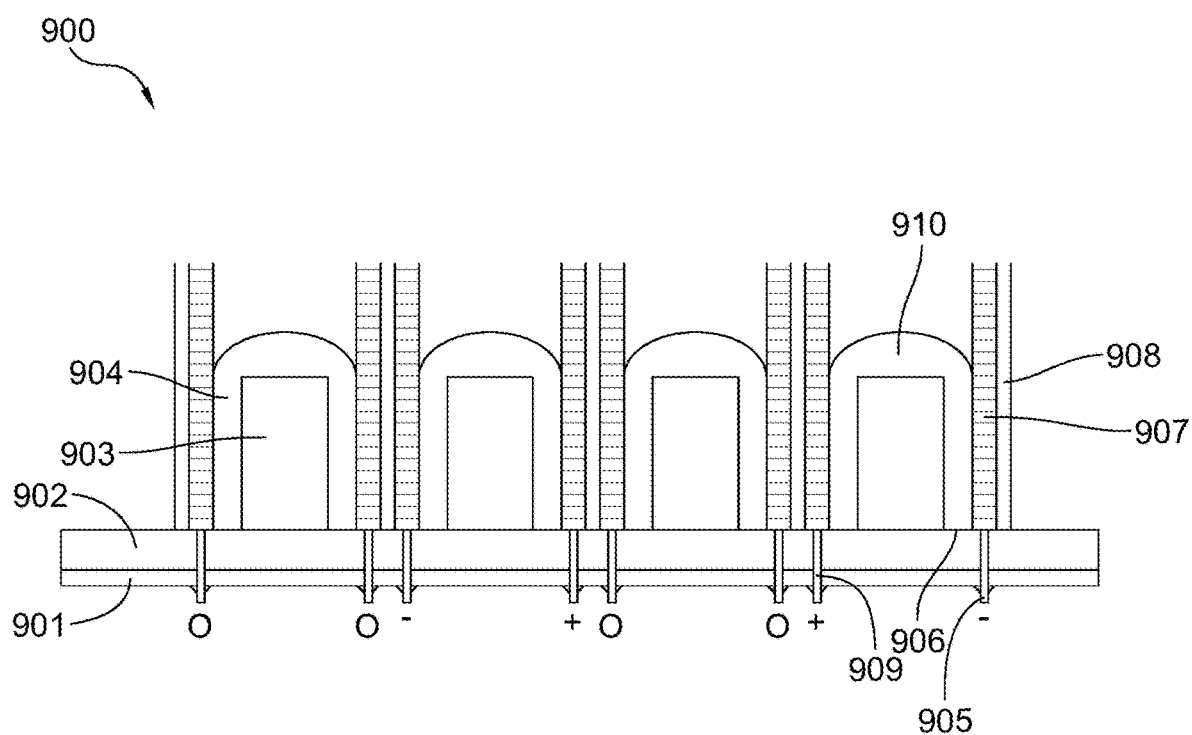
FIG. 9 shows a drawing of a side view of an EMBR bottom assembly.

FIG. 9 shows a drawing of the side view of a bottom assembly used in embodiments of the present disclosure comprising circuit board 901, bottom insulator plate 902, steel core or stator 903, insulator sheath 904, solder joint 905, plate/sheath joint 906, coil 907, honeycomb 908, coil leads 909, and magnetic gap 910. The circuit board 901 must be insulated from the steel core 903 in some fashion or components may short electrically. This can be achieved via an air gap, insulator material, or other means. Insulator assembly 902 and 904 can be molded or machined as one piece, two pieces, and/or many separate pieces which are connected mechanically or simply rest on top of each other. Further, steel core 903 can be machined together with sheath 904 and plate 902 as one entire metal piece, as long as an insulator or air gap is placed between plate 902 and circuit board 901. The coil 907 may be composed of a wire that is electrically insulated with a covering. The assembly and/or the reliability of coils may be greatly assisted by the use of a separate insulator sheath 904 made of a smooth material such as a plastic covering the steel core 903. Coil leads 909 may pass through the insulator plate 902 and circuit board 903 before exiting inside smaller holds with pads for solder. Leads may be soldered to circuit board 903 via solder joints 905. Solder joints 905 may be mechanically isolated from motion to prevent wear and lead breakage because leads may be small and/or delicate. The assembly of a coil system may be aided mechanically by the geometry of the system. Insulator plate 902 may be attached to circuit board 901 then, steel core 903 can be inserted into insulator sheath 904, and insulator sheath 904 may be attached to plate 902. Wire coil 907 may be placed onto sheath 904; the fit may be snug so as to mechanically hold the coil in place during assembly, to help align the coil for later assembly stages, and/or to also prevent movement of the coil during actuation. During this process, coil leads may be fed through holes in plate 902 and circuit board 903, which can be assisted by vacuum or mechanical methods and jigs. Soldering can be done individually or all at once via solder bath, wave soldering, or other methods. One lead may be longer in length than another to aid in alignment so that all coils are assembled with the same clarity, although this can be corrected for after assembly by reprogramming of the circuit board. When a magnet actuator is latched to the steel core 903 in the bottom position, the holding force is critically dependent on the size of the magnet gap 910, along with other geometrical factors in the actuator system. The stability of the bottom stable position of the bistable latch system can be adjusted by increasing or decreasing this. At one extreme, the magnet actuator can touch the stator 903 directly. This results in the largest latching or holding force in the down latched position. At the other extreme, the magnet actuator can be separated from the stator 903 by a magnet gap 910 using an insulator sheath 904, or an insulating spacer on the end of the stator 903, or an air gap created by the geometry of the magnet actuator coil 907, and stator 903 system, or other similar techniques. This separation can be increased to a maximum were no stator 903 exist at all, and the magnet is weakly held down in the latched position by attraction to a metal plate 902, or, by the walls of the honeycomb only, or in the most extreme, by gravity alone. As the strength of the hold down force is directly related to the energy needed to actuate the magnet actuator up, the system is designed with a carefully chosen magnet gap 910 to minimize this energy while still providing a bistable latching system and preventing accidental actuation. When the polarity of the current through the coil is in one direction, the coil will push up, and when it is reversed, the coil will push down. In this manner, the polarity orientation of coil leads can be corrected for post-assembly. When the coil circuit is open, the magnetic force of the stator will latch the magnet actuator in the up or down position, with a varying amount of force depending on the geometry and other factors as described above or which would be apparent to one of ordinary skill in the art.

Figure 10:
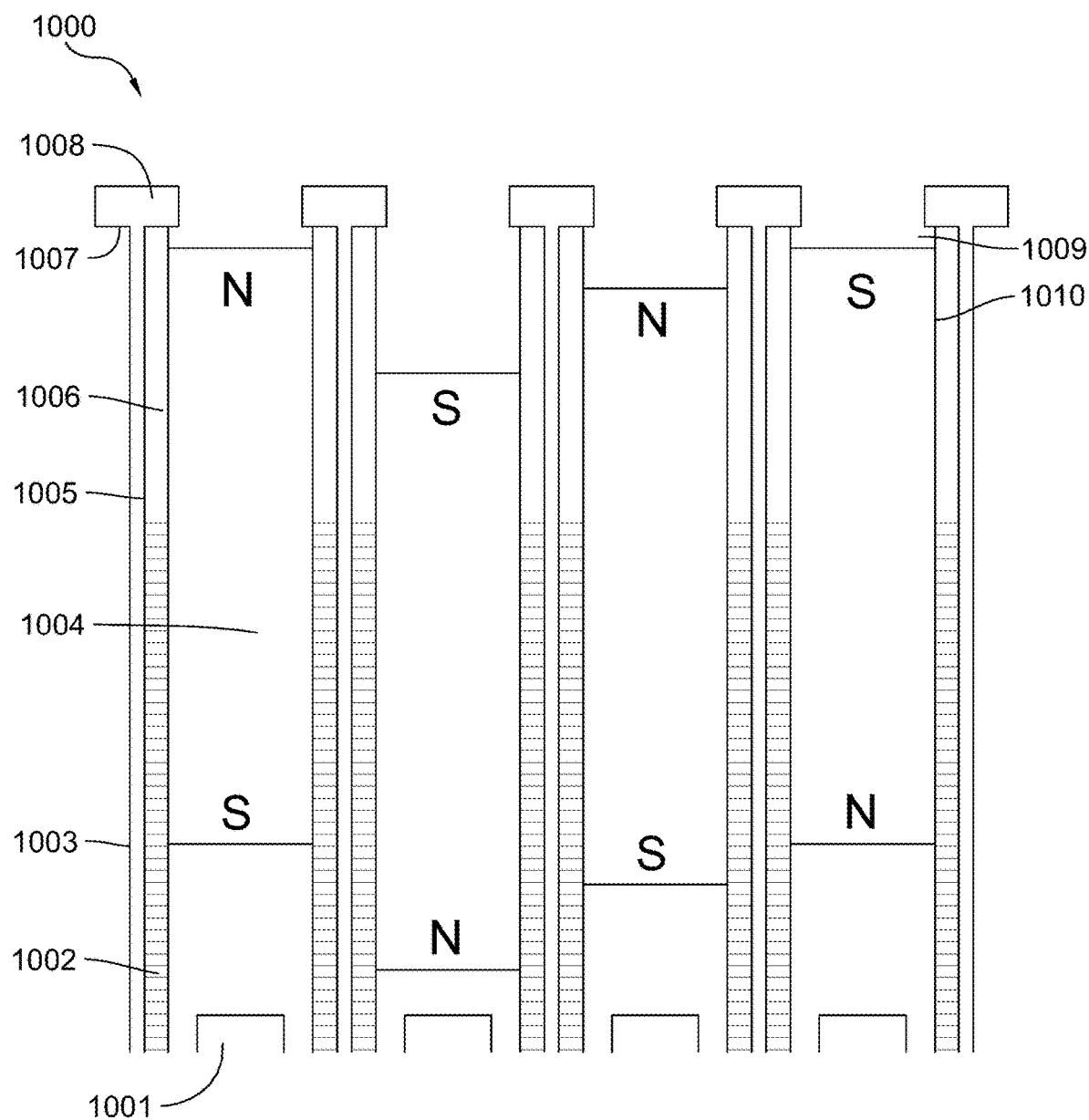
FIG. 10 shows a drawing of a side view of an EMBR middle assembly.

FIG. 10 shows a side view drawing of one embodiment of the middle assembly used in certain embodiments of the present disclosure. This embodiment comprises steel core or stator 1001, wire coil 1002, steel honeycomb 1003, magnet or actuator 1004, coil spacer joint 1005, insulating spacer 1006, honeycomb plate joint 1007, steel top plate or stator 1008, plate-magnet gap 1009, magnet friction gap 1010. The middle assembly may provide a smooth and precise channel for the magnet actuator 1004 to move back and forth between bottom stator 1001 and top stator 1008. When the wire coil 1002 circuit is open, the magnet can rest in one of two bistable latched positions: the down latched position, near the bottom stator 1001, or the top latched position, near the top stator 1008. When the wire coil 1002 is energized with an electric current, it quickly builds a magnetic field. The strength of the magnetic field is related to the number of turns in the coil and the current applied, among other things. In order to minimize power consumption of the actuator, the number of coils may be increased by multiple layers of windings has allowed by the constraining geometry of the honeycomb 1003 on the outer diameter and the magnet actuator 1004 on the inner diameter. The electrical current may be applied in a short pulse, the intensity of which can be controlled by pulse-with modulation. The electrical current pulse, or package of charge, is delivered to the coil 1002 and a powerful magnetic field begins to build. After the current pulse passes and the circuit is open, the field continues to build to a maximum, then wanes. The magnet actuator 1004 is pulled by this field away from the stator it is near and out of the bistable position into an intermediate position between the two stators. At this point momentum carries the actuator 1004 to the opposing stator, even if the magnetic field is absent. Once near the opposing stator, the magnetic again latches into the other bistable state. If too little current is applied, the actuator 1004 will not actuate, and if too much current is applied the actuator 1004 may carry enough momentum to "bounce" off of the opposing stat over and return to the originating stator. This occurrence applies not just to current level, but may also be observed in other situations, for example involving small changes to the design or geometry of the overall system, any of which may cause the actuation mechanism to fail or become unreliable. Actuator 1004 may be a rare earth magnet, which has several desirable characteristics for this particular application, including a high remanence, and very high coercivity and energy product. The high remanence means that the actuator will have a strong permanent magnetic field, making it easy to actuate between stators and latch to stators in either bistable position. The high energy product means that the actuator may have dense magnetic field that can be more easily shielded from neighboring actuators. In addition, the high coercivity may allow the actuator to be actuated many times without degrading performance as would be required in a braille display. Other magnets or non-magnetic metals may be used for actuator 1004.

Figure 11:
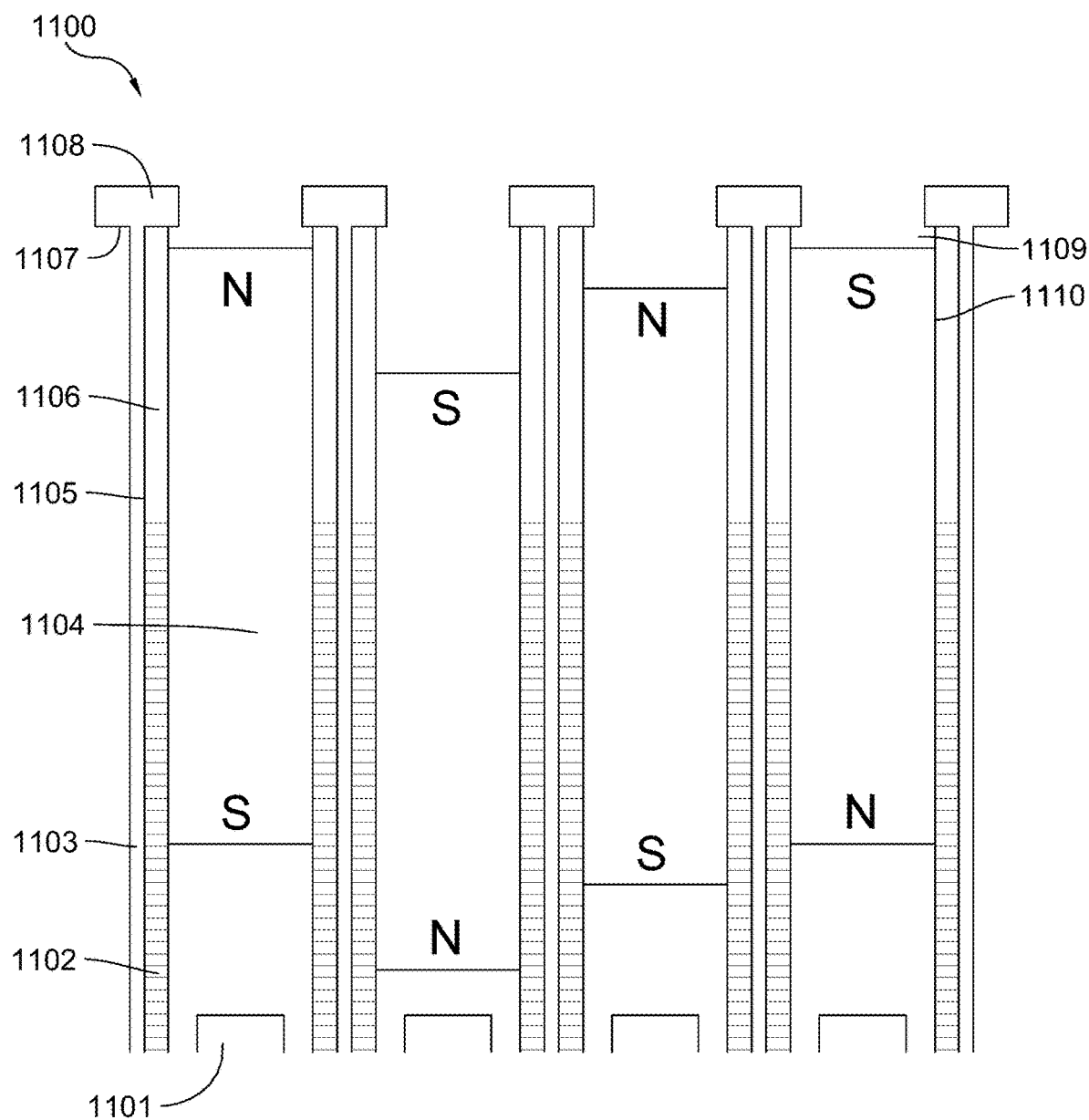
FIG. 11 shows a drawing of a side view of an EMBR middle assembly.

FIG. 11 shows a drawing of the side view of the middle assembly of one embodiment of the present disclosure. In this embodiment, the middle assembly comprises steel core or stator 1101, wire core 1102, steel honeycomb 1103, magnet or actuator 1104, coil-space joint 1105, insulating spacer 1106, honeycomb-plate joint 1007, steel top plate or stator 1108, plate-magnet gap 1109, and magnet friction gap 1110. In this embodiment, the use of a steel honeycomb 1103 may be critical to the performance of the display as a whole, as individual actuators are nearby neighboring actuators in an array. The purpose of the honeycomb 1103 is to shield actuators 1104 from each other, by coupling the magnetic fields from each actuator to the large field of the honeycomb as a whole. Various materials can be used for the honeycomb, including but not limited to, ferrous and/or non-ferrous metals, or even nonmetals, although if the material exhibits little ferromagnetic, diamagnetic, and/or paramagnetic properties, then the shielding may cause actuator performance to suffer. The geometry of the honeycomb can comprise cylindrical openings through which the actuator 1104 travels, or hexagonal openings, or openings of other regular shapes. Further, the honeycomb can alternatively comprise posts spaced between the actuators as opposed to a solid block with openings. Performance of the device may be related to honeycomb composition and geometry. Further, the arrangement of the magnet actuators 1104 is ideally done with alternating polarities, as in a "checkerboard" pattern, so as to further prevent neighboring actuators from interfering with each other, although any arrangement of polarities including random or all the same may be operable. During actuation, the magnet actuator 1104 may be self centered inside the coil 1102 due to the magnetic fields involved, resulting in a small air gap 1110 which may be preferred due to lack of friction. If the geometry of the system requires the magnet actuator 1104 to protrude out of the coil 1102, and additional insulating spacer 1106 may be added to prevent the magnet actuator 1104 from moving off axis and sliding against the wall of the honeycomb 1103, which the actuator may be attracted to depending on the material used. In a preferred embodiment, the magnet retains a small air gap 1110 during all phases of operation, completely eliminating or reducing friction and/or wear, which can be done with careful design of the overall system. As mentioned above, the starting and/or stopping position of the actuator 1104 in relation to the coil 1102 may be critical as the actuator may preferentially be able to move in and out of the coil on one side of the coil only without becoming centered or trapped inside the coil. Therefore, the geometry of the actuator-coil position in either bistable state may be critical. This may be done by adjusting the length of the stators and the gap between actuator 1104 and stator 1108 as shown by gap 1109. This may be achieved by air due to mechanical constraints of the system, in some embodiments, or by the braille dot, or by an insulating cap the actuator, or by a spacer, or by other similar methods. Finally, the geometry of the small hole in the top stator 1108 which may be axially aligned with the actuator 1104 may be crucial to performance, as the stator 1108 must hold the magnet actuator 1104 in one of the bistable latched positions without moving the magnet off-axis and with a precise amount of force. This holding force may be crucial, as it allows a user to feel dots pushing against their fingers, as opposed to simply moving away as finger pressure is applied. In some embodiments, this holding force can be varied, for example to exhibit a holding force of 5 g-50 g, 10 g-45 g, 15 g-40 g, 20 g-35 g, 20 g-30 g, and/or 20 g-25 g.

Figure 12:
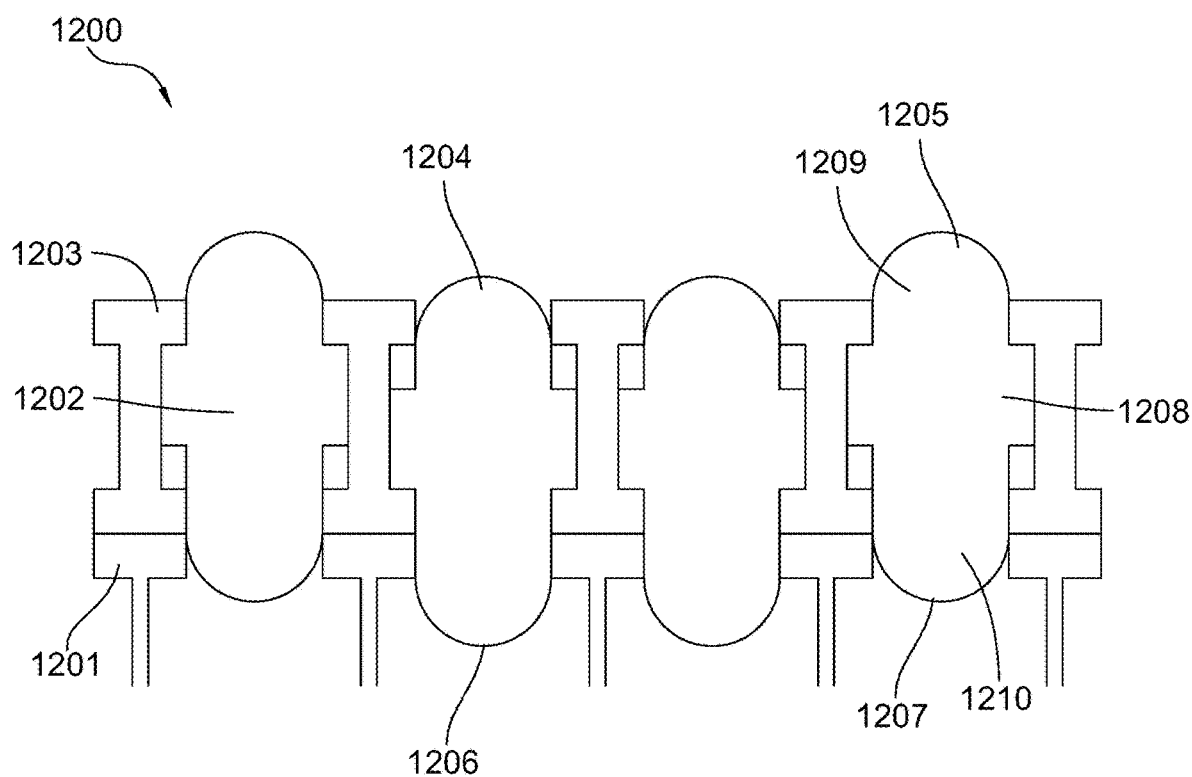
FIG. 12 shows a drawing of an EMBR top assembly.

FIG. 12 shows a drawing of one embodiment of a top assembly used in embodiments of the present disclosure comprising top plate or stator 1201, plastic dot 1202, dot capture assembly 1203, depressed braille dot 1204, raised braille dot 1205, protruding linkage dot 1206, retracted linkage dot 1207, mechanical constraint collar 1208, braille dot 1209, and linkage dot 1210. In some embodiments, the purpose of the top assembly is to mechanically isolate the movement of the braille dots from the actuation system, and to provide the user with a safe interface to interact with the braille dots. Plastic dots 1202 can be molded or machined as one piece, as more than one piece, for example but not limited to as three separate pieces. Plastic dots may comprise a mechanical constraint collar 1208, the braille dot 1209, and/or the linkage dot 1210 dots may be assembled inside a dot capture assembly 1203 which can be made in two or more pieces to allow for the dots to be placed into the assembly before assembly and/or sealing. The dot capture assembly 1203 may be connected to or rest on the top plate 1201 which may serve to electrically insulate the user from the actuation system in the event of a short. Motion of plastic dot 1202 may be mechanically isolated, but directly influenced by the motion of the actuator, for example by being in mechanical communication with the actuator. Mechanical constraint collar 1208 and dot capture assembly 1203 may have a geometry such that on the top side, the user can experience or observe a dot in the raised position, as shown by 1205, were in a depressed position, as shown in 1204. Generally, the distance in height between 1204 and 1205 positions may be preferentially kept to a minimum for power consumption reasons, although a larger stroke length is possible. The user cannot see press the braille dot 1209 below position 1204 due to the geometry, which prevents the user from accidentally actuating the magnet from a top latched position to the bottom latched position. Furthermore, the dot 1209 may be prevented from raising too high or following out of the display by the geometry constraining the maximal height to position 1205. On the bottom side, the linkage dot 1210 is in mechanical contact with the magnet actuator. In the lowest position 1206, 1210 cannot push the actuator patched the latching point; however, when the actuator is moved up from the bottom stator to the top stator it latches with sufficient force to move the entire dot 1202 into the raised position 1205 and hold it there with sufficient holding force for reading. In the raised position 1207 the linkage dot may be designed to provide a small air gap between the magnet actuator and the top plate 1201. This may be adjusted to provide a certain holding force. The entire top assembly can be removed separately from the rest of the display, which may be important for purposes of cleaning and/or maintenance. Heavy use of braille displays may result in buildup of finer oil and dirt in the small parts, which may cause performance issues. Therefore, a method of quick and easily cleaning may be of significant benefit. In some embodiments, a membrane can be used to physically separate the user's finger oils and dirt from the rest of the assembly.

The arrangement of dots, for example braille dots, in an array is of significant concern to making braille symbols and/or graphics. Braille symbols follow a precise dot pattern composed of clusters of 6-dots or 8-dots in an irregularly spaced, but repeating array. This may prevent and/or discourage the use of perfectly regularly spaced dots, such as in a square-packed array, from providing both graphics and braille to perfect specifications. Many tessellation patterns may be used for the full array of dots.

Figure 13:
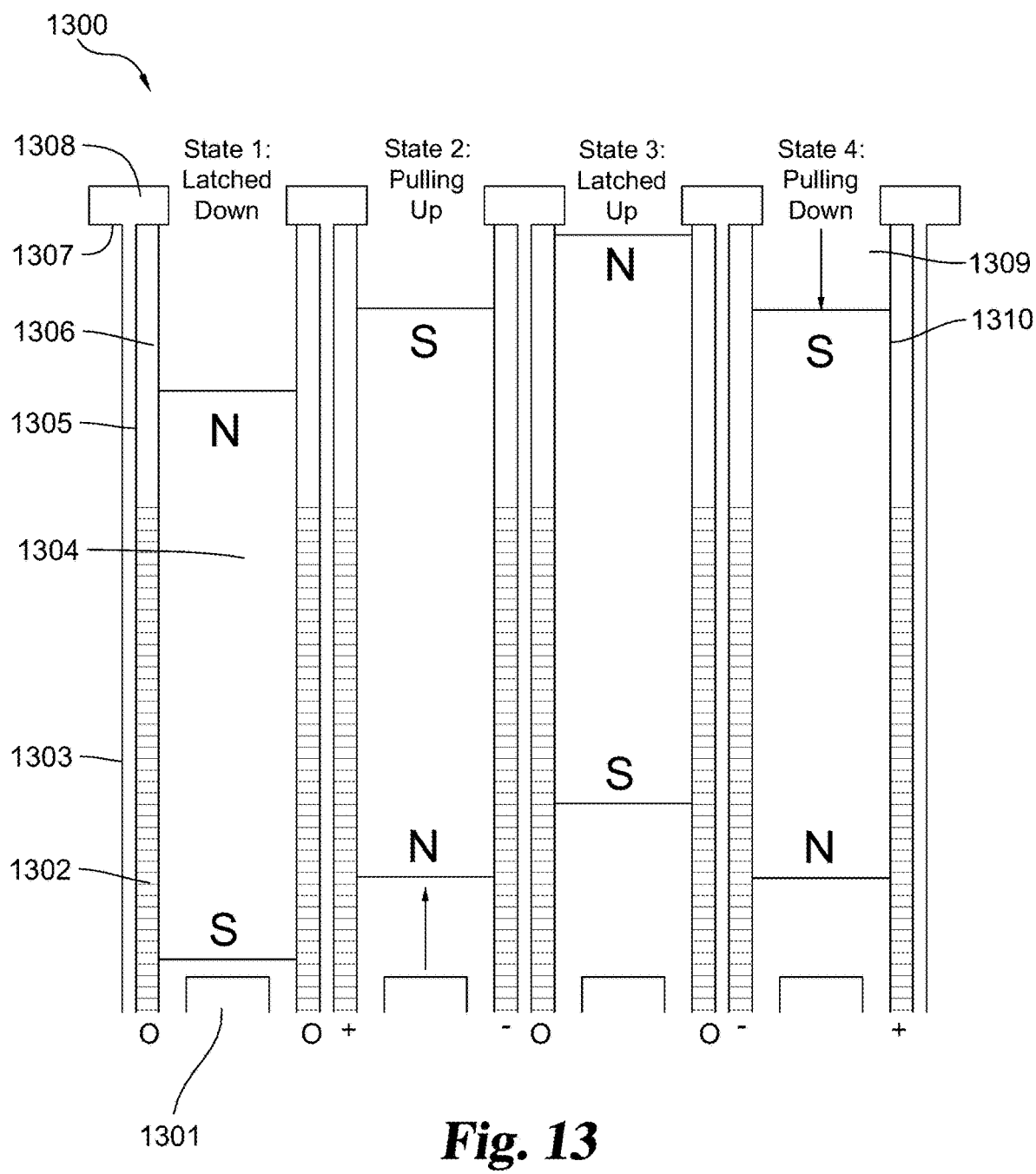
FIG. 13 shows a drawing of a Braille display actuator with energetics.

FIG. 13 shows a drawing of a side view of one embodiment of braille display actuators 1300 and energies comprising steel core or stator 1301, wire coil 1302, steel honeycomb 1303, magnet or actuator 1304, coil-spacer joint 1305, insulating spacer 1306, honeycomb-plate joint 1307, steel top plate 1308, plate-magnet interaction 1309, and magnet friction gap 1310 in various states.

For example, FIG. 13 shows four states, state 1 in the latched down state, state two in the pulling up state, state three in the latched up state, and state four in the pulling down state. State 1 comprises a state where the actuator 1304 is near the bottom stator 1301, and is in a stable state due to the magnetic attraction between stator and actuator. This state comprises a local minimum for potential energy for the actuator. State 2 comprises a state where the coil 1302 is energized with a positive polarity, and the induced magnetic field rapidly accelerates the actuator 1304 upwards towards the top stator 1308 and away from the bottom stator 1301. In the State 2, the actuator 1304 is in a highly unstable state, at a global maximum of potential energy. In state 2, momentum will carry the actuator 1304 through a complete stroke even if the magnetic field from coil 1302 is removed prematurely. If not enough magnetic field is built up by coil 1302, for example due to not enough current being applied, or system geometry, the actuator 1304 will not move or may move up slightly and fall back down. If too much magnetic field is built up by coil 1302 than the actuator 1304 may collide with the top stator 1308 with such force that it bounces back down to the bottom latched position shown in state 1. However, this occurrence may be less likely with the upward motion as the linkage dot serves as a "bumper cushion" to absorb the actuator 1304 impact and may prevent it from actually touching the top stator 1308. Stage 3 comprises a state where actuator 1304 is near the top stator 1308, and is in a stable state due to magnetic attraction between stator and actuator. This state comprises a local minimum for potential energy for the actuator. In most designs for a braille display, state 3 would also be a global minimum for potential energy as the system will be unbalanced to have a large force in the top latched position and a small force in the bottom latched position. This is done to conserve power for the DOWN→UP transition which only needs to overcome the small gravitational attraction on the actuator dot mechanism. However, for the reverse UP→DOWN transitioned the actuator must overcome a much larger force as the system is designed with a significant "hold-up" force to provide a force for the dot assembly to push against the user's finger when reading. State 4 comprises a state where the coil 1302 is energized with a negative polarity, and the induced magnetic field is rapidly accelerating the actuator 1304 downwards towards the bottom stator 1301) and away from the top stator 1308. In all other ways, this is similar to state 2. It may be more likely in this case, that the actuator will strike the bottom stator and bounce back to the top position.

Figure 14:
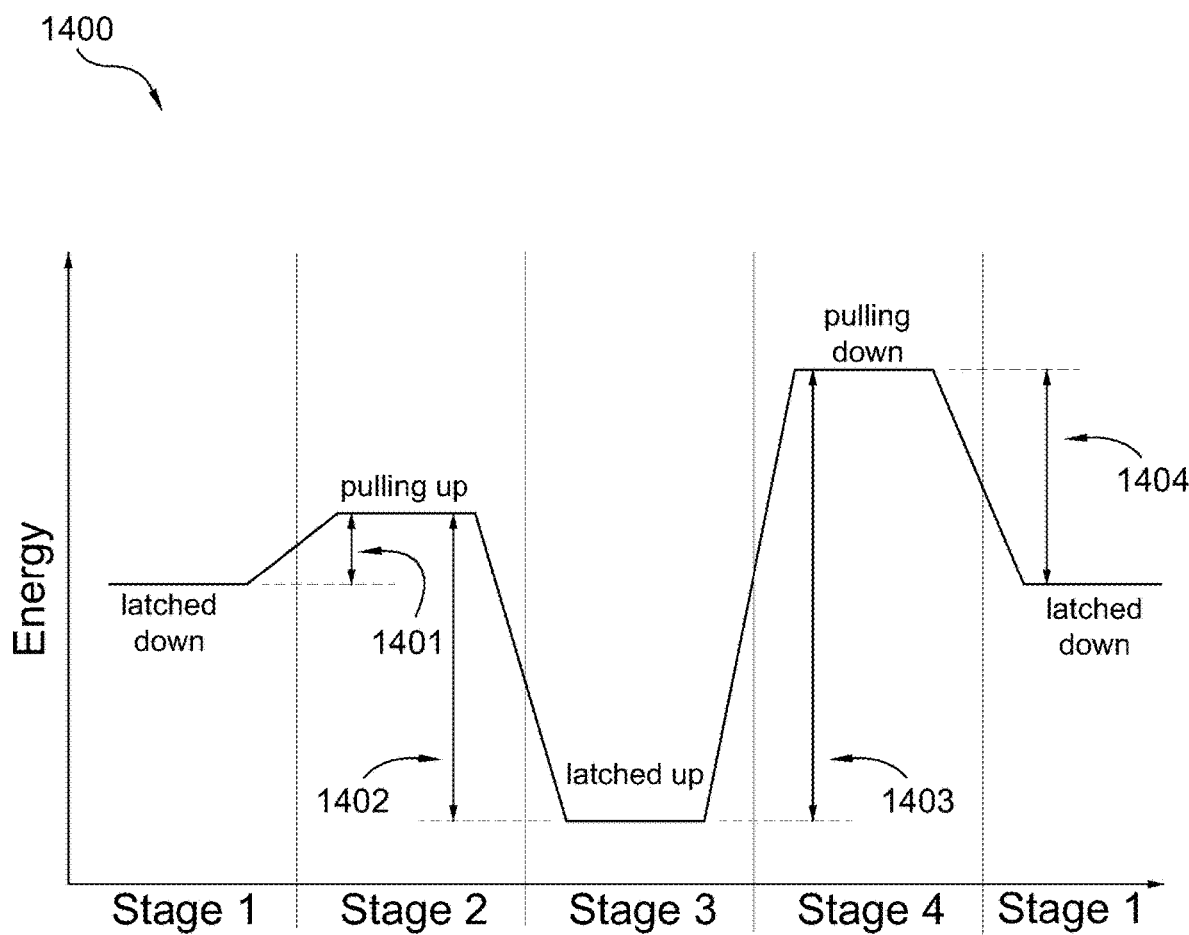
FIG. 14 shows a diagram of a Braille display actuator energetics.

FIG. 14 shows a graph of braille display actuator energies 1400 of various stages and forces including "hold down" force 1401, "pull up" force 1402, "hold up force" 1402, and "pull down" force, 1404. The hold down force comprises the attractive force between the bottom stator and actuator when latched, the pull up force comprises the attractive force between the top stator and the actuator when the actuator is in the middle of a stroke, the hold up force comprises the attractive force between the top stator and actuator when latched, and the pulldown force comprises the attractive force between the bottom stator and the actuator when the actuator is in the middle of a stroke. FIG. 14 shows a cycle of the actuator stature system whereby the actuator starts in stage 1, progresses through stages 2 to 4, and returns back to stage 1. Embodiments of the present disclosure are designed such that the hold up force is significantly larger than the hold down force; this is done in order to provide the best performance, while conserving as much power as possible. Power conservation may be critical in large displays such as full-page braille displays that can require 12,000 individual actuators. A large hold up force provides significant resistance to a user's finger, making the braille human readable, or similar to paper braille. Typically, this force is on the order of 30 g. A small hold down force must simply prevent the actuator from detaching the stator due to the weight of the actuator, which may be less than a gram, shock, shaking, or other mechanical disruption. Typically this needs to be only a few grams in magnitude. Additional force may be wasted as it requires extra energy to transition from stage 1 to stage 2, therefore this force is typically kept as small as practicable.

In some embodiments of the present disclosure the pull up and pulldown forces may be similar in magnitude, but they need not be the same. The pull up and pulldown forces are forces that act on the actuator as it travels past the midpoint of the stroke, leaving the influence of one stator and enters the influence of another. For example, this may occur between stage 1 and stage 2, wherein the coil pulse provides sufficient force to overcome the hold down force and moves the actuator upwards, past the point of no return and out of the influence of the bottom stager. A magnet may continue to move up from the momentum and/or continued magnetic effect from the coil Paul's. A magnet may then enter the area and of influence of the top stator, which pulls it towards the latched position with a pull up force. Such a force may be created by the geometry of the system. Similarly, the pulldown force is the force by which the bottom stator poles on and captures the actuator when it is moving down between stage 3 and stage 4.

Many factors, such as for example geometric factors, affect the four forces as described above, including but not limited to the size, shape, and location of stators, the size and shape of actuators, the materials used for state doors and actuators, the size, shape, location, and material type of the honeycomb, coil electrodynamics, and the overall environment of the system (for example but not limited to temperature, outside magnetic effects, etc.). In designing devices such as the types of devices described herein, small physical changes may cause significant degradation of performance and reliability.

One feature of the tactile displays disclosed in certain embodiments described herein include, for example, that due to the potential energy inherent in the latch mechanism, the display may retain the last displayed text on the page indefinitely, even when power is off.

Figure 15:
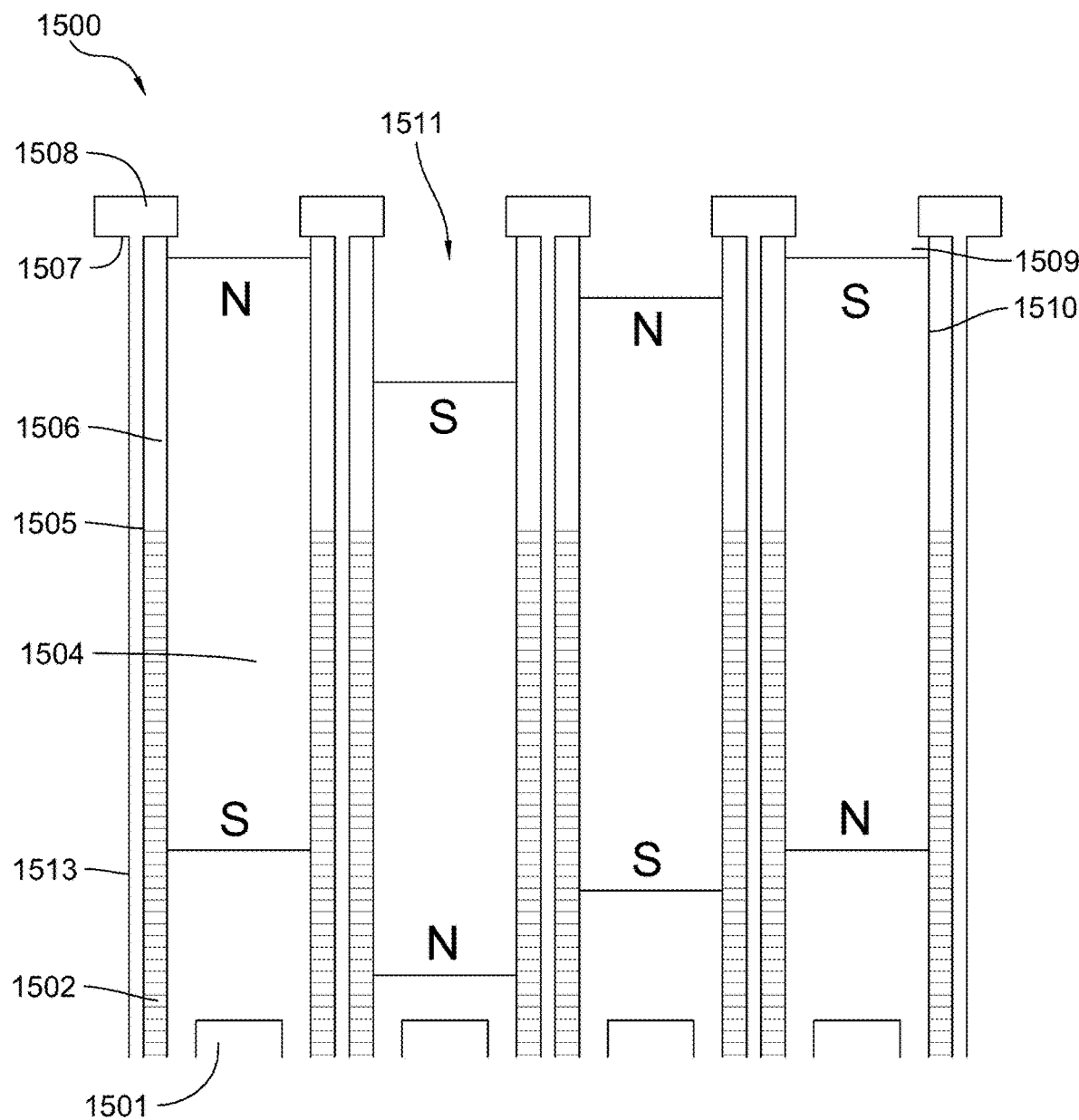
FIG. 15 shows a drawing of a Braille display middle assembly.

FIG. 15 shows a drawing of one embodiment of a braille display middle assembly 1500 comprising steel core or stator 1501, wire coil 1502, steel honeycomb 1503, magnet 1504, coil-spacer joint 1505, insulating spacer 1506, honeycomb-plate joint 1507, steel top plate 1508, plate-magnetic gap 1509, magnet friction gap 1510. In some embodiments, the bottom assembly may have already been assembled with a circuit board, bottom insulator plate and posts, and coils. In certain embodiments, the top assembly may be assembled separately and in parallel with the middle assembly. Any suitable method may be used to assemble the middle assembly, however if the steel top plate 1508 is one piece with the steel honeycomb 1503 then the following procedure is used: magnets 1504 are placed inside the coils 1502 with alternating polarities, such that the magnet sticks out of the top of the coil partly, as shown by reference numeral 1511. The magnet may be attracted to stator 1501 and may rest on top of it, or on top of a plastic sheet, during assembly. Next, the insulating spacer 1506 is placed over the magnet and slid down into contact with the coil, such that the spacer sticks out past the top of the magnet as shown by reference numeral 1511. At this point in the assembly, the integrated honeycomb/top plate structure piece 1503, 1508 can be carefully lowered onto the assembly until the honeycomb 1503 comes to rest on top of the bottom plate, and components 1502, 1504, and 1506 are captured inside the honeycomb/top plate assembly. To lower the honeycomb onto the coils during assembly any suitable method of assistance and/or jigs may be used. However, if the top plate 1508 and honeycomb 1503 are not one piece, but are instead separate pieces, then the assembly process may be different, and the following procedure may be used, for example: first, honeycomb 1503 may be carefully lowered onto the coils 1502. Next, magnets 1504 may be placed into each coil with alternating polarities. This method may comprise certain advantages as the magnets 1504 are shielded from each other by the honeycomb 1503 next, spacers 1506 are placed over the magnets 1502. Finally, the top plate 1508 may be lowered onto the honeycomb 1503 and attached, capturing components 1502, 1504, 1506 inside the honeycomb/plate assembly.

Figure 16:
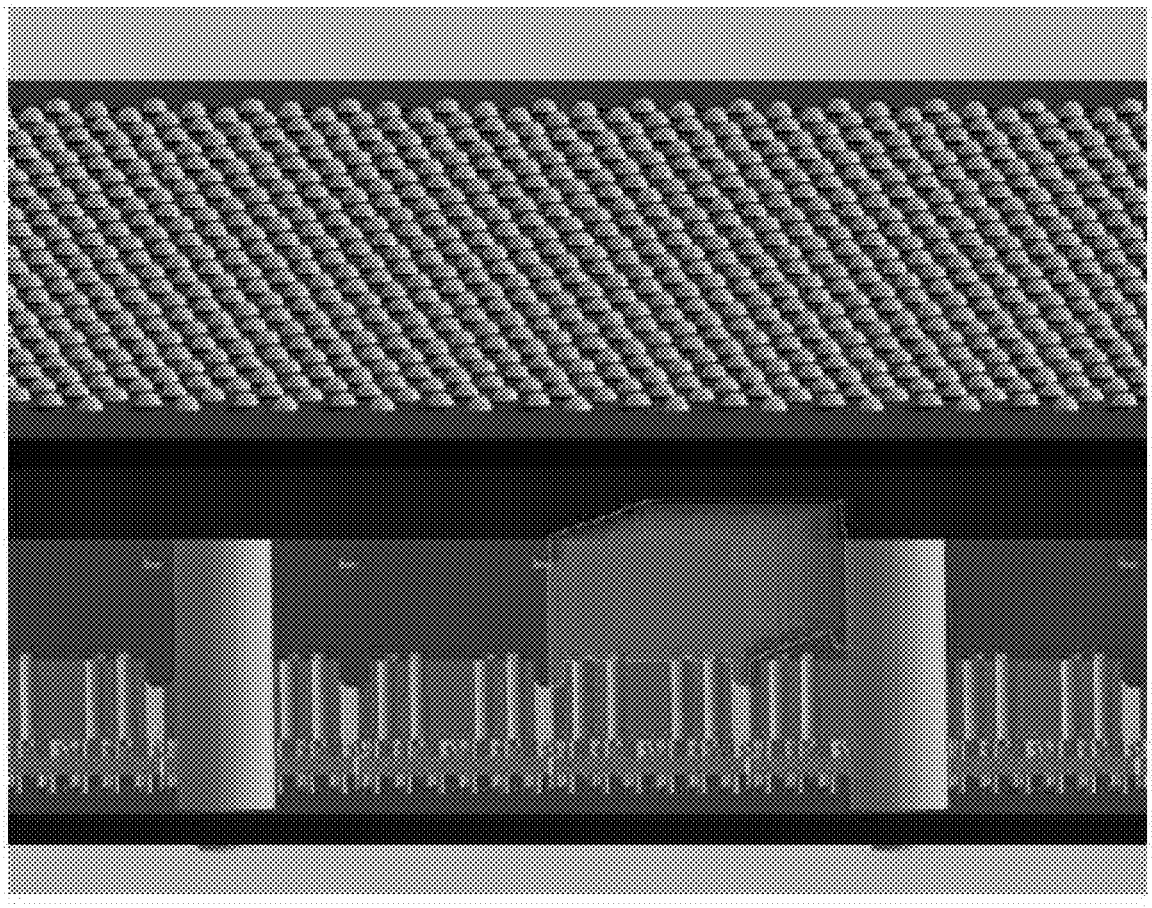
FIG. 16 shows a side view cutout digital image of a rendering of an EMBR display.

FIG. 16 is a digital image of the side view of a rendering of one embodiment of the present disclosure. In this embodiment, the display is contained or sandwiched between two constraining printed circuit boards (PCB) with the top PCB defining holes for the braille dots to pass through. In one embodiment the total height of the sandwich is under 1 inch. In some embodiments, braille cells may be manufactured in small modules consisting of 1 to 4 cells each, however modules may be made in larger groups as understood by one of ordinary skill in the art. For examples, modules comprising 6, 8, 10, 12, 14, 16, 18, 20, 22, and/or 24 cells may be manufactured. Electrical components may be generally placed on or near the bottom PCB and the mechanical components oriented upwards towards the top PCB so as to separate them from the user. In embodiments of the present disclosure dangerous voltages and/or currents are not used, and in some embodiments devices of the present disclosure are fully CE and RoHS compliant. In some embodiments mechanical support elements and/or adhesives may be used to prevent bowing or distortion of the top surface which may act as a touch-sensitive surface.

Figure 17:
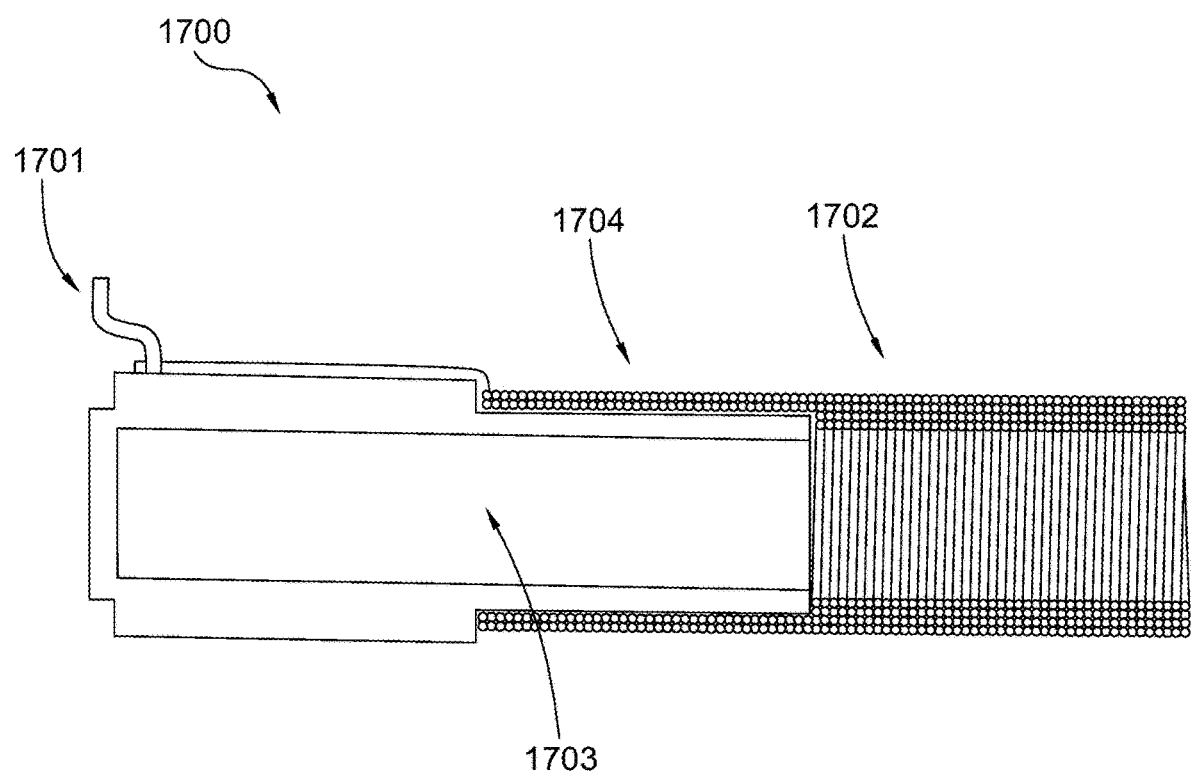
FIG. 17 shows a drawing of a coil used in embodiments of the present disclosure.

One component of the electromagnetic braille readers of the present disclosure include the coil assembly which is used to move the dots up and down. In a full-page device, there could be thousands of coils, and it would be therefore desirable that they can be made quickly and inexpensively. In some embodiments of the present disclosure a machine may be used to wind the coil around a mandrell and coil cup or plastic component may be used to house the motive magnet. FIG. 17 shows one embodiment of a coil 1700 which may be used in embodiments of the present disclosure and comprises leads 1701, coils 1702 and 1704, and core 1703. In some embodiments, the geometry of the coil cup may represent it energetics savings. In preferred embodiments, the design of the actuator is such that the forces applied are symmetric, and wherein the bottom latch must only sustain the weight of the magnet, but the top latch must also sustain the weight of a finger reading the dot. Such forces may be significantly different. By creating a coil with a complex geometry, for example one with partial layers, the coil can produce an asymmetric force when actuated in opposite directions due to the relationships between electricity and magnetism. FIG. 17 shows one region 1704 with two layers of coils, and another region 1702 with four layers of coils. In a coil with four total layers, for example, the actuation force is proportional to the number of turns of the coil, and the subsequent powers used is also proportional to this number. Conventional coils are manufactured such that the wire layers are always full and consistent. Additionally, there are generally an even number of layers (2, 4, 6, etc.) so that the coil winding machine can start at one and, wind to the left of the Mandrell, then to the right, and terminate. This is generally done as an even number of layers so that the leads to the wires are on the same side of the coil. In certain embodiments of the present disclosure any smaller number of turns or windings are used at one side of the coil, as a plastic cup insert may take up space normally taken by the coil windings. This configuration allows the machine to do an even number of layers, but to also have only partial layers. In some embodiments and innermost silver coil layer may extend only part way through a coil and terminate at a plastic cup insert. In some embodiments and outermost silver coil layer may extend all the way through the coil. In these embodiments, the bottom side of the coil may have fewer total windings than are found at the top of the coil. Such an orientation of coils may provide significant energy savings when actuating. For example with a magnet in the down position, a smaller number of turns/windings may be used because the latching force may be smaller-only the weight of a magnet must be overcome. With a magnet in the up position, a larger number of turns/windings may be used to overcome the larger latching force needed to hold against finger pressure. In this manner, the system may be designed to provide an electrical power benefits. Testing has shown that an overall power savings of 30% to 40% may be achieved using this manufacturing method, and such a power savings may be significant when multiplied over thousands of individual actuators per display.

Figure 18:
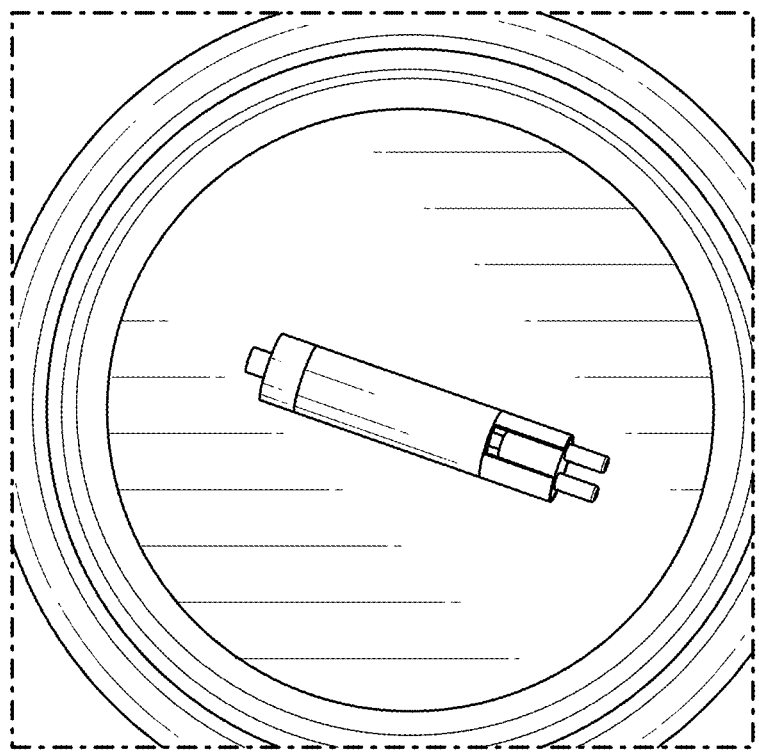
FIG. 18 shows a digital image of a fully wound coil around a bobbin with leads attached to metal posts.

The leads of the coil must be attached to posts of some sort in order to allow for connection to a PCB. Any suitable method may be used, however in preferred embodiments certain advantages may be realized by having the coil machine wind the wire around metal posts which are integrated into the coil bobbin or coil cup, and then solder those leads to the post using dip soldering or other suitable technique. FIG. 18 shows a digital image of one embodiment with coil fully wound around a bobbin and leads attached to metal posts. In some embodiments a custom device may be developed for coil manufacture. Such machines may produce fully assembled coils, soldered and attached to leads, at a rate of thousands per day. In some embodiments of the present disclosure the cost per coil may be low, for example on the order of $0.01 US per coil., The coil may be attached to a coil cup so that other components of the display can fit mechanically as well as have proper electrical shielding and connections. In some embodiments, the coil cup is composed of high temperature plastic, including for example but not limited to PEEK or liquid crystal polymer (LCP), so as to survive the soldering process intact. In some embodiments, the coil cup may also have a sheet metal clip surrounding it to provide shielding to the motive magnet and coil as well as to create the metal post to which the leads may be soldered.

Figure 19:
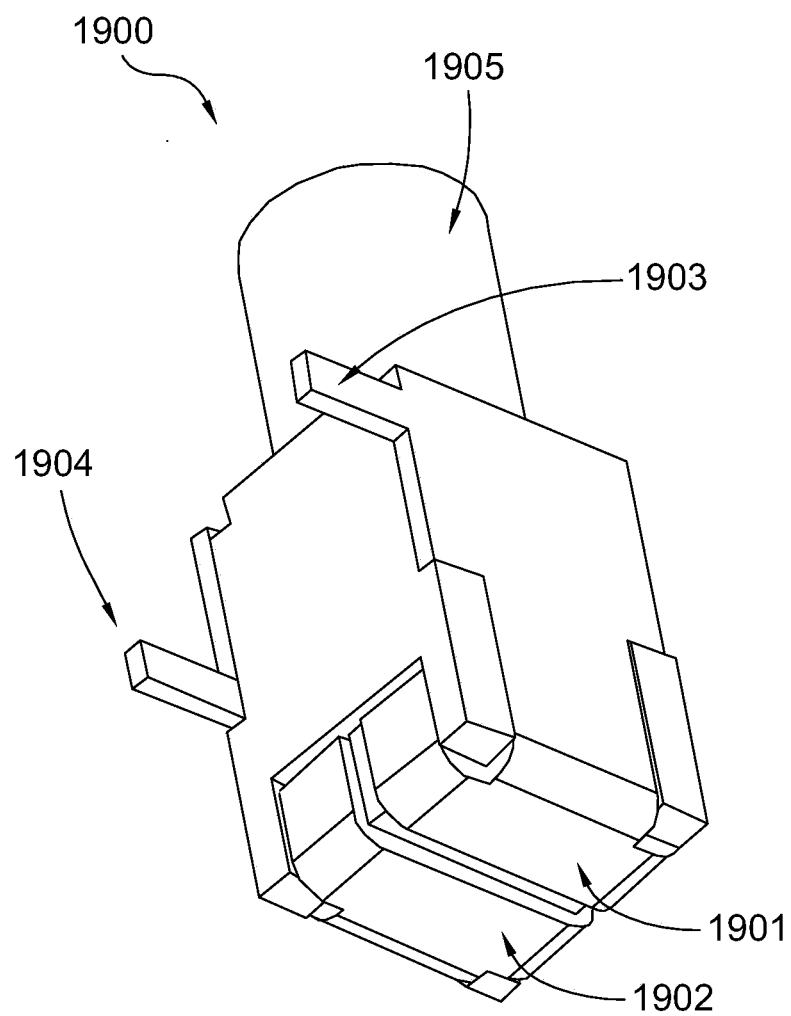
FIG. 19 shows a drawing of a coil cup used in embodiments of the present disclosure.
Figure 20:
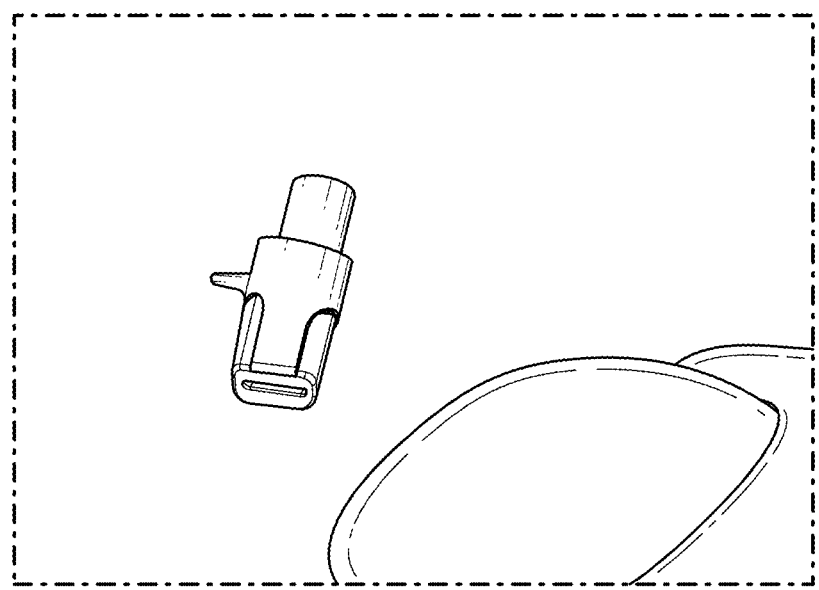
FIG. 20 shows a digital image of a coil cup used in embodiments of the present disclosure.

FIG. 19 shows one example of a coil cup 1900 which may be used in embodiments of the present disclosure. In this embodiment, a coil wraps around the tube-like or cylindrical protrusion at the top of the cup 1905. In this embodiment, the coil may only be wrapped partly around the cup, and some of the coil will have an "air core". Additionally, in this embodiment the metal posts 1903 and 1904 are staggered so as to allow for easy Z axis placement onto a PCB using a pick and place machine. In this geometry the individual leaves do not overlap with each other when being placed. Further, the individual leaves are placed far apart from each other when packed closely so that no shortening between the leads can occur. Additionally, in this embodiment the metal pads 1901 and 1902 at the bottom of the cup may be used to provide for a surface mount (SMT) solder to the main PCB, this allows for the entire device to be assembled using conventional pick and place machines and PCB techniques. The coil cup of FIG. 19 may provide several advantages when used in the devices of the present disclosure. For example, the coil may be carefully positioned so that the geometry of the coil cup, coil, and magnets will allow for the magnet stroke to occur properly. In preferred embodiments the magnet does not leave the boundaries of the coil; it is preferred that the magnet remains with a certain percentage constrained within the coil at all times. Additionally, a magnet may be mechanically constrained on the down stroke in preferred embodiments, so that when actuated down it will stop and latch at the downward position. In preferred embodiments the magnet is constrained on the up stroke by the top braille dot assembly and post plates. Furthermore, when used, a sheet metal clip may provide sufficient magnetic shielding to protect the energetics of the coil-magnet assembly, and to prevent unwanted actuations when neighboring magnets are actuated. FIG. 20 shows a digital image of a coil cup after manufacture. In some preferred embodiments, the coils and/or coil cups may be produced in packs, preferably in packs of eight coils or six coils, which would represent one braille cell 2100 as shown in the drawing of FIG. 21.

Figure 21:
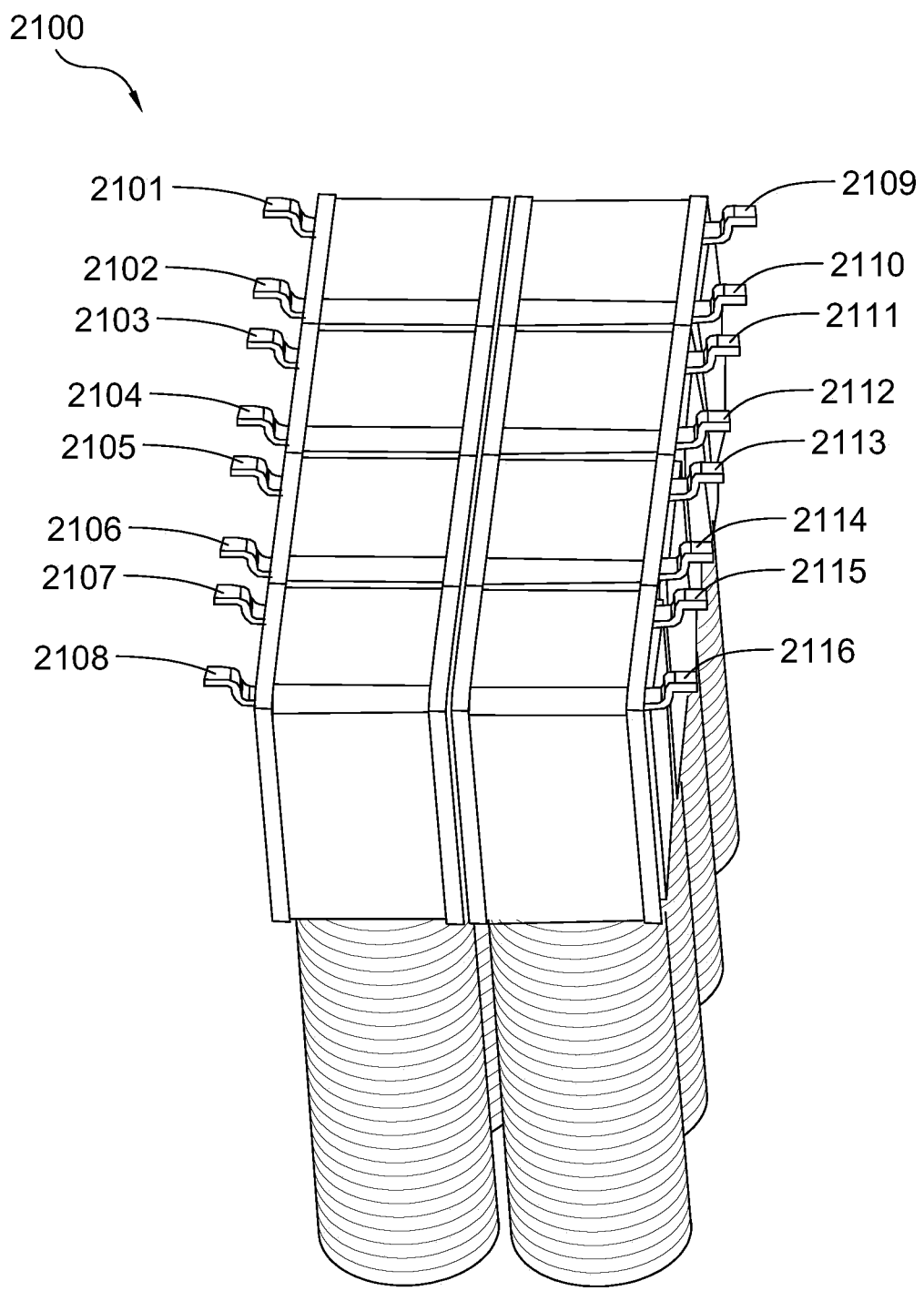
FIG. 21 shows a drawing of a coil pack assembly as used to form one unit of a Braille cell.
Figure 22:
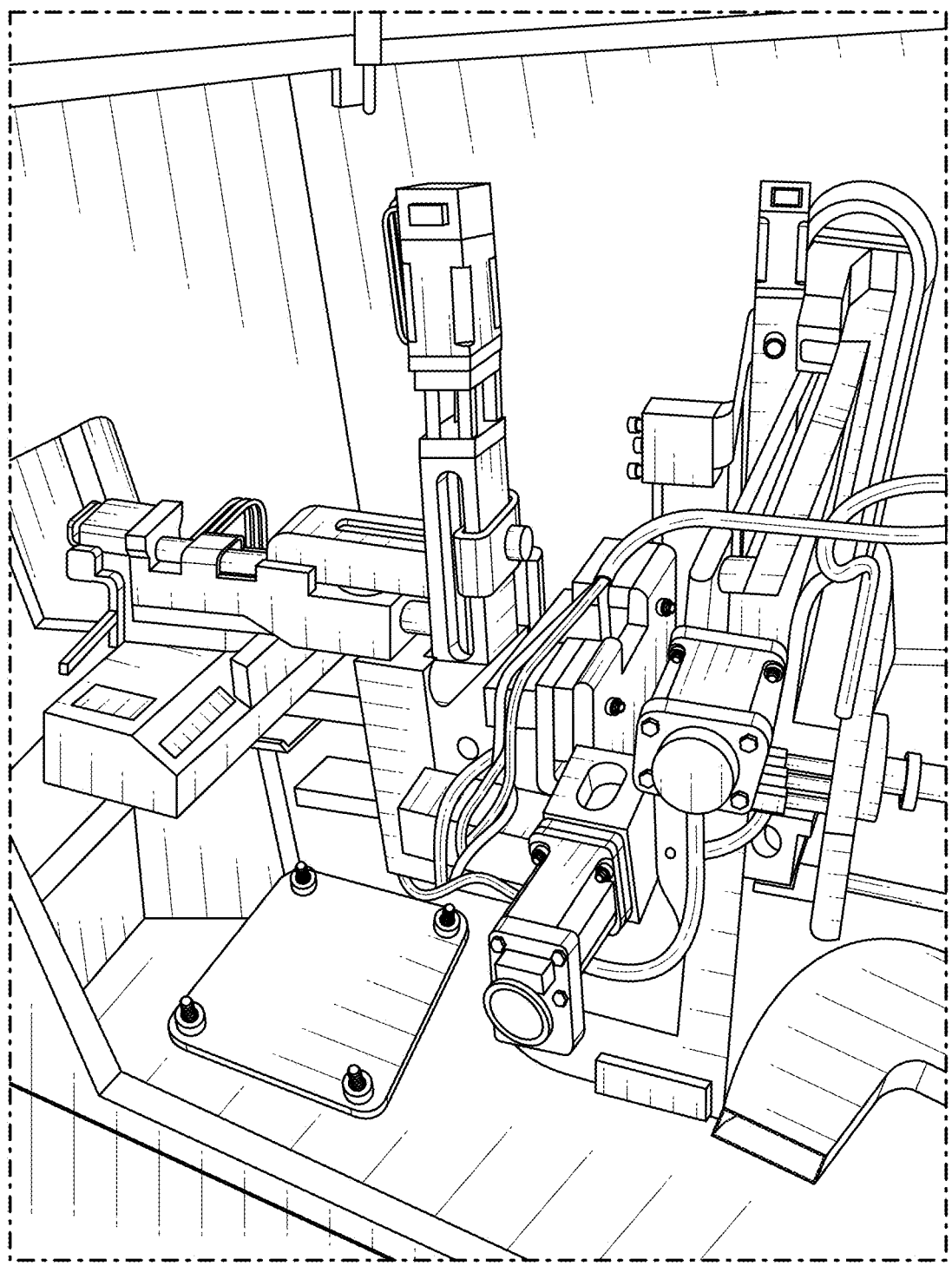
FIG. 22 shows a digital image of the front view of an open coil assembly machine.
Figure 23:
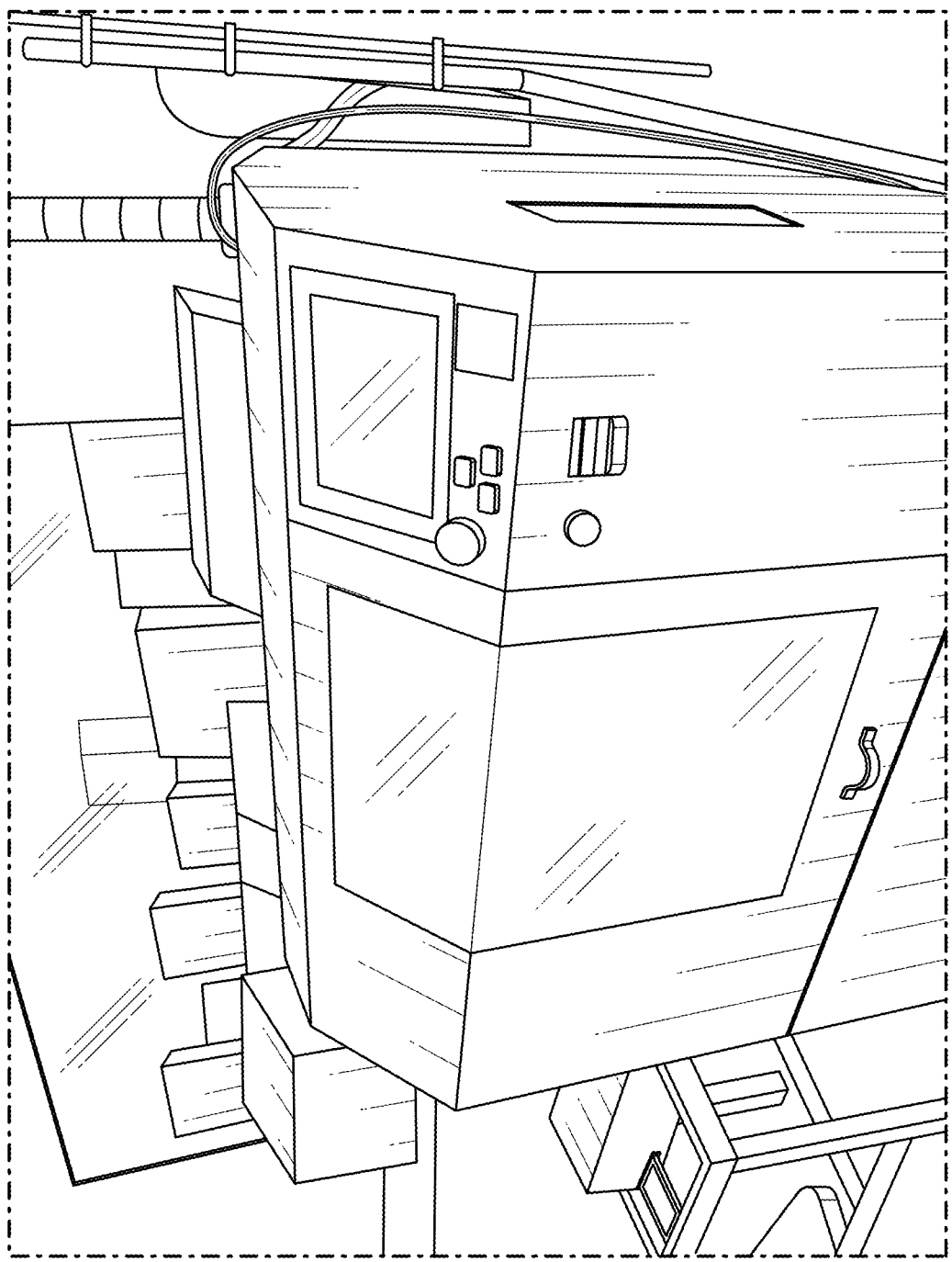
FIG. 23 shows a digital image of the front view of a closed coil assembly machine.

FIG. 21 shows one embodiment of a braille cell 2100 comprising eight coils in a coil pack assembly which form one unit braille cell. Braille cell 2100 comprises leads 2101, 2102, 2103, 2104, 2105, 2106, 2107, 2108, 2109, 2110, 2111, 2112, 2113, 2114, 2115, and 2116 which may be used to solder the braille cell to a PCB. Coil assemblies, such as those used in the braille cell 2100 of FIG. 21 may be mass produced using conventional machining and automation techniques, for example a machine has been developed that creates the coil from wire, bonds it to the coil cup assembly, winds the coil around the metal leads, and solder the leads. This results in a complete package that is surface mount ready for automated assembly on a PCB, for example as shown in the drawing of FIG. 21. FIG. 22 and FIG. 23 shows a digital image of one such machine used to manufacture coil assemblies for production. These such coil assembly machines are designed to run that closed to eliminate issues with exposure to chemicals used in conventional dip soldering. Such machines start with specialized insulated copper coil wire, and winds the individual coils. Coils may be wound around a plastic coil cup insert, so that the finished product is preassembled. Each coil may take several feet of wire to wind due to the multiple layers of wire packed tightly together. The ends of a coil wire may be wound around the metal leads of the coil cup assembly. Coils may be then heat bonded so that they retain shape and the leaves remained mechanically fixed. Furthermore such machines may solder dipped the leads, which penetrates the wire insulation, so that the coil wires are electrically connected to the leads. At this point the entire package can be utilized on a PCB, for example using a surface mount soldering although through hole pins may also be utilized.

In other embodiments, a larger combination of coils may also be used. For example a pack comprising 32 coils may be used to form a four-cell module. These larger coil packs have the advantage of being easier to assemble and place when integrating them into a final device. Furthermore, in such embodiments assembly time may be reduced by soldering multiple leads en masse as opposed to soldering individual leads. In some embodiments dip soldering may be used, and in other embodiments wave soldering techniques can be used. One additional feature that larger coil packs may provide includes better structural support which may reduce problems due to individual coils bending or breaking during assembly. Depending on the specifics of the cell module, assembly may be completed by hand, or be completely automated.

Figure 24:
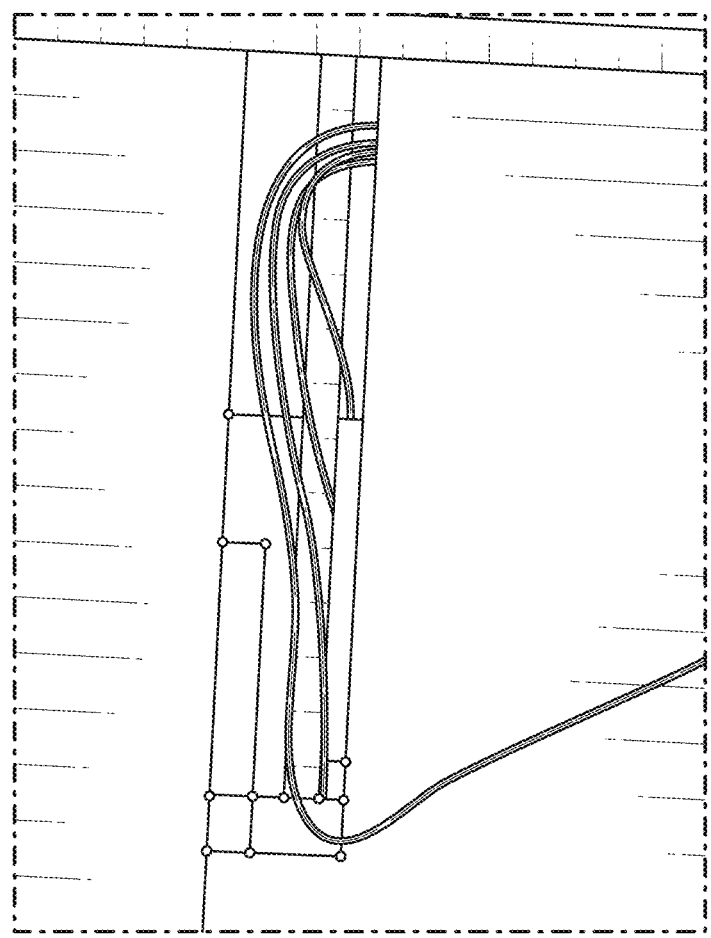
FIG. 24 shows a digital imaging of a simulation of a shielding assembly coupled to a coil magnetic assembly as viewed from the side.

In additional aspects of the present disclosure shielding may be used between parts. For example, in order to ensure proper magnetic shielding between dots, a shielding assembly may be used. In certain embodiments, the shielding assembly can be divided into two parts, the so-called a honeycomb, which exists between coils and an array and the core plates, which exist only on one side or the other (i.e. above or below) of the coils in an array. In certain embodiments, the purpose of the shield is to couple the magnetic fields coming out of the coils and the magnets in such a way as to effectively isolate each magnet-coil assembly from any nearby assemblies. This prevents power loss, inadvertent actuation, and may also help to reduce the overall net magnetic field of a device to near zero, which may be an important requirement for CE and/or other consumer certifications. In some embodiments, magnets are placed in our array with alternating polarities to cancel each other out as a net effect; when such a geometry is taken together with proper shielding, the overall magnetic forces may be reduced to zero or near zero. FIG. 24 shows a digital image of a magnetic simulation of shielding assembly coupled to a coil magnetic assembly as viewed from the side. FIG. 24 shows a strong coupling of the field lines to the shielding components, which prevents straight magnetic lines from accidentally coupling to undesired components or in general, causing interference with coil-magnetic performance. An additional aspect to a shielding assembly, when used, is to provide the bistable latching mechanism for the magnetic actuator so that it can remain secure in the up or down position. This may be accomplished by the use of core plates (top and bottom) which provide an asymmetric latching force; the top latching force is significantly higher than the bottom latching force (approximately 25 g versus 8 g in one embodiment). This is partly because, at small distances such as those experienced in a braille display, the electromagnetic forces are about 1035 times stronger than the gravitational force. Hence, in the top latched position, the magnet may resist the finger pressure of reading it out; however, in the bottom latched position, the magnet may only resist the force of its own weight due to gravity.

As used herein, honeycomb generally for refers to a matrix of shielding material, preferably non-ferrous metal in nature, that is situated between the coil-magnet assemblies such that the magnetic fields of adjacent coil-magnet assemblies coupled to the honeycomb shield, as opposed to each other. The geometry of the honeycomb can be similar to that of a beehive, and the purpose of the honeycomb is to provide the majority of the magnetic shielding between adjacent magnets and coils. However, other geometries and/or materials may be used in the honeycomb, for example but not limited to, noncontiguous, regularly spaced metal posts may be used in lieu of a solid honeycomb matrix in certain embodiments. Simulation and testing has shown that noncontiguous honeycomb assemblies may be useful for shielding as the equivalent contiguous matrix. In certain aspects noncontiguous honeycomb assemblies may be preferred for several reasons. First, a noncontiguous approach results in the use of much less material. The use of less material saves weight for the overall device, which may be a consideration for portable versions of devices of the present disclosure. Second, the use of less material may reduce cost, which is an important factor for larger displays of the present disclosure. Additionally, noncontiguous honeycomb assemblies may be easier and quicker to manufacture; for example, post assemblies may be completely automated using conventional manufacturing techniques and do not require slow, expensive milling of larger blocks of metal. Milling of a large metal block for the honeycomb may also result in an increase of wasted material, which may have cost. This milling must generally be done slowly and with care, as some of the center walls of a contiguous honeycomb can be as thin as 0.002 inches in certain embodiments which requires precision and care to successfully machine in quantity.

As used herein, core plate or core plates refer to metal plates located on either side of a coil, either above or below, which allows the magnets in a magnetic core to attach or latch to in either state of the bistable latched assembly.

Figure 25:
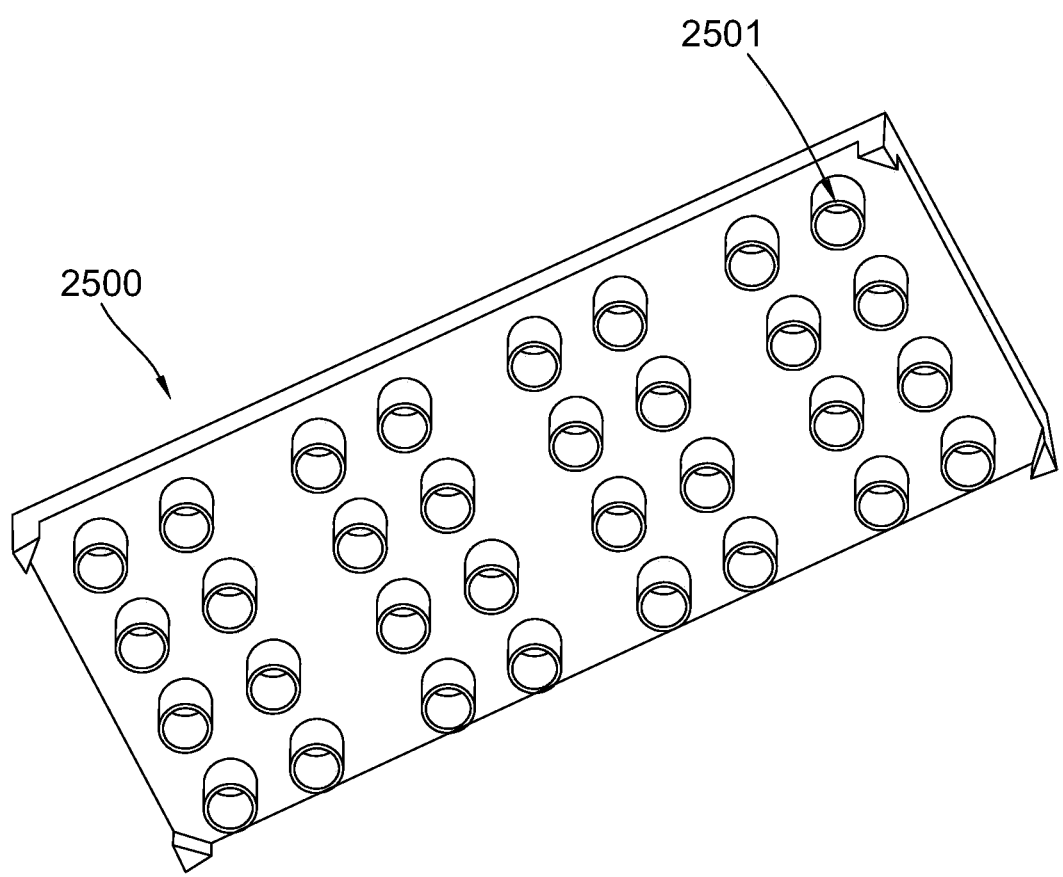
FIG. 25 shows an underside of a top core plate comprising four Braille cells as used in some embodiments of the present disclosure.
Figure 26:
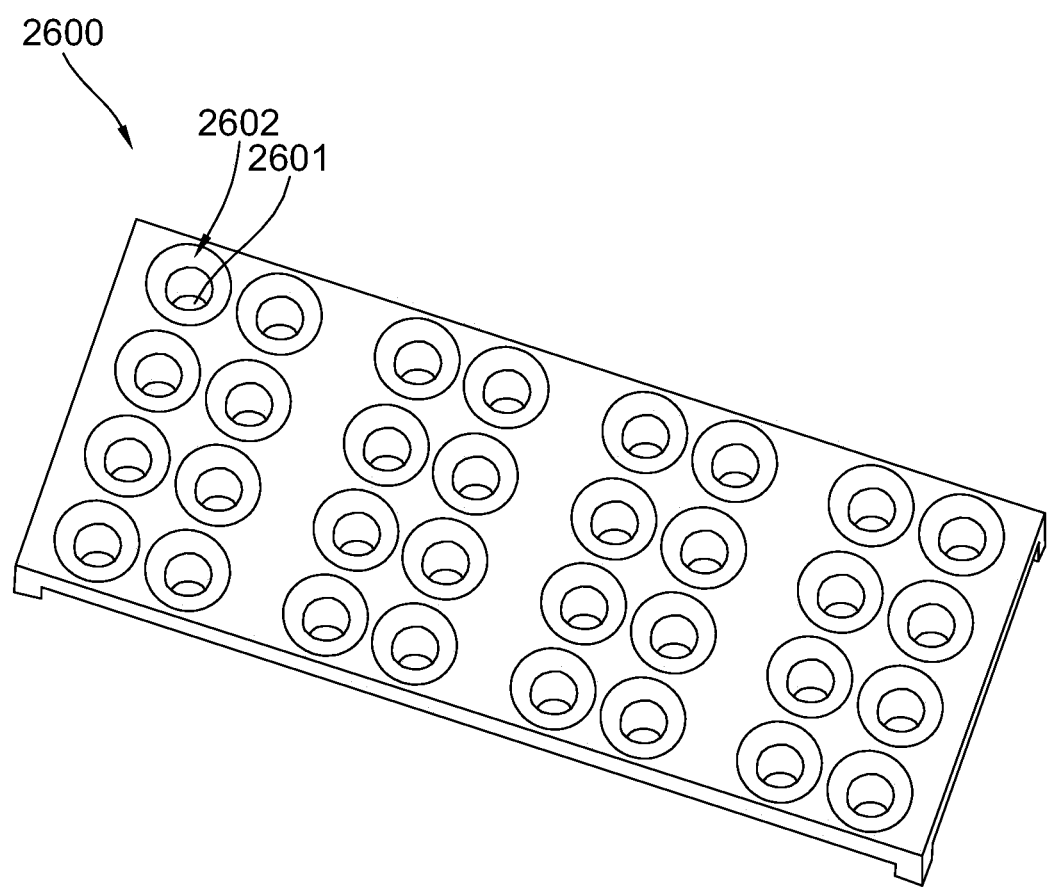
FIG. 26 shows a top surface of a top core plate comprising four Braille cells as used in some embodiments of the present disclosure showing chamfered holes.

As used herein, a top core plate is used on the top side of an array of coils, and a core plate is designed such that the magnet will latch with a higher magnetic force such that the braille dots (which is slidably located above a magnet, and mechanically connected to it or in mechanical communication with it) will resist the finger pressure of reading. In preferred embodiments, and for latching effect, a magnet may be able to pass partially through the core plate such that it can coupled to the flat portion of a plate, closer to flush with a surface of the plate. The top surface of the top core plate may also be chamfered such that, when combined with the braille dot assembly, the magnet will be mechanically stopped such that it comes to rest slightly below the top surface of the plate. FIG. 25 shows a drawing of the underside of a top core plate 2500 of one embodiment of the present disclosure comprising a module of four braille cells. In other embodiments, the top core plate may comprise all of the modules of braille cells in a display. Top core plate 2500 defines one or more openings 2501 where a magnet can reside or pass. FIG. 26 shows the top surface of a top core plate 2600 of one embodiment of the present disclosure defining an opening 2601 where a magnet can reside or pass, including a chamfer 2602 used in some embodiments of the present disclosure.

Figure 27:
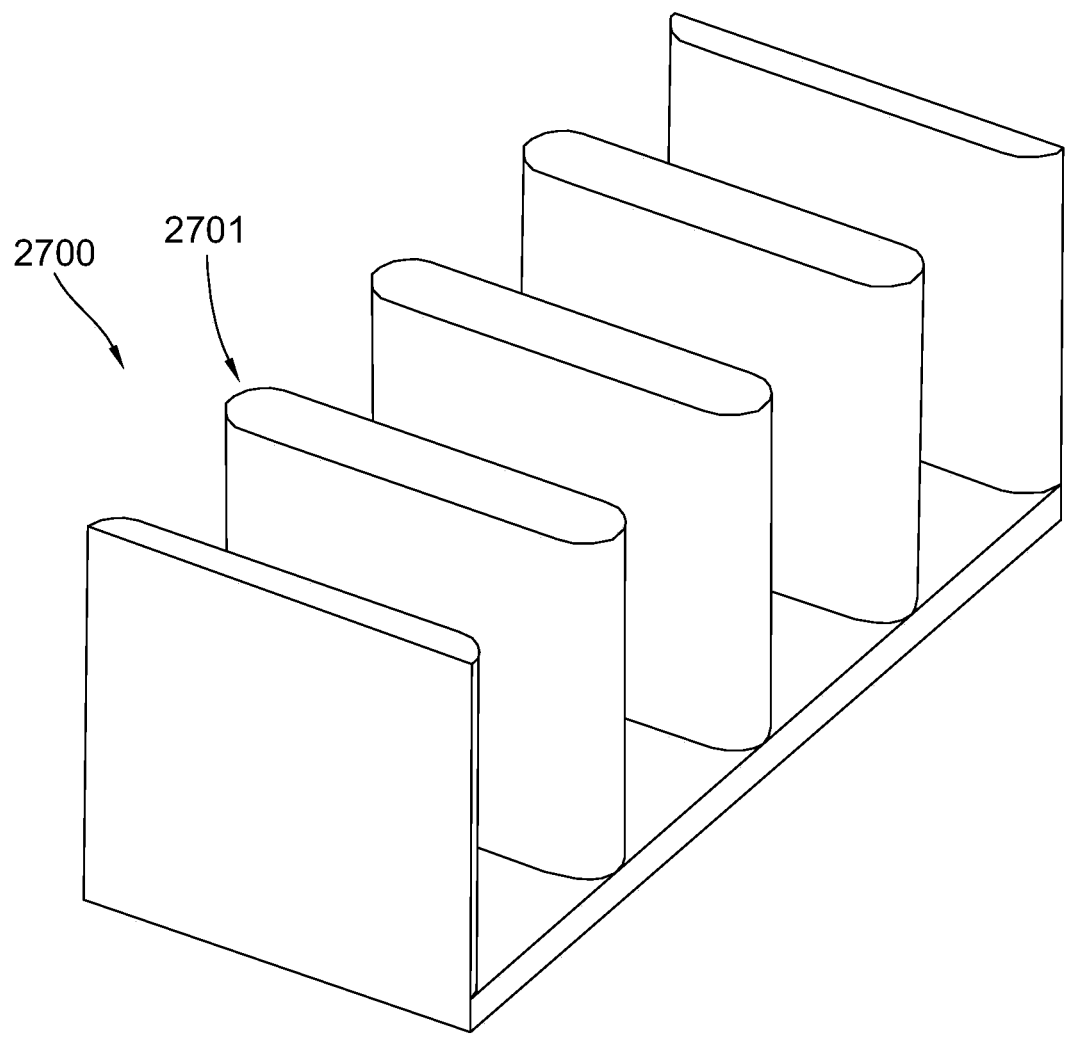
FIG. 27 shows a drawing of the top front view of a bottom core plate.

In some embodiments, on the bottom side of an array, the core plate is designed such that a magnet will latch with a lower magnetic force and such that the magnet will remain latched against the weight of the magnet itself, and be resistant to mechanical shaking or external forces. In certain embodiments, for the best latching effect, a magnet may be able to pass partially through the top of the bottom core plate, part way through, but not in contact with the bottom of a core plate. This is accomplished by the use of a plastic spacer which also serves as a structural element and affords a smooth channel for a magnet to pass through. FIG. 27 chose one embodiment of a bottom core plate 2700 used in certain devices of the present disclosure comprising structural element 2701.

Figure 28:
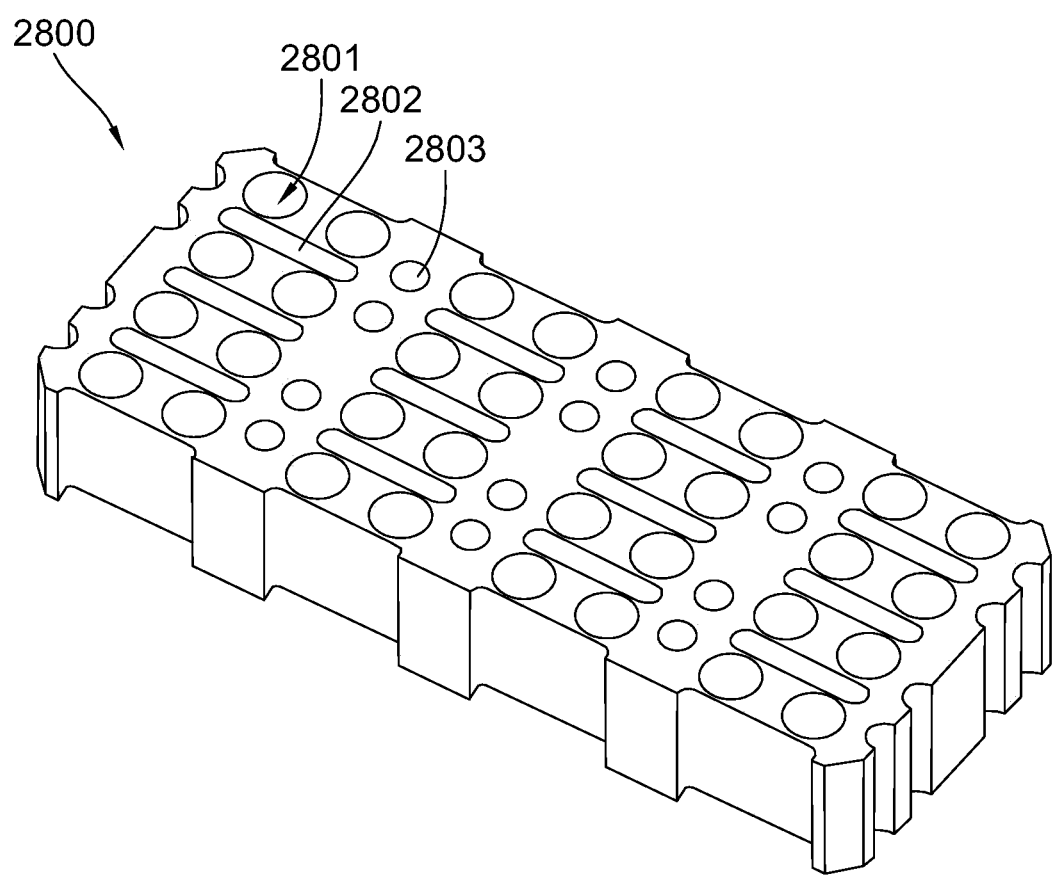
FIG. 28 shows a drawing of the top view of a plastic spacer with magnet and coil wire holes.
Figure 29:
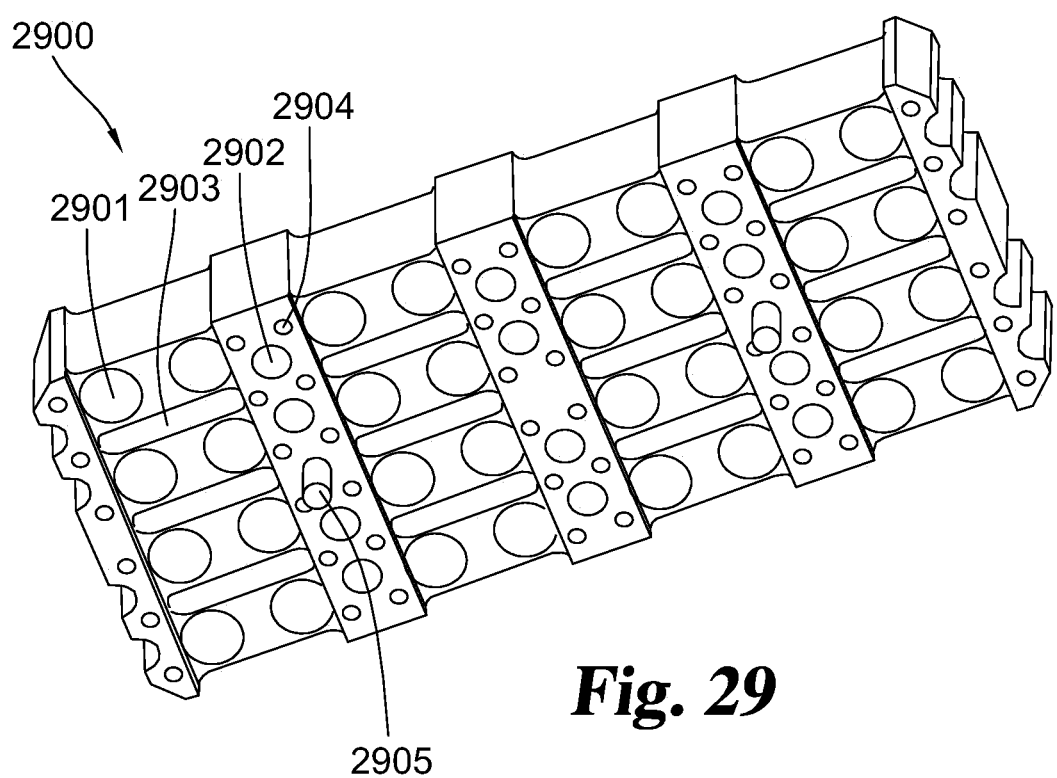
FIG. 29 shows a drawing of the bottom view of a plastic spacer with magnet, coil wire, colloidal lead, and bottom core plate holes.
Figure 30:
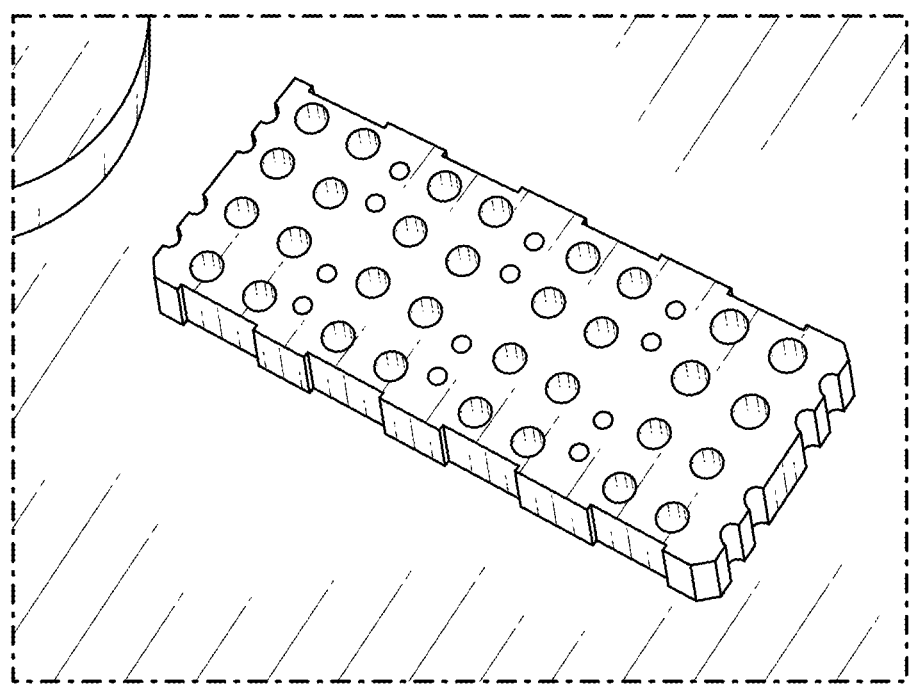
FIG. 30 shows a digital image of the top view of an assembled plastic spacer and bottom core plate.
Figure 31:
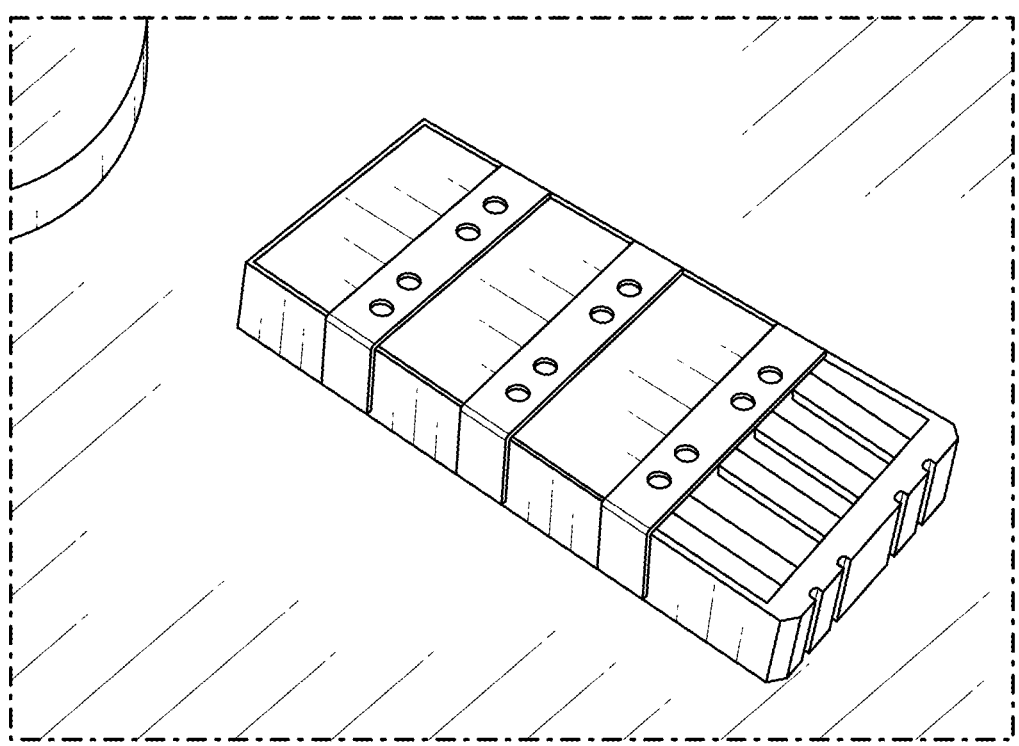
FIG. 31 shows a digital image of the bottom view of an assembled plastic spacer and bottom core plate.
Figure 32:
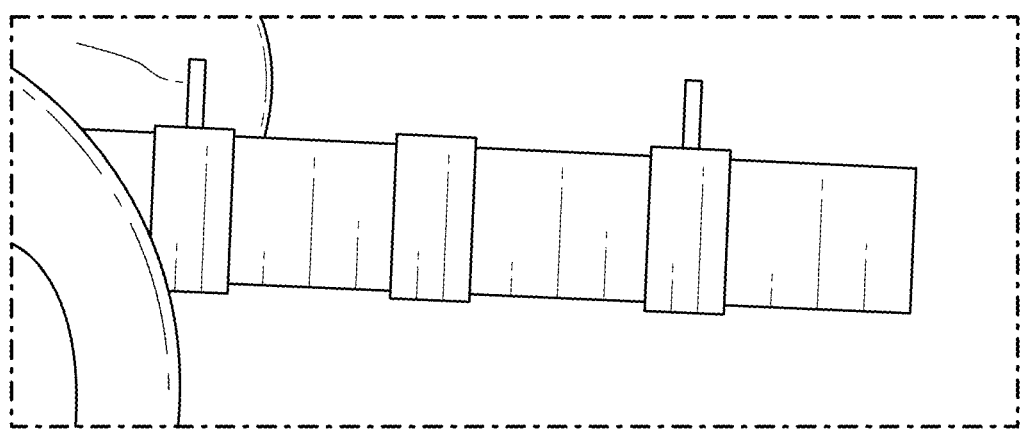
FIG. 32 shows a digital image of the side view of an assembled plastic spacer and bottom core plate.

In certain embodiments of tactile devices of the present disclosure, a plastic spacer may be used to provide a cuplike structure for a magnet to couple into the bottom latched position. In certain embodiments, the plastic spacer provides an important structural and mechanical component to the shielding assembly. The plastic spacer may be comprised of individual coil cups, as described above, or as one continuous piece as shown in FIG. 28. FIG. 28 shows one embodiment of plastic spacer 2800 defining one or more openings 2801 for a magnet to pass through. Opening 2801 provides a space for a magnet to pass through, and in preferred embodiments opening 2801 provides a smooth channel for the magnet to pass through when moving and/or latching although a magnet will self centered when electric current is applied to a coil, some mechanical contact with the side of the channel may occur, therefore making it desirable to use a smooth plastic part for this role. Plastic spacer 2800 also defines openings for wires of coils, which may rest on the top surface of the plastic spacer in order to attach metal leads which are inserted into a PCB. Plastic spacer 2800 also defines an opening 2802 where the bottom core plate may be inserted, providing shielding and latching needed on the bottom side of the assembly. FIG. 29 shows the bottom side of a plastic spacer 2900 defining one or more openings 2901, 2902, 2903, 2904. Opening 2901 may define a space for a magnet to pass through, opening 2902 may provide an opening for coil wires to pass through, opening 2904 may provide an opening for metal leads, such as small metal pins, to be inserted, and opening 2903 may provide a slit like hole for the bottom core plate to be inserted into, which provides shielding and/or latching for the bottom side of the assembly. Plastic pin 2905 may be used to mechanically align certain components, including, but not limited to a PCB for assembly. FIGS. 30 and 31 show digital images of an assembled plastic spacer and bottom core plates together, which are used in certain embodiments of the present disclosure. FIG. 32 shows a digital image of unassembled plastic spacer and bottom core plates along the side view showing alignment pins useful for mechanically aligning certain components for assembly.

Any suitable manufacturing technique may be used to manufacture and/or assemble elements of the present disclosure including the shielding parts, for example the honeycomb and/or core plates. In one preferred embodiment, machining of a proper material using a conventional CNC mill or equivalent machine may be used. In certain embodiments 1018 steel has been used for the honeycomb and core plate components. However, alternative methods of manufacturing may be utilized to create the complex parts which could save time, cost, and were additional assembly steps. One example of an alternative manufacturing method includes, but is not limited to metal injection molding with centering. Metal injection molding with centering allows for a complex part to be molded as one continuous piece. Other examples of suitable manufacturing techniques include laser cutting, laser jet cutting, and/or 3-D metal printing.

In one embodiment use of a plastic binder/metal slurry mix (metal filled polymer) without centering may be used. Binder is typically removed in the sintering process and is typically provided only to hold the shape of a part before centering. However, there is no reason that a binder cannot be left in place, and used as a permanent structural element. This would allow the part to be injection molded, which may be preferable when manufacturing a large quantity of parts, but also to retain the shielding qualities needed from a conventionally machined metal part.

Plastic spacer parts, and/or plastic cups, may be manufactured out of high temperature plastics, so that soldering and other later assembly techniques will not deform or damage the part. For example in one embodiment, PEEK plastic was used. In some embodiments, for the individual coil cups, liquid crystal polymer (LCP) was used. LCP exhibits a highly ordered structure in both the mouth and solid states. LCP may replace such materials as ceramics metals composites, and/or other plastics because of its outstanding strength and extreme temperatures and resistance to virtually all chemicals, weathering, radiation, and burning.

The braille dot assembly used in devices of the present disclosure may comprise a braille dot pin, a top braille dot capture plate, and/or a bottom braille dot capture plate. In certain embodiments, the braille dot assembly may optionally comprise a separate layer for easy removal and maintenance to remove finger debris, dander, dirt, or other undesired material. Braille dot assemblies used in embodiments of the present disclosure may also optionally include one or more sound dampening components. In certain embodiments, the primary purpose of the braille dot assembly is to mechanically capture and constrain the braille dots, and/or other parts it is mechanically connected to (such as, but not limited to, a magnet). Additional uses of the braille dot assembly may also include support for touch sensitivity, touch control, and/or sound dampening.

Devices of the present disclosure may comprise one or more braille dot capture plates. The top and bottom braille dot capture plates may be used to mechanically constrained the motion of a braille dot to allow for a smooth actuation and prevent movement of other parts passed critical dimensions in certain embodiments. The geometry of the dot capture plates, along with the shielding assembly geometry, may be crucial to determining the dot stroke length, and the latching forces on the top and bottom sides of an actuator. In one embodiment, the bottom braille dot capture plate is situated adjacent to the top core plates and is used to mechanically stop braille dot pin on the down stroke. In some embodiments, optionally, the bottom braille dot capture plates may also be the top core plate itself. In other embodiments, sound dampening material or agents such as foam or rubber may be used in various locations around the bottom capture plate to provide sound dampening on either side of dot motion.

Figure 33:
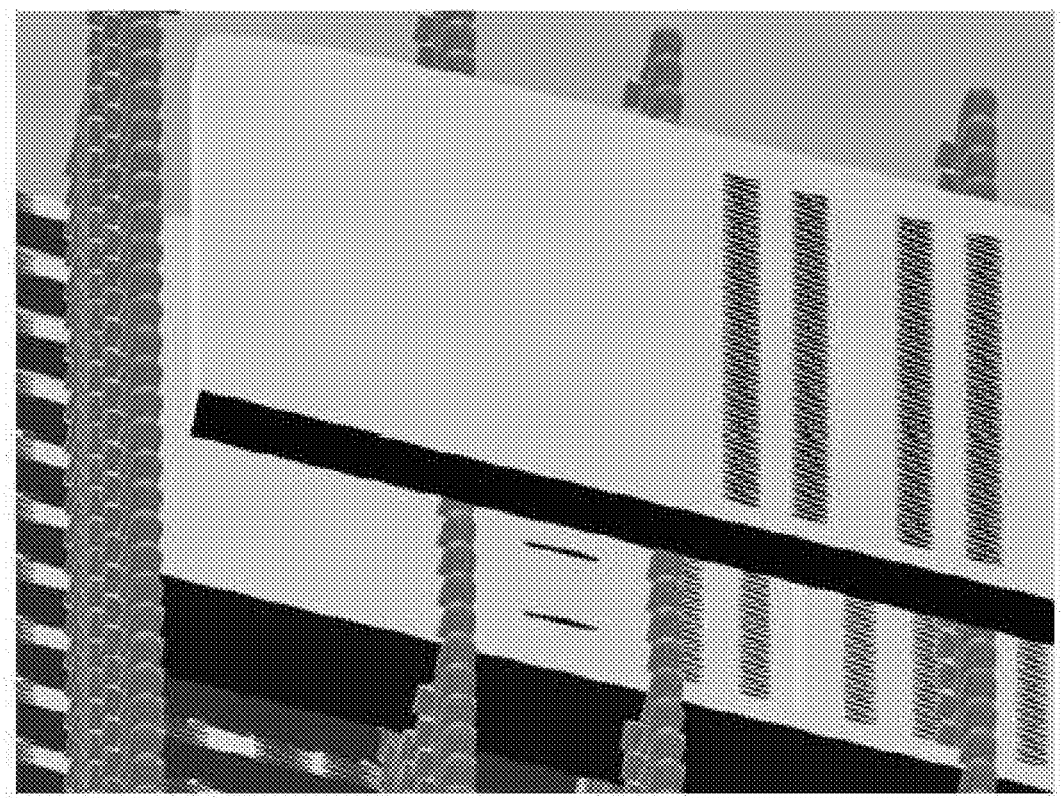
FIG. 33 shows a digital image of an exploded view of a rendering of one embodiment of the present disclosure showing the top and bottom capture plate with pins.

A top Braille dot capture plate may be the last component of a braille display before the user's finger in certain embodiments. In some embodiments, the top capture plate constrains the dots from falling out of the display or from actuating too far past the stable magnetic latching point and the stroke length of a dot is carefully set by the gap between the top and bottom capture plates. The bottom motion of a dot is constrained, such that the tip of a dot disappears just below the surface of a display. The top motion of the dot is likewise constrained so that the dot height is the desired height. Certain Braille specification may specify the desired dot height, for example, 0.018 inches to 0.025 inches. The top braille dot capture plate may optionally include components for touch sensitivity, or sound dampening. FIG. 33 shows a digital images of an exploded view of an engineering render of the top and bottom dot capture plates with dot pins.

The top mechanical stop is also important in that the motion of the magnet at the top latching position is constrained by downward pressure of the dot pin, which protrudes through the top core plate. In this way, the final resting position of a magnet in the top latched state can be precisely set, which controls the latching force to some degree.

In certain embodiments of the present disclosure, typical capture plate gap sizes, and subsequent stroke lengths can range from 0.010 inches to 0.050 inches or more depending on the desired height. In preferred embodiments a gap length of 0.025 inches was used. Conventional braille displays using the piezoelectric actuation do not constrain dot motion on both sides, rather, they constrain only the upward motion of the dot to prevent dots from falling out of the display. The downward motion of the dots using these piezoelectric actuators is resisted by pressure of the piezoelectric bimorph lever, which is fragile and creates a leakage power draw when resisted by finger pressure.

Figure 34:
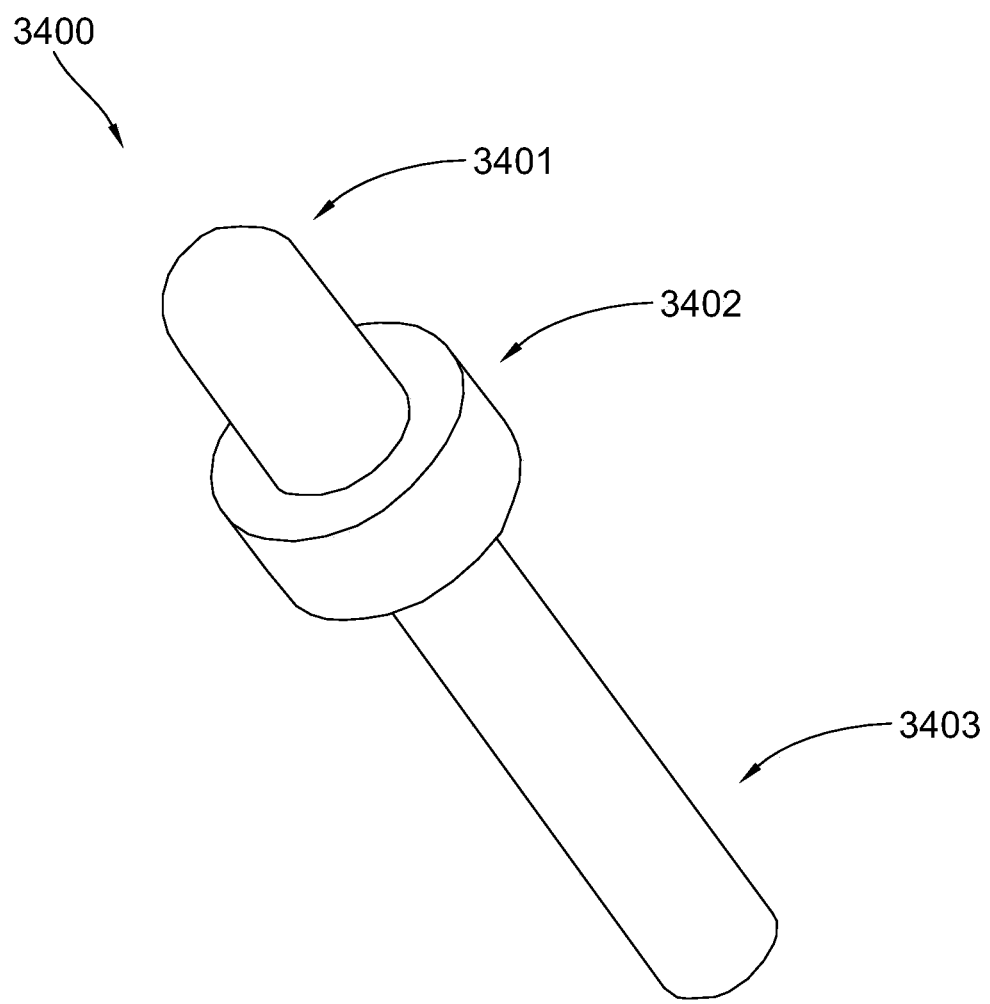
FIG. 34 shows a drawing of a Braille dot pin as used in some embodiments of the present disclosure.

The braille dot pin used in embodiments of the present disclosure may be designed with a rounded top, similar in size and shape to a braille dot. The braille dot pins used in embodiments of the present disclosure also has a collar, which can be of varying diameter, but which must be larger than the holes in the capture plates. The length of the shaft of the braille dot pin can also vary, but must be long enough to pastor the top capture plate and be in mechanical communication and/or contact with the magnet during actuation. FIG. 34 shows one embodiment of a braille dot pin 3400 of the present disclosure, comprising a rounded top 3401, collar 3402, and shaft 3403. The dimensions of the braille dot pin can vary based upon the braille specification used, and the geometry of other components of the system it. In preferred embodiments, the pin has a shaft/dot diameter of 0.050 inches, a collar diameter of 0.080 inches, a shaft length of 0.250 inches, and is designed to support a stroke length of 0.020 inches. However, alternative versions of the braille dot pin may be used for displays of the present disclosure. For example, in the current prototypes, the pin shaft is straight and centered within the dot and dot collar, however, in order to accomplish other dot arrays geometries, alternative pin shapes could be used. For example, without limitation, the dot shaft could be offset with regard to the dot collar and/or dot such that the dots could be packed more closely together in one area, resulting in a high definition or high resolution component of the displayed matrix. Such a high definition display could have dots packed closer together, for example touching each other for purposes of very finely detailed graphics.

Figure 35:
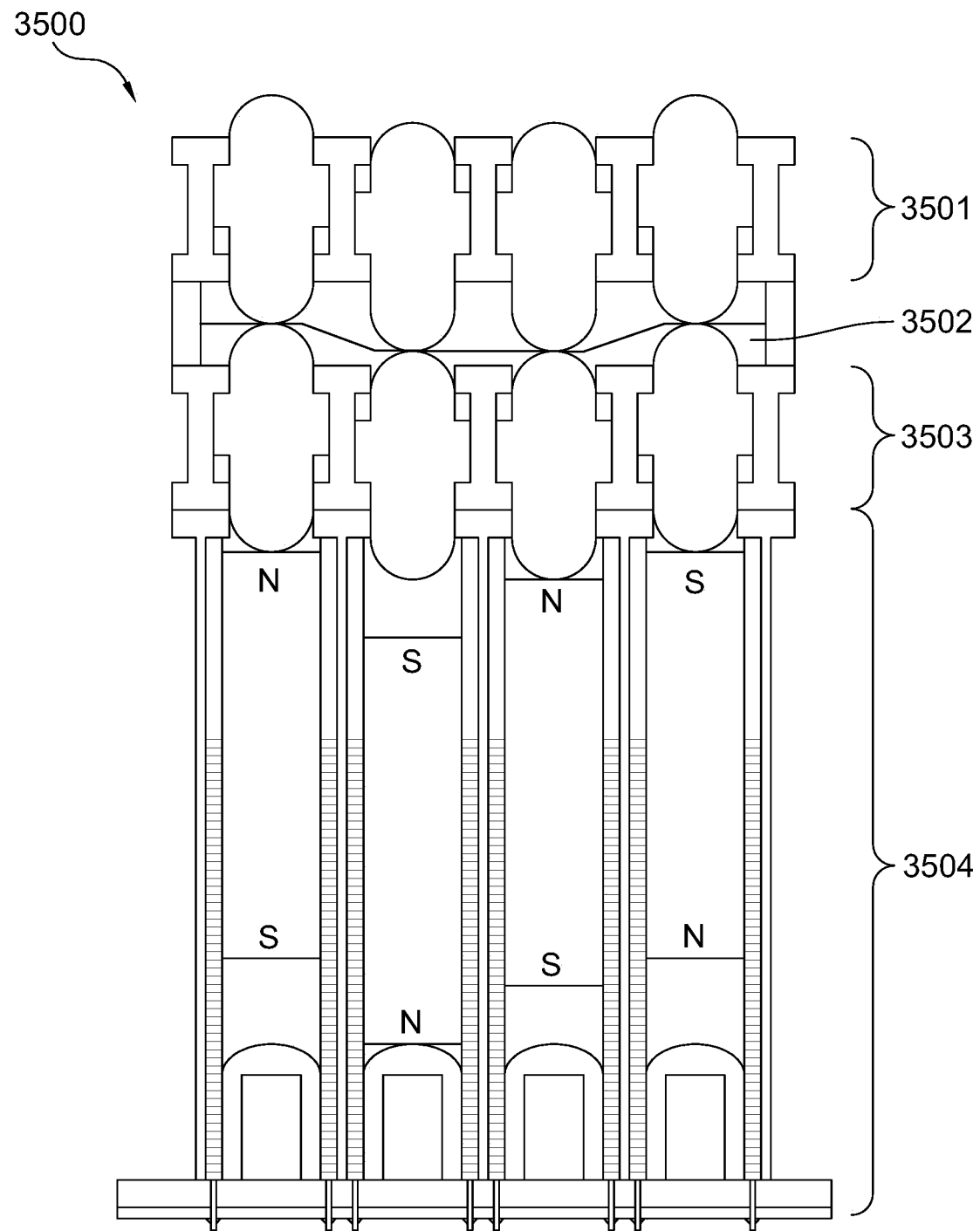
FIG. 35 shows a drawing of the side view of one embodiment of the present disclosure including a removable top half of a braille dot assembly, which can be removed for cleaning.

In some embodiments, the tactile displays of the present disclosure can be designed to accommodate for the gradual buildup of finger debris, etc., which can degrade the performance of the tactile display and result in sticky dots that do not readily actually this is a problem that all conventional braille displays on the market must deal with. For example, in one embodiment the tactile displays of the present disclosure may incorporate an electronic cleaning mode. Such an electronic cleaning mode may involve the over driving of the magnet actuators, energizing them with excess current beyond that which is typically needed for actuation, and further actuating the magnet many times in succession. These steps mechanically force some of the built up debris to move up and out of the holes in the top rail capture plate via mechanical conduction with the braille dot pin. The debris may then simply be wiped off the top surface of the display. In additional embodiments, for more persistent debris, the entire braille dot assembly may be designed with a removable top for cleaning. This top may be physically separate from the actuation mechanism of the display by a thin membrane, which may be impermeable to debris. For cleaning, the top half of the assembly may be removed and cleaned, and then reassembled using alignment pins and/or clips. During testing, this method of cleaning can be completed in a few minutes. FIG. 35 shows one embodiment of a tactile display of the present disclosure 3500 with a removable top half of braille dot assembly 3501, which may be removed for cleaning. This embodiment includes a membrane 3502 between the removable top half of the braille dot assembly 3501 and the remainder of the actuating mechanism 3503, 3504.

Figure 36:
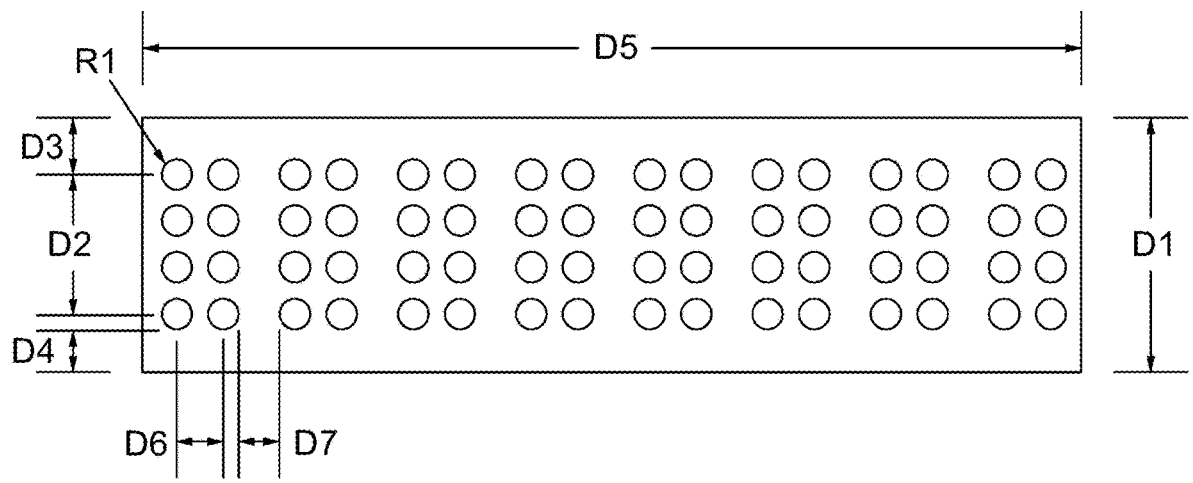
FIG. 36 shows a drawing of one embodiment of the present disclosure including the spacing dimensions of one line of one row of cells of Braille characters.

In certain embodiments, the braille dots, or graphic dots, may be spaced in any suitable spacing. In one embodiment, the mechanical actuators used in embodiments of the present disclosure are close in size to the braille dots which may be observed by a user, and do not have any protruding parts that result in the need for additional space. In one embodiment tactile displays of the present disclosure use conventional braille spacing for each line, as shown in FIG. 36. For example, FIG. 36 shows a collection of eight braille cells having a total width D5 of the 50 mm, and height the D1 13.333 mm; each braille cell comprises eight braille dots having a diameter R1 of 1.6 mm. In the embodiment of FIG. 36, the distance separating each braille cell D7 is 3.125 mm, and the distance between the two columns of four braille dots which comprise a braille cell D6 is 2.5 mm. In this embodiment, the distance between a dot to the side, and a dot above or below within a braille cell is 2.5 mm. In the embodiment of FIG. 36, the space D3 above the braille cell is 2.917 mm, and the space below the braille cell D4 is 2.916 mm. Additionally, in the embodiment of FIG. 36, the distance between the center of the topmost dot of the braille cell and the center of the bottom most dot of the braille cell D2 is 7.5 mm. Furthermore, in the embodiment of FIG. 36, the distance between the center of a braille dot in the top leftmost column of the braille cell and the center of a braille dot in the top leftmost column of an adjacent braille cell is 6.25 mm. FIG. 36 shows the spacing, where individual lines are spaced closely together, at typical inter dot distances, such that the display can accomplish graphics which are evenly spaced.

Figure 37:
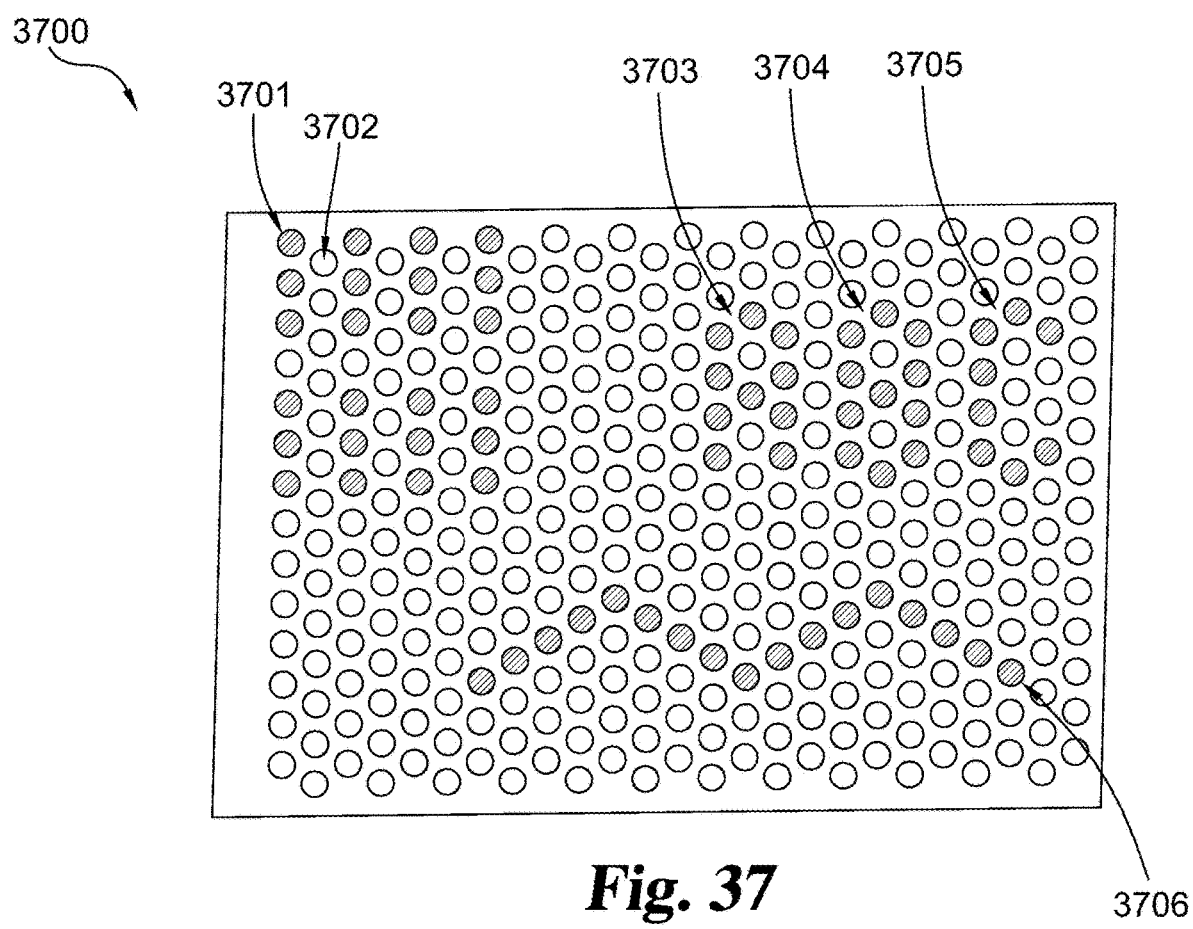
FIG. 37 shows one embodiment of the present disclosure using hexagonal closest packed dots.

However, spacing other than that described in FIG. 36 may be used. For example, some embodiments of the tactical displays of the present disclosure have used regular spacing of 0.100 inches between all dots in a regular, repeating array. This allows for the display to create perfectly regular graphics. However, the braille symbol spacing may be slightly different from specifications. Braille cells effectively have interstitial dots in between cells which can be used to produce graphics in certain embodiments. When interstitial dots are not used, the display functions very similarly to a conventional braille display with only a slight difference between the inter-dot spacing. In certain embodiments, it may be possible to use differently spaced tactile elements in the tactile displays of the present disclosure which could, for example be sold to different markets, for example but not limited to markets where reading of braille is the focus, markets which use graphics extensively, drawings, and/or displays adapted to display science and/or math content, etc. FIG. 37 shows a drawing of one embodiment of a tactile display of the present disclosure which uses a hexagonal close packed array. In this embodiment, the tactile display 3700 chose a combination of shaded raised dots 3701 and unshaded unraised dots 3702 that can be raised in this embodiment to show braille characters, or to visually show characters such as "A" 3707, "B" 3704, and/or "C" 3705, or graphics such as lines 3706. The use of a hexagonal close packed array used in the embodiment of FIG. 37 may be particularly effective for the display of graphics. However, in various other embodiments different packing geometries of the dots may be used. For example, in some embodiments square close packing of the array of dots may be used.

The tactile displays of the present disclosure may provide acceptable levels of sound, however large or excessive sound is not desirable in tactile displays for many reasons. For example, it is undesirable from a user's standpoint, where a user may need to use the display in a quiet environment, such as in a library. Additionally excess sound may present a problem because it may be a symptom of wasted energy. By reducing excess sound, the resulting design may also exhibit a reduction in power usage and provide for increased refresh rate of the tactile display. Generally speaking, and without being confined by theory, there may be two primary sources of sound produced by tactile displays of the present disclosure. One source of sound may be symptomatic of the elastic collision of the magnet and/or parts moving in concert with the magnet and the static parts of the display, such as the dot capture plate. Another potential source of sound produced by the tactile displays of the present disclosure include air displacement or air movement due to the rapid movement of the magnet of the actuator of the present disclosure.

Early in the development process, some embodiments in the original prototype design were much louder than needed because it was significantly over energizing the actuation mechanism to ensure reliability. In that embodiments, noise was believed to be caused by excess energy being converted into waste heat and/or motion. It is believed that reducing this excess energy may be the largest single factor that can be controlled to reduce noise of the tactile displays of the present disclosure. In some embodiments excess energy was used to drive the actuation mechanisms to ensure that the actuation mechanism was well over the activation barrier for the motion of the magnet from one state to another. Another reason that excess energy might be used was to prevent magnet bounce by locking and holding the magnet into position until excess kinetic energy dissipates, mostly through sound. Therefore, in some embodiments reducing and/or eliminating the magnet bounce, and reducing some over energizing of the magnet may significantly reduce the sound of actuation. Reducing the amount of excess energy may also reduce the power consumption of the tactile displays of the present disclosure, and/or may allow for an increased refresh rate.

Figure 38:
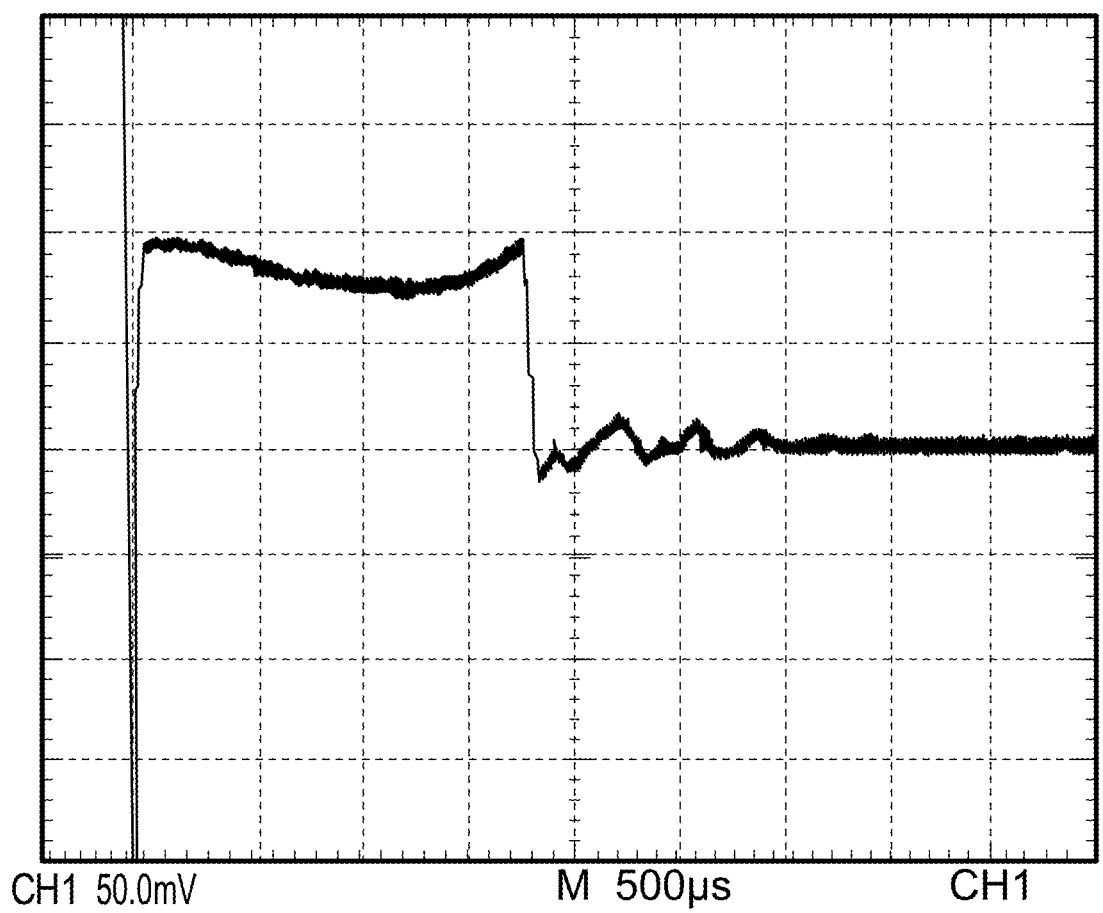
FIG. 38 shows a digital image of a oscilloscope with data showing the velocity of a magnet versus time with when no sound dampening is used.

Sound dampening may be observed or affected in many ways in the displays of the present disclosure. Generally speaking, the motion of the magnet during actuation is such that it undergoes a rapid acceleration, followed by a coasting. At a relatively stable velocity, followed by an impact and rapid deceleration. FIG. 38 shows a digital image of oscilloscope data showing the velocity of a magnet versus time in a tactile display of the present disclosure which uses no sound dampening. These data show and x-axis which represents the time passing during actuation, and the Y axis representing data that is directly proportional to the loss of the of the magnet. The timescale shown in FIG. 38 is very short, 500 microseconds (μs) per division, and the voltages involved are also small, in this embodiment 50 millivolts (mV) per division. During this experiment, the total actuation time of the magnet was on the order of 2 ms, or four divisions. On the left side of the graph of FIG. 38, the magnet first undergoes a rapid acceleration, as the initial current is applied to the coil. This current pulse ends, and the magnet then coasts at a relatively constant velocity, represented by a slightly convex curve on the left half of the graph of FIG. 38. Around the midpoint of the graph the magnet impacts the endpoint, and decelerates rapidly, for example in less than 50 μs, to near zero velocity. Some ringing is observed for about a millisecond after impact, shown in the slightly right of center portion in the graph of FIG. 38, as the magnet bounces due to the intensity of the impact involved. In order to reduce the sound generated by this heavy impact, two approaches may be used in certain embodiments of the present disclosure. First, the magnet impact itself can be drawn out over a longer period of time, so that the slope of the velocity graph is more gradual. Second, in some embodiments the bounce or ringing feature of the magnet after impact may be reduced, by distributing the forces more evenly, and therefore reducing excess energy and noise.

Figure 39:
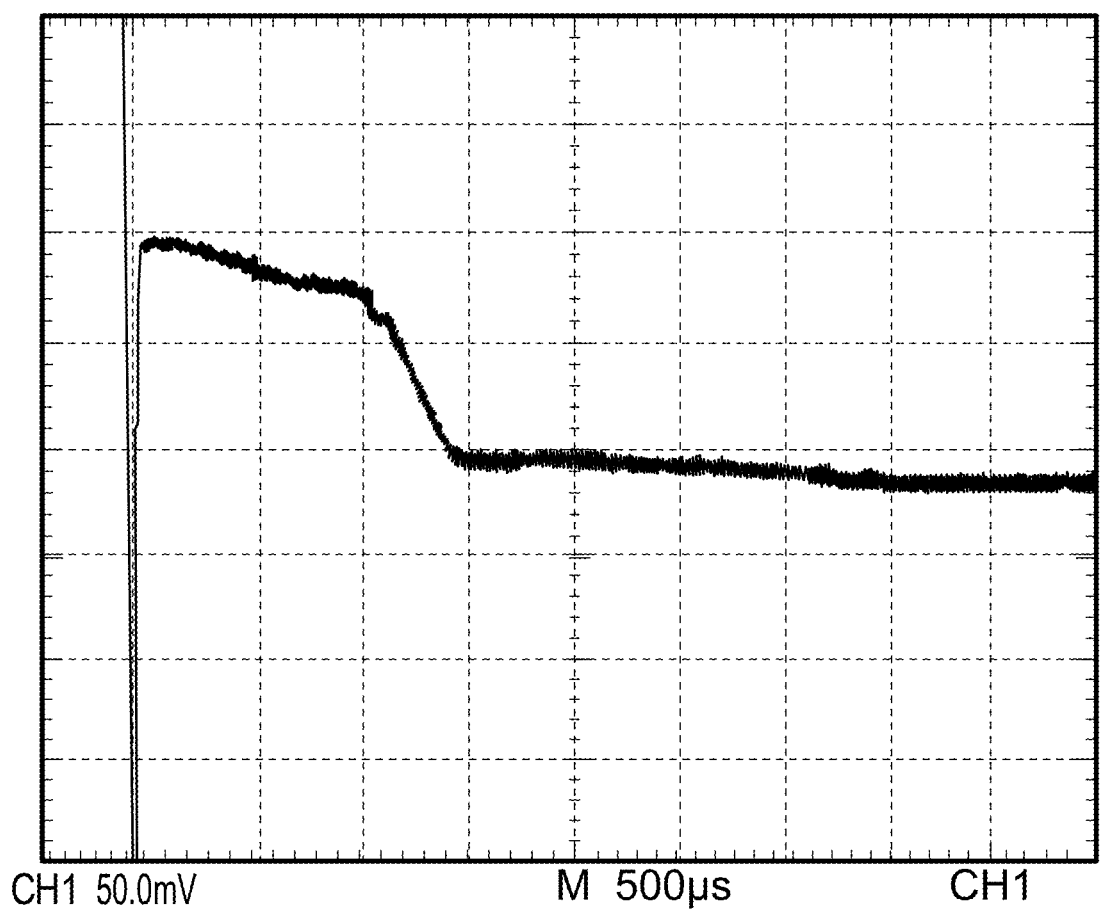
FIG. 39 shows a digital image of oscilloscope data showing the velocity of a magnet versus time at top impact with sound dampening used.

FIG. 39 shows a digital image of oscilloscope data showing the velocity of a magnet versus time at top impact with sound dampening in one embodiment of the tactile displays of the present disclosure. As shown in FIG. 39, the impact of the magnet is much more gradual than shown in FIG. 38, around 500 μs, or an order of magnitude more than without sound dampening. The data of FIG. 39 show a gradually sloped line of the magnet velocity in the left center portion of the graph. This reduction is magnet impact force will subsequently reduce excess energy, and the sound, by an equivalent factor of 10 or more. Further, in this embodiment the ringing of the magnet bounce is almost entirely absent, and the magnet appears to strike, sink a bit into the sound dampening material, and slowly recover to equilibrium in about 500 μs after impact. This may reduce the excess sound significantly in certain embodiments.

Figure 40:
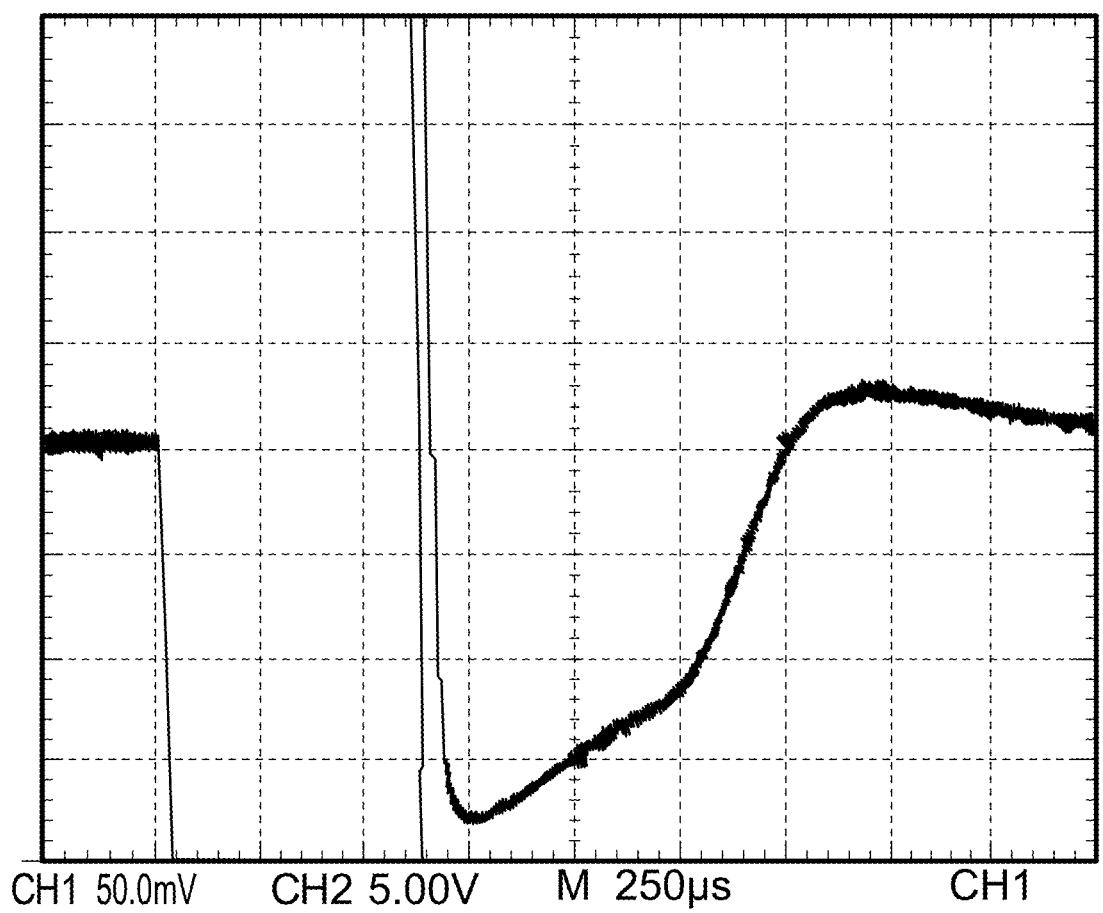
FIG. 40 shows a digital image of oscilloscope data showing the velocity of a magnet versus time at bottom impact with sound dampening used.

FIG. 40 shows a digital image of oscilloscope data showing the velocity of a magnet versus time at bottom impact in one embodiment of the tactile displays of the present disclosure. The graph of FIG. 40 shows and x-axis of 250 μs per division, and the scale of the Y axis has been increased to 50 mV. As shown in FIG. 40, the velocity curve is negative or upside down because the magnet is moving in the reverse direction. In this embodiment, the shape of the impact curve, to the right of center, shows a gradual, sloped decrease in velocity followed by a gentle bounce back to equilibrium. These data show the absence of any sharp, sudden changes or ringing features, which may result in significantly reduced sound in some embodiments of the present disclosure.

Figure 41:
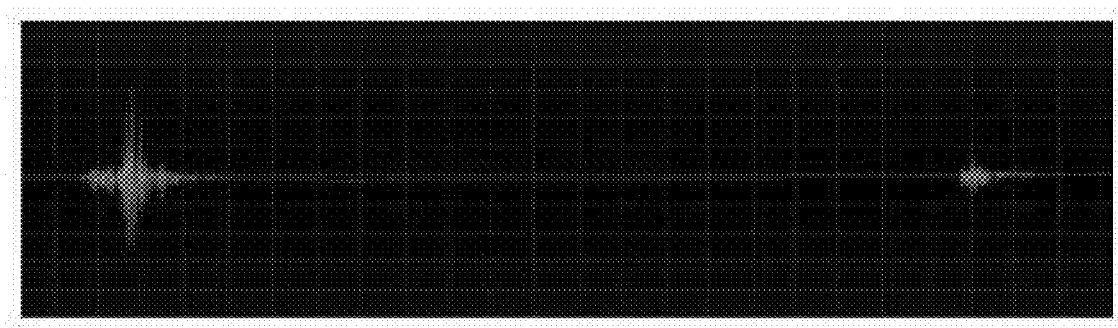
FIG. 41 shows just a digital image of the wave form obtained during audio testing of sound dampening in one embodiment of the present disclosure.

FIG. 41 shows a digital image of the waveform obtained during audio testing of a display of the present disclosure utilizing sound dampening material. The wave form of FIG. 41 shows two actuations, on the left of FIG. 41 and on dampened impact is shown in the waveform, and a dampened impact is shown towards the right of FIG. 41. The x-axis of the FIG. 41 represents time and the Y axis represents the intensity or amplitude of the sound generated. The data used to generate FIG. 41 was taken during a test that simulated the users here at a distance of a bout 2 feet from the device of the present disclosure. No casing or other physical some barriers were present, and the test was taken with a naked actuator. In some embodiments the intensity of the dampened impact is significantly less than the on dampened impact, and in some embodiments with proper dampening of the sound of the actuator, it is difficult to distinguish the dampened sound from background noise.

In some embodiments, electronic magnet bounce control may be used to control the bounce of a magnet after impact, and reduce sound observed. In particular, in one embodiment additional driving current can be provided to the coil after actuation around the time of the magnets impact. This current, if precisely applied using techniques such as pulse width modulation and polarity reversal can be calibrated so that it captures and holds a magnet tightly against the impact surface while excess energy is dissipated. In one embodiment Lenz's law is used to control the motion of the magnet. Lenz's Law states that the direction of the current induced in a conductor by a changing magnetic field is such that the magnetic field created by the induced current opposes the initial changing magnetic field. The magnitude of the induced force is directly proportional to the rate of change (the derivative) of the magnetic flux, and in the opposite (negative) direction, as shown by Faraday's law of induction shown below.

$$\varepsilon = -\frac{\partial \Phi_B}{\partial t},$$

In practical terms, this means that the motion of the magnet itself through the coil will generate an induced force that will resist its progress. This induced force can be accounted for and engineered for by adjusting the geometry of the coil magnet system, and the physical properties of the magnet and wire material. This induced force will serve to naturally slow the magnet out as it approaches the point of impact. In fact, after the initial current pulse is delivered to the coil, the magnet breaks free of the near core plate and is accelerated towards the far core plate. After passing the point of no return, the magnet will continue to the far core plate even if no additional current is sent to the coil. During this freefall phase, any amount of induced resistive force is welcomed, as it reduces the eventual impact of the magnet against the far core plate. In some embodiments, using an asymmetric coil design may be useful for this approach as the greater amount of coil windings near the end of the coil will serve to naturally slow the magnet at it as it nears the point of impact. One advantage to this method of sound control is that it is free in terms of energy usage, the magnet itself induces the resistive force and no extra power is needed.

In some embodiments, it may be possible to create a resistive electromotive force in a coil, which resists the motion of a magnet towards the point of impact. With careful timing, a reverse polarity current pulse of lesser magnitude and/or duration can be sent while the magnet is in its freefall phase. This will generate a resistive force and slow the magnet dramatically prior to impact. This force is ideal because it will slow the magnet without any friction or sound generation, and the only lost energy will be in the form of heat. In these embodiments, the use of an active voltage can be held on a rail which will resist the magnets impact whenever a magnet is actuated. This method of sound reduction may require additional power drop but may significantly control sound and magnet bounce in embodiments of the present disclosure.

Additionally, in certain embodiments the use of conventional sound dampening materials to absorb the impact of the magnet may be used. Many different materials and many different options for placement of these materials exist. Materials which may be used in embodiments of the present disclosure include neoprene, various types of foam including, but not limited to urethanes, sorbothane, poron, rubber cement, or other materials ranging from plastics to rubbers.

To measure sound generated during actuation, and experimental test jig was developed for measuring sound precisely and repeatedly, using different materials and electrical driving conditions. This jig measures the sound output from a device in decibels (dB) at a distance of about 2 feet from the device, which simulates the distance to a user's year in a typical use case, for example seated at a desk. Both peak and average dB readings are recorded. Experiments were performed, including tests designed to simulate a cleaning mode which involves over driving the magnet in both directions to show a worst-case scenario as well as to allow the material to settle during the first few actuations of the actuation mechanism. For these experiments, a timing of 2000 μs was used for both the up and down motion. Experiments were also performed in a test designed to use a lower power mode but which still afforded it reliable actuation of the actuation mechanism. In these tests, and asymmetric actuation motion was used where a different up timing was used then down timing. In these experiments the typical driving values range from 200 μs to 500 μs. Control experiments were also performed for example to simulate a quiet room where the device of the present disclosure was turned off, and experiments were also performed on one embodiment of the tactical displays of the present disclosure were no sound dampening was used.

During these tests, it was observed that foam-based products were the best at dampening sound but may suffer from materials fatigue, and also require the most physical space. Rubber-based products were observed to be not as good at dampening sound but appeared to be more durable and require less space. Other materials such as solid plastic did not appear to dampen the sound. Of the rubbers that were tested, a hybrid material such as sorbothane performed excellently at reducing sound. The testing performed with sorbothane showed improvement in several characteristics that were measured. For example when 0.020 inch think sorbothane was used on both sides of the magnet, the actuation time was reduced to 200 μs up and 500 μs down, and the sound rating was about 60 dB peak and about 33 dB average. When no sound dampening material was used as a comparison, and actuation time of 200 μs up in 200 μs down was observed with a sound reading of about 92 dB peak and about 60 dB average.

Other aspects of the tactile displays of the present disclosure include, but are not limited to, a refresh rate of the entire display increase of approximately 400% to 500%. For a full page device of 8000 dots with four banks, the total page refresh speed is 700 ms. In some embodiments, a power reduction of approximately 570% was observed. In these such embodiments, the power requirement is on the order of 10 millijules (mJ) per actuation with no holding energy required. For typical battery, this may represent a total of 2000 to 3000 total page refreshes of all dots on a page, before the battery needs to be recharged. During real world usage, this may represent about a 10,000 page refreshes as many dots don't change states between pages, and power is only drawn when a dot changes state. In other embodiments, a sound reduction factor of approximately 1000, which equates to a factor of 30 in amplitude, roughly equivalent to a quiet rural area.

In still further embodiments, 70 durometer sorbothane, may provide 44% deflection at impact with 0.040 inch thick material. And still in other embodiments, 70 durometer sorbothane, may provide 38% deflection at impact with 0.060 inch thick material. In one embodiment, a plastic separator/spacer was removed and was replaced with sorbothane material. The sorbothane material may also be placed between a magnet and impact surfaces in some embodiments. In certain embodiments, 50% dynamic deflection is around 40% or less, then the expected fatigue lifetime of sorbothane material may be in excess of 1 million cycles. Extensive testing of sorbothane material used in displays of the present disclosure, where the display was left on a continuous actuation mode for long periods of time has shown no degradation in performance of the sound dampening. In some embodiments, it may be desirable that the percent static deflection does not exceed 20%.

Figure 42:
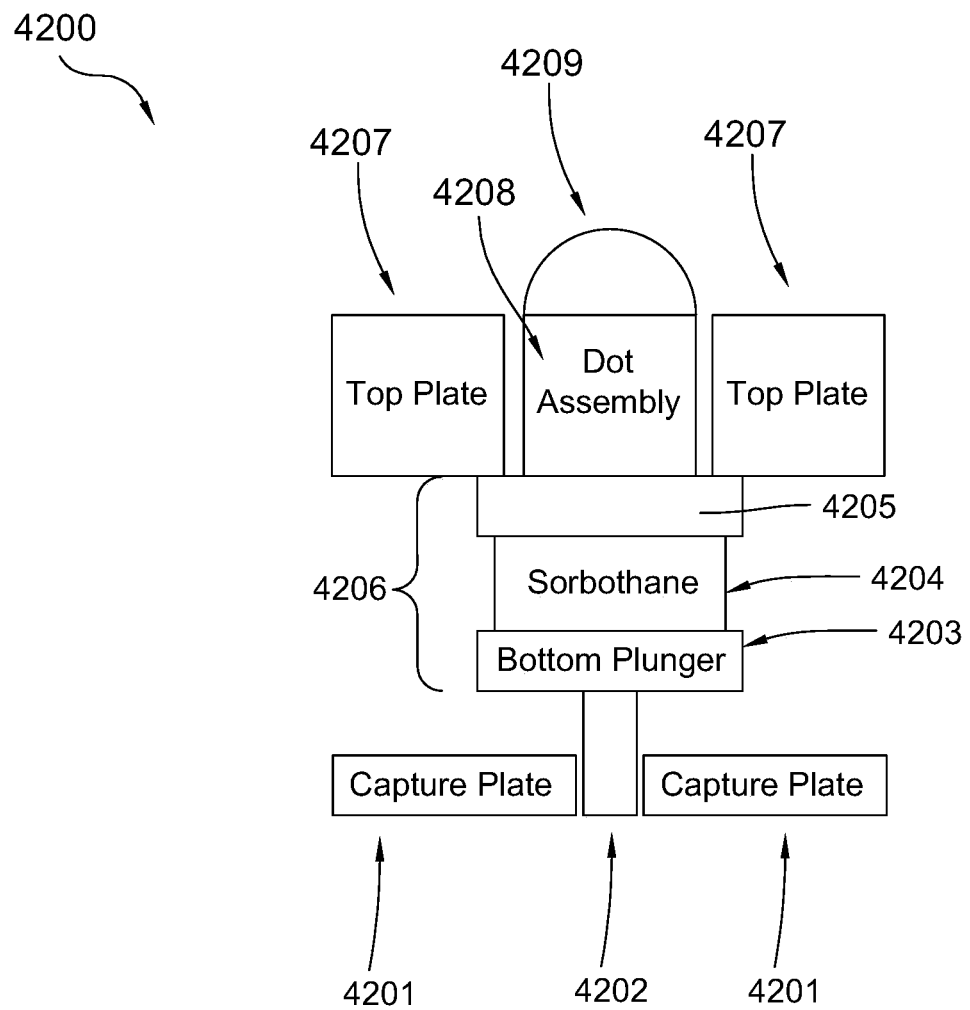
FIG. 42 shows a drawing showing the use of sound dampening material inside the shaft of a braille dot pin of one embodiment of the present disclosure.

Sound dampening material may be used in embodiments of the present disclosure at a variety of locations. For example sound dampening materials may be used to reduce the sound generated due to top impact by placement of material between a magnet and a braille dot pin, and/or between a braille dot pin and eight top dot capture plate. In other embodiments sound dampening materials may be used to reduce the sound generated due to bottom impact by placing materials between a magnet and a bottom dot plate. It sounded dampening materials may also be placed in the braille dot assembly itself. For example FIG. 42 shows a drawing with the placement of sound dampening material in a braille dot assembly 4200 of one embodiment of the present disclosure. In this embodiment, top plate 4207 and capture plate 4201 hold a dot assembly 4208 comprising a portion which can be observed by a user 4209 and collar 4205 and bottom plunger 4203 and shaft 4202 in place. A piece of material such as sorbothane 4204 can be placed between collar 4205 and bottom plunger 4203 to reduce sound during actuation. The new collar 4206 comprised of collar 4205, bottom plunger 4203 and sorbothane 4204 reduced sound observed during actuation and prevents holds the assembly in place after manufacture.

As shown in FIG. 42, a material such as foam or rubber can be incorporated as part of a braille dot assembly used in embodiments of the present disclosure in such embodiments, material may be placed inside the shaft, such that the shaft itself absorbs impact of actuation. After extensive testing, for the bottom side impact, some embodiments may use a small disc shaped insert between the bottom side of a magnet and the base of a plastic cup to control sound. For example in one embodiment a 0.040 inch, 70 durometer sorbothane disc may be inserted into the coil cup. The thickness of the sound dampening material may be important, for example in certain embodiments a 0.060 inch disk was too thick for the magnet to stay down, and in some embodiments a sound dampening material with a thickness of less than 0.040 inches resulted in a material that deforms too much to be reliable for long term durability. In some embodiments, the geometry of the system supports the use of a disk insert by removing some or all of the plastic in the bottom of a coil cup. After insertion, the sound reduction in the downstroke may be significant, and may be acceptable as determined by testing. Additionally, in some embodiments for the top side of a magnet, sound dampening material may be used on the bottom side of the top of most dot capture plate. However, when the material is placed here it could affect the holdup latch force.

In certain embodiments, when sound dampening material is not used, a magnet may require 25 g of holdup force, and therefore the top plate provides 25 g of downforce against a dot. For every gram of pressure put on the.by finger, this removes a gram of force from the top plate, up to 25 g because the plate is rigid.

When an elastomer is used as a sound dampening material, it has a force curve, so the material will take up some of this force. For example, in some embodiments if the system starts with 25 g of stress of force inside the elastomer, pressing on the dot will reduce the stress force inside the elastomer, but will also reduce the magnet hold force.

Figure 43:
FIG. 43 shows a summary of the sound testing before sound dampening material was added.
Figure 44:
FIG. 44 shows a summary of the sound testing after sound dampening material was added.

FIGS. 43 and 44 show digital images summarizing sound testing and noise measurement reports obtained by testing some embodiments of the present disclosure. FIG. 43 summarizes sound testing before addition of sound dampening material, and FIG. 44 summarizes sound testing done after sound dampening material was added.

Figure 46:
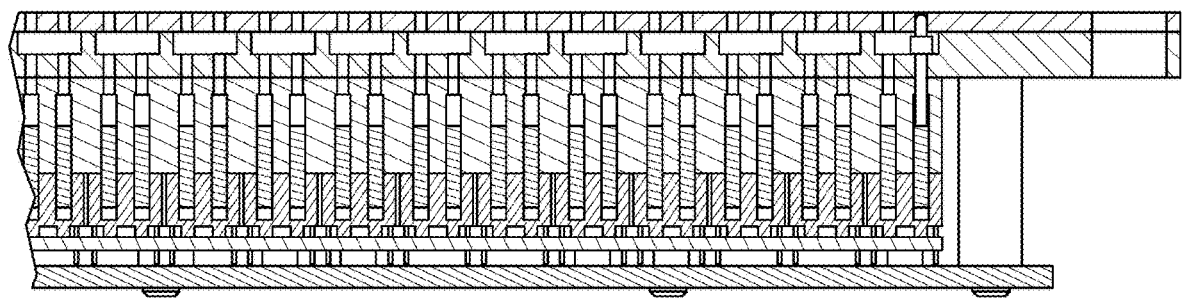
FIG. 46 shows a drawing of the side view of one embodiment of the present disclosure.
Figure 47:
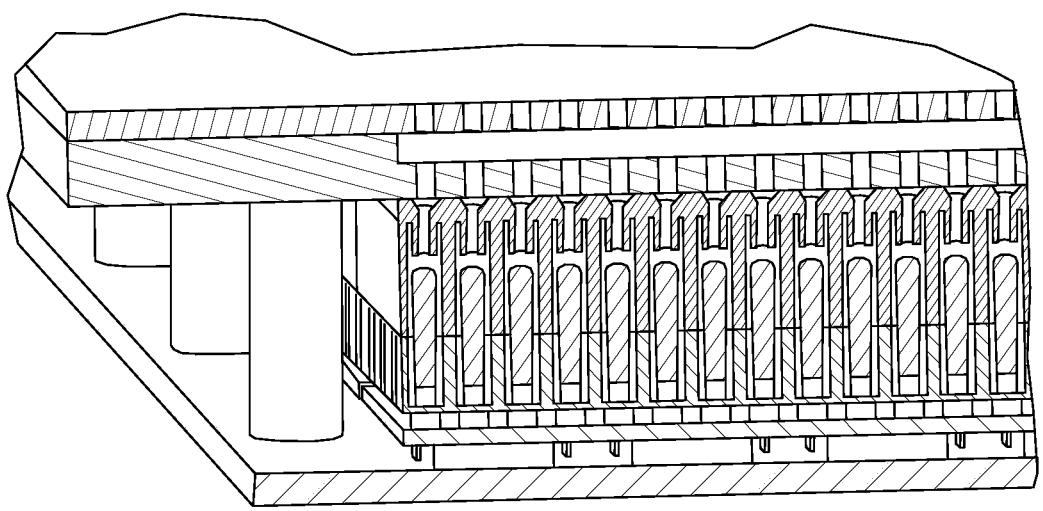
FIG. 47 shows a drawing of the side view of one embodiment of the present disclosure.

Generally speaking, a top plate as used in embodiments of the present disclosure provides a substrate for tactile dots to protrude from, and to allow a user a place to rest their fingers when reading the device. In some embodiments the top plate can be made of a plastic, metal, or other substance as part of the overall case of the tactile display. In some embodiments, a capacitive touch subsystem may be used on the top plate. For example, if a top plate is made of a PCB with regularly spaced holes drilled in it, the traces on the PCB can be used as a conventional touch display. This may allow the user to take advantage of touch sensitive features such as cursor routing, gesture controls, and/or the drawing mode. Generally speaking, capacitive sensing is a technology, based on capacitive coupling, that can detect and measure anything that is conductive or has a dielectric different from air. Human interface devices based on capacitive sensing, such as digital audio players, mobile phones, and/or tablet computers use capacitive sensing touchscreens as input devices. FIGS. 46 and 47 show one embodiment of a PCB used as a capacitive touch board as used in some embodiments of the present disclosure.

Projected capacitive touch (PCT) technology is a capacitive technology which allows for a more accurate and flexible operation, eye-catching a conductive layer. An X-Y grid is formed either by etching one layer to form a grid pattern of electrodes, or by etching to separate, parallel layers of conductive material with perpendicular lines or tracks to form the grid, comparable to the pixel grid found in many liquid crystal displays (LCD). PCT may allow for a greater resolution, and may allow for operation with no direct contact, such that the conducting layers can be coated with further protective insulating layers, and operate even under screen protectors, or behind weather and/or vandal proof glass.

Mutual capacitive sensors have a capacitor at each intersection of each row and each column. A 32×16 array may be used in some embodiments of the present disclosure, and would have 512 independent capacitors. If each tactile.in a tactile display was sensed, in one embodiment this would need 4096 capacitors, however in practice this number of capacitors is not always needed. For example, interpolation techniques may be used by measuring the intensity of activation of neighboring cells and using and an algorithm to determine exact finger position.

Figure 45:
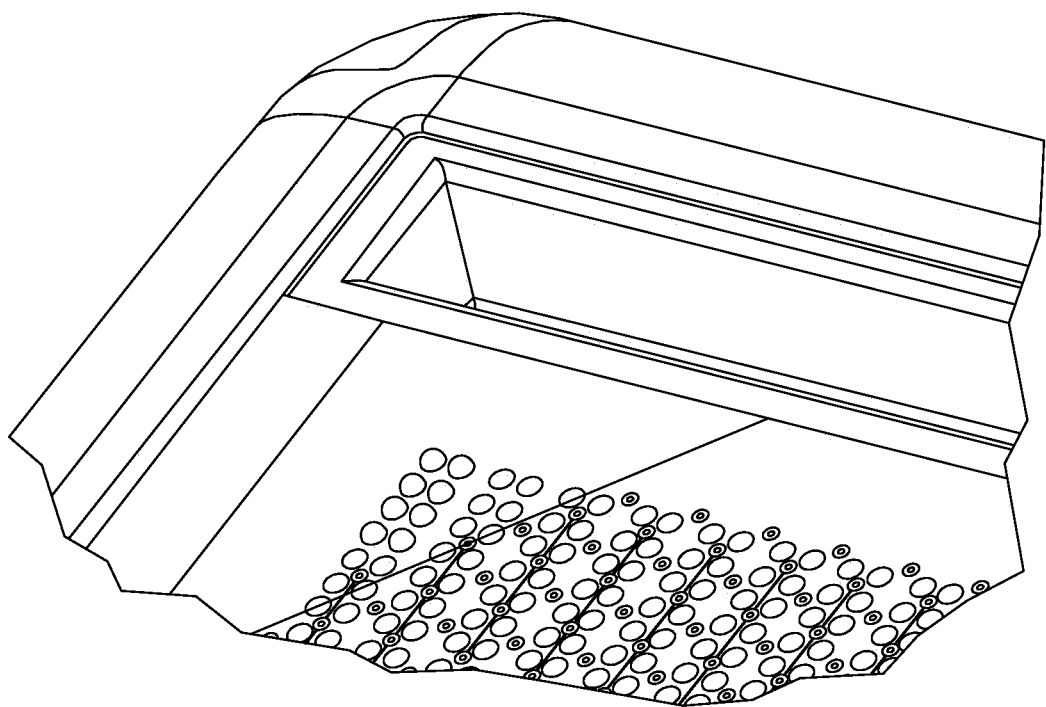
FIG. 45 shows a drawing of one embodiment of the present disclosure which uses a PCP as the top plate which allows for touch sensitive traces as used in some embodiments of the present disclosure.

In some embodiments a voltage is applied to the rows and/or columns of a capacitive touch system. Bringing a finger or conductive stylus near the surface of a sensor changes the local electric field which reduces the mutual capacitance. The capacitance change it every individual point on the grid can be measured to accurately determine the touch location by measuring the voltage in the other axis. Mutual capacitance allows multitouch operation where multiple fingers, palms, or styli can be accurately tracked at the same time. In certain embodiments of the present disclosure the tactile devices may include multitouch operation, which may provide a feature to the user as multiple fingers may be in contact with the display of display while reading. FIG. 45 shows a drawing of one embodiment of the present disclosure which uses a PCB as the top plate of the tactile display to allow for touch sensitive traces.

In certain embodiments, when a touch sensitive top surface is used, tactile displays of the present disclosure can be controlled using gestures by the user. Displays of the present disclosure can take advantage of gesture commands, including but not limited to the following: using one finger to swipe right to control an individual line of text; using multiple fingers to swipe right or swipe left may be used to go forward and/or back one page of text; swiping up or down may control the display up or down; double tapping a finger on a cell may be used to route the cursor to that cell; holding or toggling a control button and moving a finger on the display may be used to draw, or raise dots along the path of a finger.

In some embodiments, the actuation mechanism used in tactile displays of the present disclosure may also provide a method to detect depression of a.by a finger. The dot assembly is connected mechanically to the magnet itself, via the shaft of the dot pin assembly. Therefore, for example, when a user presses on a., such as by reading it, the magnet is also depressed, or moves within a coil. Due to the electromagnetical laws such as Faraday's law of induction, the motion of the magnet through the coil may induce a small eddy currents in the coil itself. Eddy currents are loops of electrical current induced within conductors by a changing magnetic field in the conductor. Eddy currents flow in closed loops within conductors, in planes perpendicular to the magnetic field. The magnitude of the current in a given loop is proportional to the strength of the magnetic field, the area of the loop, and the rate of change of flux, and inversely proportional to the resistivity of the material. This eddy current can in turn be measured and use as a detection mechanism for dot depression in some embodiments. For example, in one embodiment and eddy current array (ECA) may be used. ECA technology may provide the ability to electronically drive an array of coils, or multiple coils, a ranged in a specific pattern called a topology that generates a sensitivity profile suited to the target. Data acquisition may be achieved by multiplex in the coils in a special pattern to avoid mutual inductance between the individual coils.

Tactical displays of the present disclosure may include a master control board, along with a microcontroller. When used, a master control board may receive data from an attached computer, phone, tablet, appliance, or other device that is in electrical communication with a tactile display of the present disclosure. A master control board may convert data and/or signals from other devices into signals which actually dots in a specific pattern. For example, in some embodiments the microcontroller works with conventional screen readers such as JAWS via software drivers, plug-ins, or by the use of an abstraction layer such as FS BRAILLE. Microcontrollers may include firmware, or other software used to control the tactile displays of the present disclosure. Some embodiments of the present disclosure may comprise a dot driver board. In these embodiments, a dot driver board may act as a daughter board that is used to drive the dots of the tactile display by, for example by sending current pulses to the coils. In some embodiments, the dot drivers may be divided into row and column drivers which send pulses to the rows and columns of a display. In some embodiments, one, or more than one dot driver board may be used. For example, when more than one dot driver board is used, they can be banked, enabling the tactile display to be divided into sections such that each bank is controlled by its own banked dot driver circuit board. This may, for example have the advantage of greatly increasing the refresh speed of the tactile display. In one embodiment, the tactile display may be divided into four quadrants, each quadrant having its own driver board. This may, for example increase the refresh spree of the tactile display by a factor of four, while not causing any issues with the geometry of the system.

In some embodiments, a metal oxide semiconductor field effect transistor (MOSSET) may be used to reduce and/or eliminate current leakage. For example, in some embodiments due to the geometry of an array, Karen may leak on a complex path of adjacent rows and columns until it finds a path to ground, whereby the current can no longer be used to actuate a target coil. To prevent this, in some embodiments a MOSFET may be used to switch a dot on or off. In some embodiments, one MOSFET per dot may be used, however in other embodiments, the number of MOSFETs may be reduced.

In some embodiments, a case may be used to house the components used in the tactile displays of the present disclosure. In some embodiments, such a case may provide additional sound dampening, by use of materials used to absorb or muffle sounds. In other aspects, a case for the tactile displays used in embodiments of the present disclosure may provide electrical insulation and/or protection to a user, and/or protection from receipt and/or sound. In one embodiment, tactile displays of the present disclosure use a material that is magnetically neutral for the case, and/or materials that magnetically insulates the actuation mechanisms used. In other aspects, cases used for the tactile displays of the present disclosure may also provide shock reduction, for example in the case of a fall. In some embodiments, a case may comprise rubber feet, to provide a stable surface and/or vibration insulation from a desk or surface on which the tactile display is placed.

Figure 48:
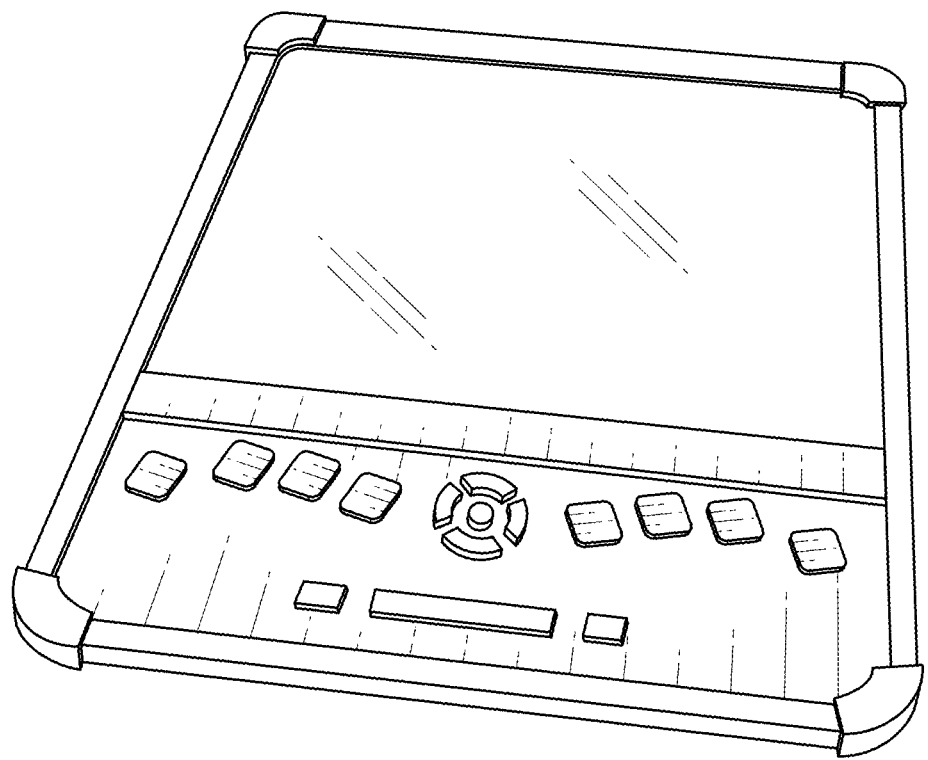
FIG. 48 shows a digital image of a rendering of one embodiment of the present disclosure with control buttons.

Embodiments of the present disclosure may include one or more switches, buttons, or other elements suitable for input by the user or control of the tactile display. In some embodiments, the controls may be generally located in the bezel of the display, along the sides, top, or bottom of the display. Some embodiments of the present disclosure also comprise one or more jacks for input/output devices (I/O), power, communication, such as a serial, or parallel connector. In one embodiment, the tactile display also comprises one or more cursor display dots along the rows or columns of braille text, or along the sides of the device. FIG. 48 shows a digital image of an engineering rendering comprising control buttons.

In certain embodiments, tactile displays of the present disclosure may comprise firmware, or onboard software that controls how the display converts information from a computer, mobile phone, tablet, or other device into dots on the display. Additionally, in some embodiments, remote software, such as software that exists or resides on a computer, mobile phone, tablet, or other device attached to the tactile display which allows the user to take advantage of many of the features of the tactile display, and/or to manipulate or store content to or from the tactile display.

In some embodiments, tactile devices present disclosure include basic driver support for a host computer, mobile phone, tablet, or other device, and/or JAWS compatibility. Additional features may be implemented in software and include, for example but are not limited to features such as drawing, mouse emulation, games, text user interface control, and/or navigation.

Tactile displays of the present disclosure may display braille characters, graphics, or other content. For example, webpages, e-books, software applications such as e-mail clients, office productivity software, and/or content from Web browsers or custom applications may be displayed. In one embodiment, books or textbooks in ePub format may be displayed on tactile displays of the present disclosure.

The uses of the terms "a" and "an" and "the" and similar references in the context of describing the invention (especially in the context of the following claims) are to be construed to cover both the singular and the plural unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Tactile displays of the present disclosure may comprise one or more buttons, keys, or other input mechanisms so that a user may input data or navigates any user interface, such as a text based user interface or graphics based user interface. In some embodiments buttons may be arranged to emulate a keyboard, braille keyboard, numerical keypad, and/or navigation keypad comprising up, down, left, and/or right buttons. In some embodiments, if an eight dot braille cell is used, the top most six dots may be used to display braille characters and the lower most two dots may be used to indicate a cursor or location by, for example, raising and lowering the bottom two most dots of the cell. Such raising and/or lowering of the two bottom most dots in an 8-dot braille cell may be at a regular interval, so as to emulate a cursor blinking or at an irregular or random interval.

While the invention has been illustrated and described in detail in the drawings and the foregoing description, the same is to be considered as illustrative and not restrictive in character, it being understood that only the preferred embodiment has been shown and described and that all changes and modifications that come within the spirit of the invention are desired to be protected. In addition, all references cited herein are indicative of the level of skill in the art and are hereby incorporated by reference in their entirety.

EMBODIMENTS

1. A tactile display comprising:
one or more electromagnetic actuating elements;
2. The tactile display of embodiment 1 further comprising one or more tactile elements.

3. The tactile display of embodiment 2, wherein the one or more tactile elements comprises Braille dots.

4. The tactile display of any one prior embodiment further comprising a capacitive touch surface.

5. The tactile display of embodiment 4, wherein the surface on which the tactile elements are observed on comprises the capacitive touch surface.

6. The tactile display of any one prior embodiment further comprising a dot driver board, wherein the dot driver board controls the one or more tactile elements.

7. The tactile display of any one prior embodiment further comprising a communication port for data input or data output from the tactile display.

8. The tactile display of embodiment 7, wherein the communication port is a universal serial bus communication port.

9. The tactile display of embodiment 8, wherein the universal serial bus communication port is a USB-A port, a USB-B port, a mini-USB port, a micro-USB port, a USB-C port.

10. The tactile display of embodiments 7-9 wherein the communication port for data input or data output is USB 1, USB 1.1, USB 2, USB 3, USB 3.1, or USB 3.2.

11. The tactile display of one of embodiment 7-9 wherein the tactile display is in electrical communication with a computer.

12. The tactile display of embodiment 11, wherein the computer provides input to the tactile display.

13. The tactile display of embodiment 11, wherein the tactile display provides input to the computer.

14. The tactile display of any one prior embodiment further comprising one or more buttons or switches.

15. The tactile display of embodiment 14, wherein one or more buttons or switches control the operation of the tactile display.

16. The tactile display of embodiment 14 or 15, wherein one or more buttons are used for data input by the user to the tactile display.

17. The tactile display of embodiment 16, wherein the data input by the user to the tactile display includes text input, navigation of a user interface, control of software, or control of the tactile display.

18. The tactile display of embodiment 17, wherein the user interface is a graphical user interface or a text-based user interface.

19. The tactile display of any one prior embodiment wherein the one or more electromagnetic actuating elements have a response time of between 200 ms and 2500 ms.

20. The tactile display of embodiment 19, wherein the one or more electromagnetic actuating elements have a response time of between 200 ms and 1500 ms.

21. The tactile display of embodiment 20, wherein the one or more electromagnetic actuating elements have a response time of between 200 ms and 1000 ms.

22. The tactile display of embodiment 21, wherein the one or more electromagnetic actuating elements have a response time of between 200 and 700 ms.

23. The tactile display of embodiment 22, wherein the one or more electromagnetic actuating elements have a response time of between 200 and 600 ms.

24. The tactile display of embodiment 23, wherein the one or more electromagnetic actuating elements have a response time of between 200 and 500 ms.

25. The tactile display of embodiment 24, wherein the one or more electromagnetic actuating elements have a response time of between 200 and 400 ms.

26. The tactile display of embodiment 25, wherein the one or more electromagnetic actuating elements have a response time of between 200 and 300 ms.

27. The tactile display of any one prior embodiment wherein the electromagnetic actuating element produces a Braille dot height of between 0.38 mm and 3 mm.

28. The tactile display of embodiment 27 wherein the electromagnetic actuating element produces a Braille dot height of between 0.38 mm and 2.54 mm.

29. The tactile display of embodiment 28, wherein the electromagnetic actuating element produces a Braille dot height of between 0.5 mm and 2 mm.

30. The tactile display of embodiment 29, wherein the electromagnetic actuating element produces a Braille dot height of between 0.5 mm and 1 mm.

31. The tactile display of embodiment 23, wherein the electromagnetic actuating element produces a Braille dot height of between 0.6 and 0.9 mm.

32. The tactile display of embodiment 31, wherein the electromagnetic actuating element produces a Braille dot height of between 0.7 and 0.8 mm.

33. The tactile display of embodiment 32 wherein the electromagnetic actuating element produces a Braille dot height of 0.787 mm.

34. The tactile display of embodiment 27, wherein the electromagnetic actuating element produces a Braille dot height of about 0.787 mm.

35. The tactile display of embodiment 27 or 34, wherein the electromagnetic actuating element produces a Braille dot height of 0.787 mm+0.03 mm.

36. The tactile display of embodiment 27 or 34, wherein the electromagnetic actuating element produces a Braille dot height of 0.787 mm+0.02 mm.

37. The tactile display of embodiment 27 or 34, wherein the electromagnetic actuating element produces a Braille dot height of 0.787 mm+0.01 mm.

38. The tactile display of any one prior embodiment wherein the electromagnetic actuating element produces a Braille dot force of 5 g-50 g.

39. The tactile display of embodiment 38, wherein the electromagnetic actuating element produces a Braille dot force of between 10 g-45 g.

40. The tactile display of embodiment 39, wherein the electromagnetic actuating element produces a Braille dot force of between 15 g-40 g.

41. The tactile display of embodiment 40, wherein the electromagnetic actuating element produces a Braille dot force of between 20 g-35 g.

42. The tactile display of embodiment 41, wherein the electromagnetic actuating element produces a Braille dot force of between 20 g-30 g.

43. The tactile display of embodiment 42 wherein the electromagnetic actuating element produces a Braille dot force of 20-25 g.

44. The tactile display of embodiment 2, wherein the one or more tactile elements are housed in a unit that is separable from the one or more electromagnetic actuating elements.

45. The tactile display of embodiment 44, wherein the unit housing the one or more tactile elements can be cleaned.

46. The tactile display of embodiment 44 or 45, wherein the unit housing the one or more tactile elements further comprises a membrane.

47. The tactile display of any one prior embodiment, wherein the tactile display further comprises a sound dampening material.

48. The tactile display of embodiment 47, wherein the sound dampening material is neoprene, a foam, sorbothane, poron, rubber cement, a plastic, or a rubber.

49. The tactile display of embodiment 48, wherein the foam is a urethane foam.

50. The tactile display of any one prior embodiment, wherein the tactile display comprises a printed circuit board.

51. The tactile display of any one prior embodiment, wherein the tactile display comprises a controller for the one or more electromagnetic actuating elements.

52. The tactile display of embodiment 51, wherein the controller for the one or more electromagnetic actuating elements comprises firmware.

53. The tactile display of any one prior embodiment, wherein the tactile display further comprises a radio.

54. The tactile display of embodiment 53, wherein the radio can send or receive Wi-Fi wireless communication or Bluetooth communication.

55. The tactile display of any one prior embodiment, further comprising a speaker.

56. The tactile display of embodiment 55, wherein the speaker provides audible feedback to a user.

57. The tactile display of embodiment 56, wherein the audible feedback provided to the user comprises a beep.

58. The tactile display of embodiment 56, wherein the audible feedback provided to the user comprises spoken word.

59. The tactile display of embodiment 58, wherein the spoken word is computer generated.

What is claimed is:

1. A tactile display comprising:
   a removable top dot capture assembly comprising a top plate having a plurality of top openings and a bottom plate having a plurality of bottom openings aligned with the top openings, the removable top dot capture assembly containing a plurality of Braille dots, each Braille dot having a mechanical constraint collar formed between an upper Braille portion extending through corresponding top openings in the removable top dot capture assembly when the Braille dot is in a raised position and a lower linkage portion extending through the corresponding bottom openings in the removable top dot capture assembly, where the mechanical constraint collar is configured to limit travel of the Braille dots through the top openings and the bottom openings;
   an actuator dot capture assembly disposed beneath the removable top dot capture assembly, where the actuator dot capture assembly contains a plurality of actuator dots aligned with corresponding Braille dots in the removable top dot capture assembly;
   an actuator assembly comprising a top stator plate with openings to a plurality of spaces that contain a plurality of magnet actuators, where the actuator dot capture assembly is mounted on top of the actuator assembly to align the plurality of Braille dots and the plurality of actuator dots with the corresponding magnet actuators, the plurality of magnet actuators configured to actuate corresponding Braille dots via the actuator dots, where the magnet actuators are controlled by circuitry on a dot driver board housed within the actuator assembly; and
   a membrane between the removable top dot capture assembly and the actuator dot capture assembly, where the membrane is configured to be impermeable to debris and extends across the removable top dot capture assembly between the Braille dots and the corresponding actuator dots.

2. The tactile display of claim 1 where each of the plurality of magnet actuators includes a magnet disposed within an insulator space and surrounded by a wire coil that, when energized by applying current to the wire coil with the circuitry on the dot driver board, generates a magnetic field that moves the magnet corresponding to the energized wire coil to move the corresponding Braille dot to an up or down position.

3. The tactile display of claim 2 where the current applied to each wire coil is applied using pulse width modulation.

4. The tactile display of claim 2 where each wire coil is configured to induce an electromagnetic force that slows the travel of the corresponding magnet as the magnet approaches an impact surface.

5. The tactile display of claim 4 where each wire coil includes a greater number of windings near an end of the coil to induce the electromagnetic force.

6. The tactile display of claim 2 where the magnet corresponding to each of the plurality of magnet actuators each move between the top stator plate and a bottom stator when the wire coil surrounding the magnet is energized.

7. The tactile display of claim 6 where the current applied to each wire coil is applied by calibrating a polarity reversal of the applied current to hold the corresponding magnet against an impact surface disposed on the top stator plate or the bottom stator.

8. The tactile display of claim 6 where the current to the wire coil surrounding the magnet is controlled to reduce a bounce of the magnet off the top stator plate and the bottom stator.

* * * * *